US007236630B2

(12) United States Patent
Sato et al.

(10) Patent No.: US 7,236,630 B2
(45) Date of Patent: Jun. 26, 2007

(54) IMAGE PROCESSING METHOD, IMAGE PROCESSING APPARATUS, AND IMAGE PROCESSING PROGRAM

(75) Inventors: Satoshi Sato, Osaka (JP); Kunio Nobori, Osaka (JP); Kazutoyo Takata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/591,778

(22) Filed: Nov. 2, 2006

(65) Prior Publication Data

US 2007/0092132 A1    Apr. 26, 2007

Related U.S. Application Data

(60) Division of application No. 11/141,308, filed on May 31, 2005, which is a continuation of application No. PCT/JP2005/003453, filed on Mar. 2, 2005.

(30) Foreign Application Priority Data

Jul. 26, 2004  (JP)  ............................. 2004/217864

(51) Int. Cl.
*G06K 9/34* (2006.01)

(52) U.S. Cl. ..................... 382/173; 382/164; 382/171

(58) Field of Classification Search ................ 382/164, 382/169, 171, 172, 173, 174, 175, 176, 177, 382/178, 179, 235, 298, 307; 358/3.23, 448, 358/462, 530; 701/28

See application file for complete search history.

(56) References Cited

U.S. PATENT DOCUMENTS 6,111,984 A * 8/2000 Fukasawa .................... 382/209
6,445,807 B1* 9/2002 Katayama et al. ........... 382/100
6,724,941 B1* 4/2004 Aoyama ...................... 382/254

(Continued)

FOREIGN PATENT DOCUMENTS

JP          05-038688 A     2/1993

(Continued)

OTHER PUBLICATIONS

Roger Y. Tsai; "An Efficient and Accurate Camera Calibration Technique for 3D Machine Vision;" Processings of IEEE Conference on Computer Vision and Pattern Recognition; pp. 364-374; 1986.

(Continued)

*Primary Examiner*—Samir Ahmed
*Assistant Examiner*—Abolfazl Tabatabai
(74) *Attorney, Agent, or Firm*—Harness, Dickey & Pierce, P.L.C.

(57) ABSTRACT

An image region dividing section (105) partitions each of input images into a small regions, and a small region synthesized image generation section (106) generates a base image of each small region, which is an image including only diffuse reflection, from each input image. An image interpolation section (107) generates by interpolation a base image of a small region of which base image cannot be generated. A linearized image generation section (103) generates a linearized image, which is an image in an ideal state under given lighting condition, using the base image of each small region.

18 Claims, 42 Drawing Sheets

U.S. PATENT DOCUMENTS

| | | | |
|---|---|---|---|
| 6,744,931 B2 * | 6/2004 | Komiya et al. | 382/284 |
| 6,764,373 B1 | 7/2004 | Osawa et al. | |
| 6,765,587 B1 * | 7/2004 | Zhang et al. | 345/606 |
| 2004/0213437 A1 | 10/2004 | Howard et al. | |

FOREIGN PATENT DOCUMENTS

| | | |
|---|---|---|
| JP | 2961264 | 8/1999 |
| JP | 2000-099760 | 4/2000 |
| JP | 2001-118074 A | 4/2001 |
| JP | 2002-024818 | 1/2002 |
| JP | 2002-501265 A | 1/2002 |
| JP | 2003-085531 | 3/2003 |
| JP | 3459981 | 8/2003 |
| JP | 2004-005509 | 1/2004 |
| JP | 2004-021388 A | 1/2004 |
| JP | 2004-054947 | 2/2004 |
| WO | WO/99-38121 | 7/1999 |

OTHER PUBLICATIONS

Norihiro Tanaka et al.; "Measurement of Omnidirectional Illuminant Distribution and Its Application;" Meeting on Image Recognition and Understanding (MIRU2002); vol. II; pp. 99-104; 2000.

Osamu Yamaguchi et al.; "Appearance Matching by Qualitative Trinary Representation;" Technical Research Report of Institute of Electronics, Information and Communication Engineers; PRMU2002-34; pp. 23-30; 2002.

Ichiro Murase et al.; "Robust Matching by Increment Sign Correlation;" Transactions of the Institute of Electronics, Information and Communication Engineers; vol. J83-D-II, No. 5; pp. 1323-1331; 2000; and a partial English translation thereof.

Yasuhiro Makaigawa et al.; "Photometric Image-Based Rendering for Realizing Virtual Lighting Conditions in Image Synthesis;" Transaction of Information Processing Society of Japan; Computer Vision and Image Media; vol. 41, No. SIG10 (CVIM1); p. 19-30; 2000.

Ronen Basri et al.; "Photometric Stereo with General, Unknown Lighting;" IEEE Conference on Computer Vision and Pattern Recognition; pp. II-374-381; 2001.

J. Shi et al.; "Good Features to Track;" IEEE Conference on Computer Vision and Pattern Recognition; 1994; pp. 593-600; 1994.

A. Banno et al., "Removing Specularities of Vehicles from Image Sequences by using Spacio-Temporal Images Taken by a Moving Camera", IPSJ SIG Technical Report, CVIM, 2003-CVIM-141, pp.17-23, 2003.

Y. Ishii et al., "Photometric Linearization Based on Classification of Photometric Factors", IPSJ Transactions vol. 44, No. SIG5(CVIM6), pp. 11-21, Apr. 2003.

M. A. Fischler et al., "Random Sample Consensus: A Paradigm for Model Fitting with Applications to Image Analysis and Automated Cartography", Communications of the ACM, vol. 24, Issue 6, pp. 381-395, Jun. 1981.

A. Shashua, "Geometry and Photometry in 3D Visual Recognition", P.D. Thesis, Dept. Brain and Cognitive Sciences, MIT, Nov. 1992.

* cited by examiner

FIG.4
(a)
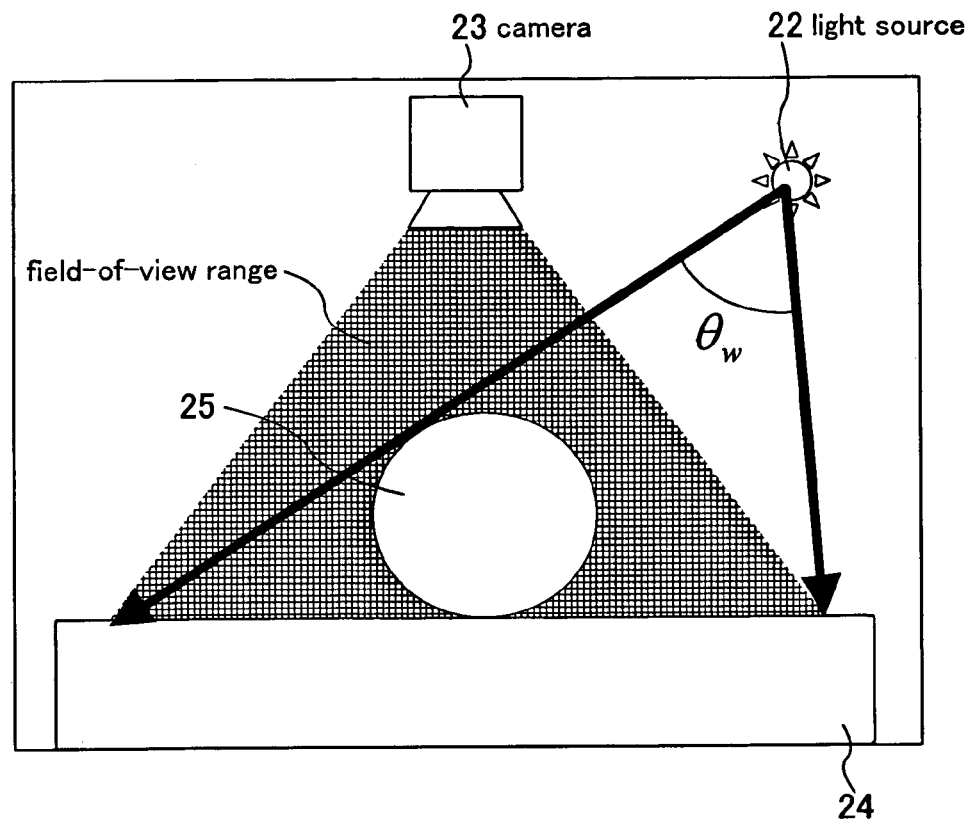
(b)
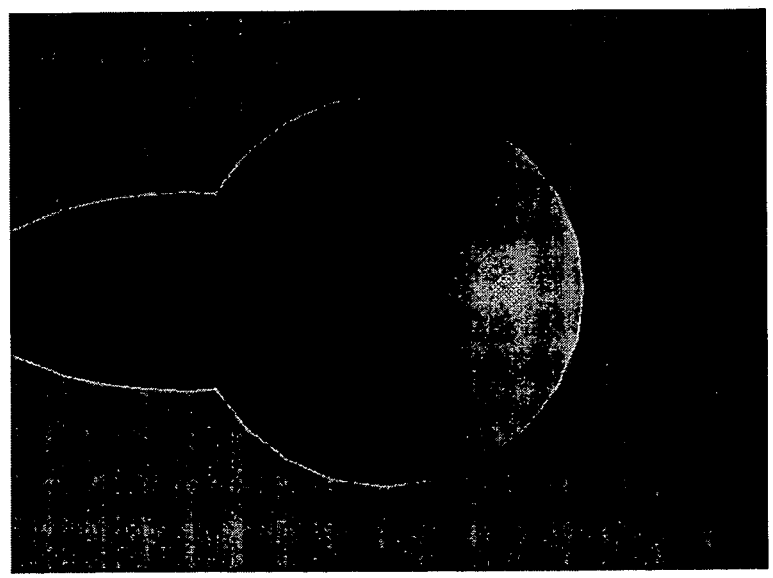

FIG.5
(a)
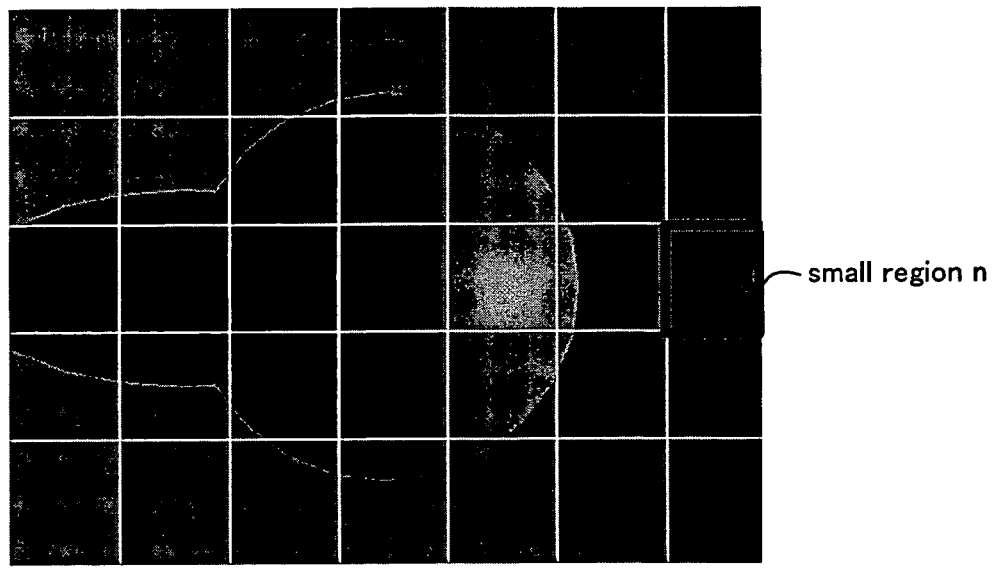
small region n
(b)
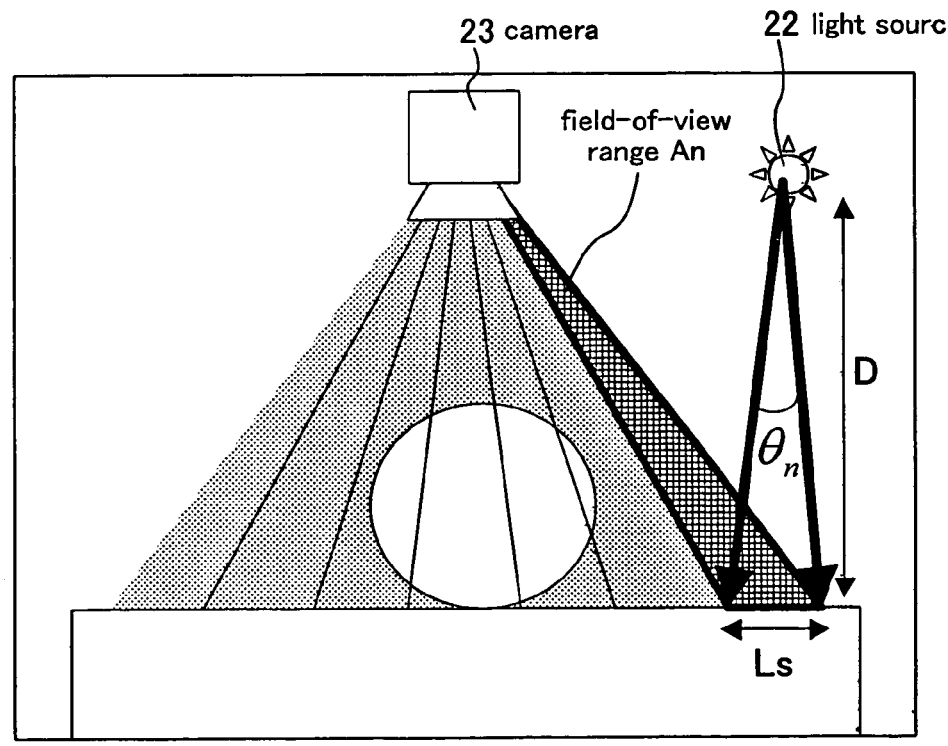

FIG.11
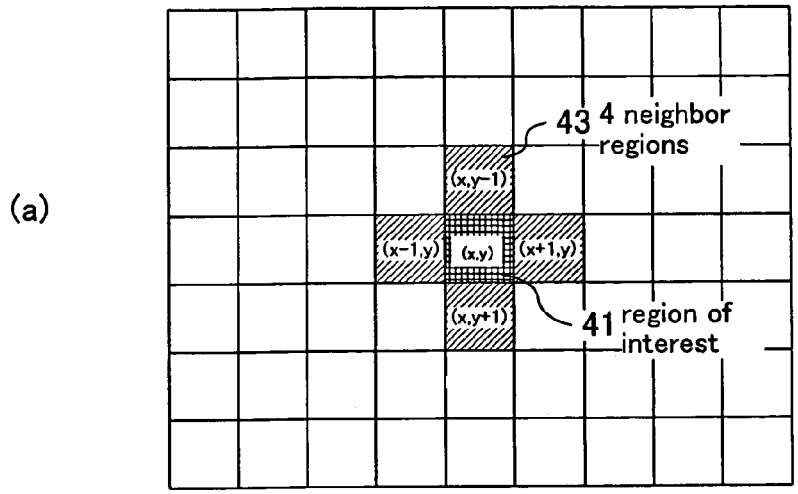
(a)
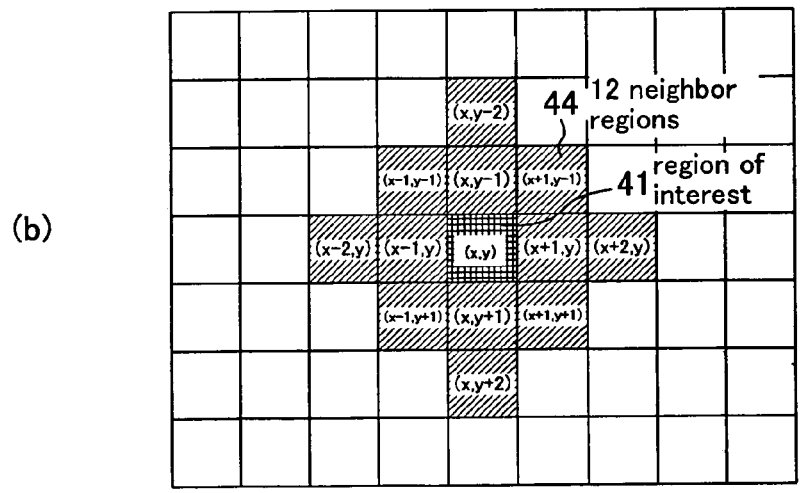
(b)
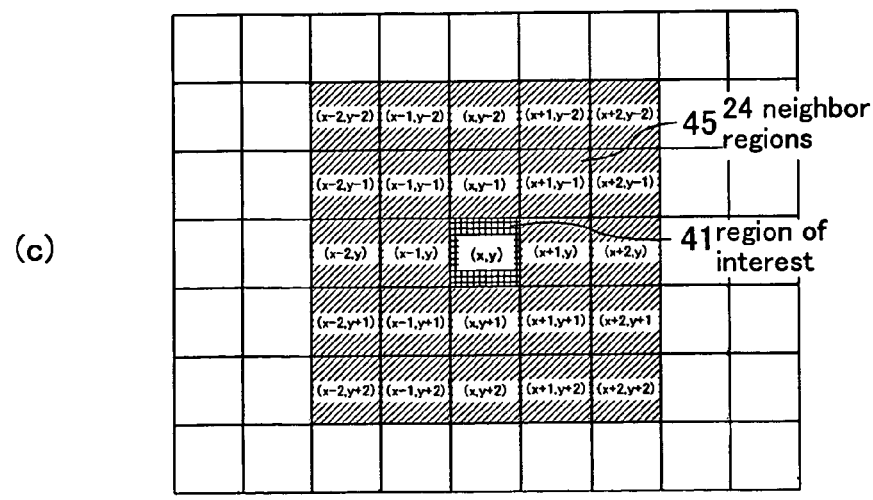
(c)

FIG.12
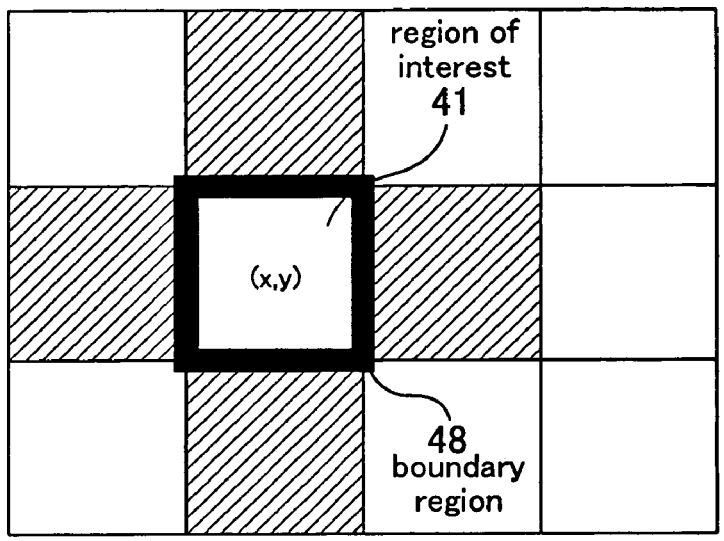
FIG.13
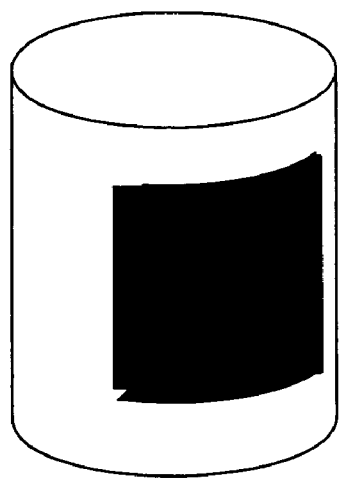
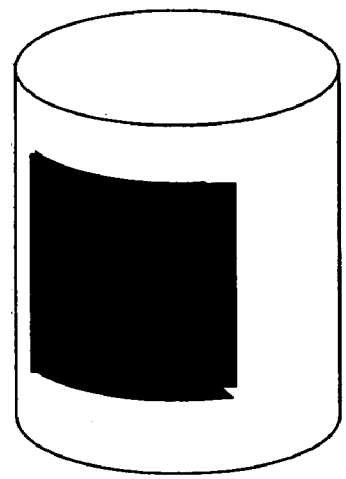
left linearized image        right linearized image FIG.14
(a)
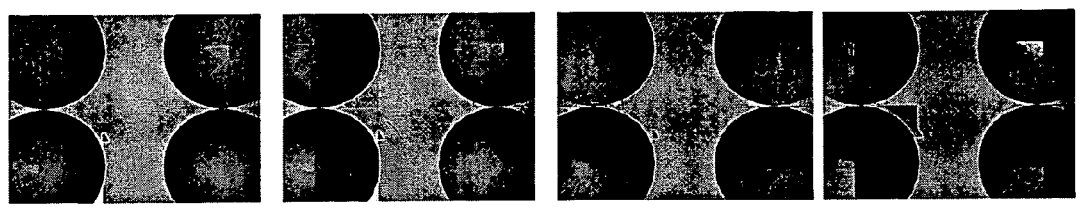
(b)

49 neighbor region 41 region of interest

FIG.20
(a)
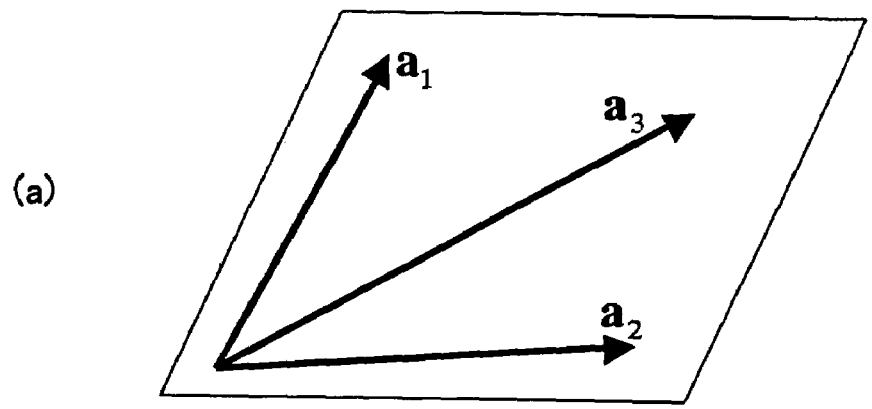
(b)
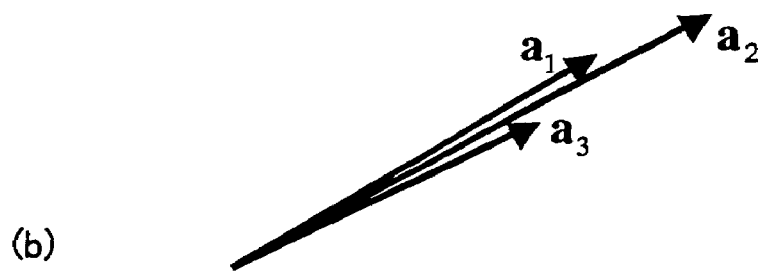
(c)
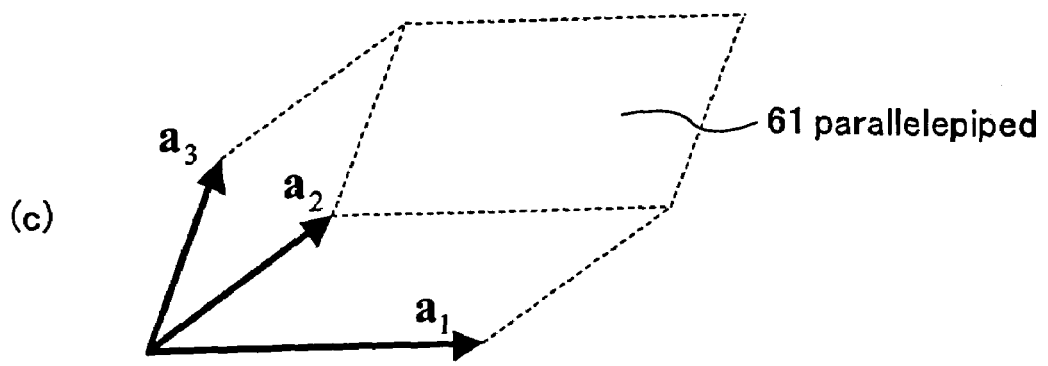

FIG.21
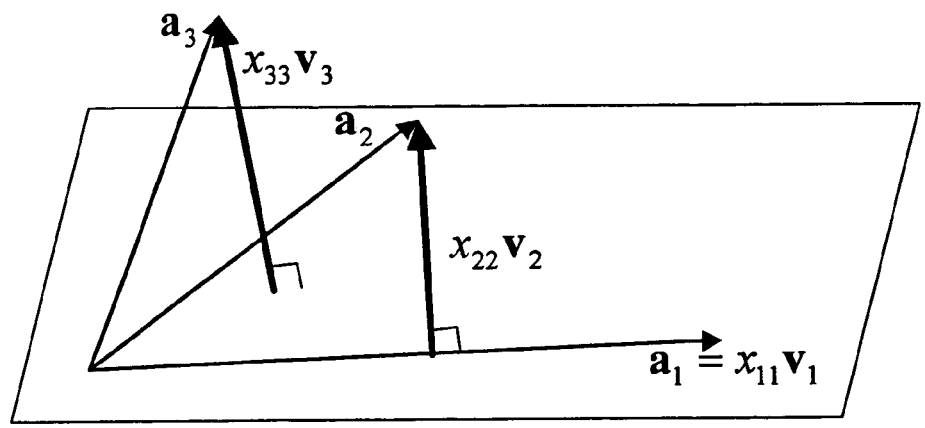
FIG.22
(a)
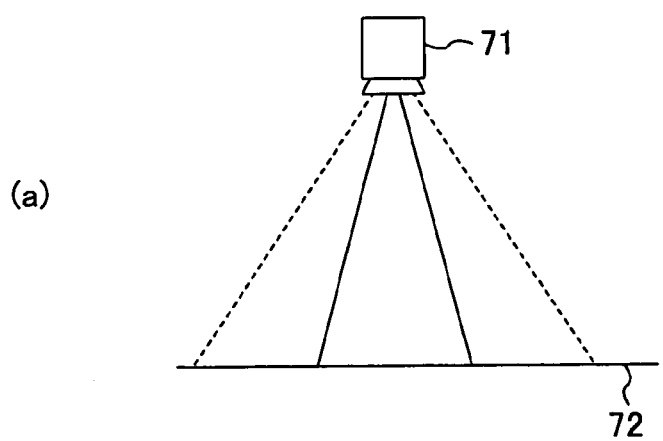
(b)
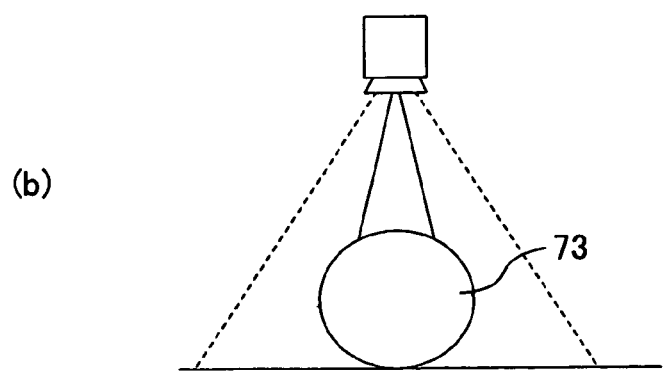

FIG.28
(a)
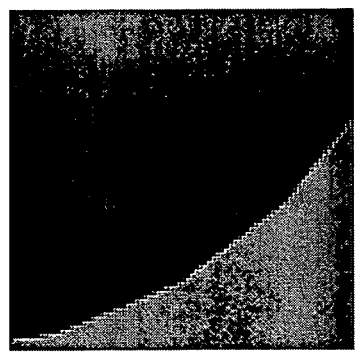
(b)
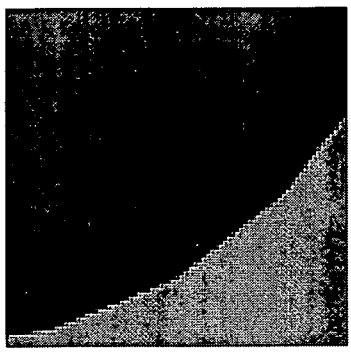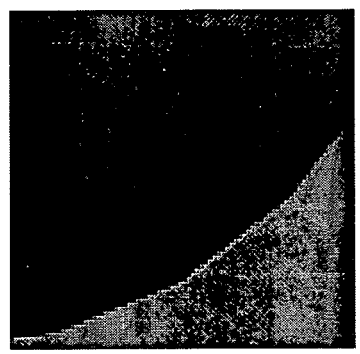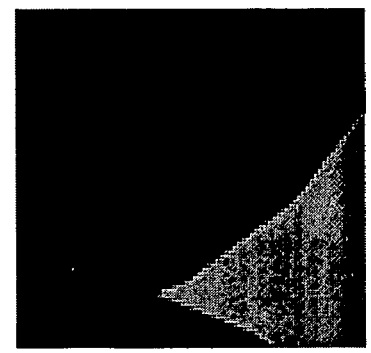
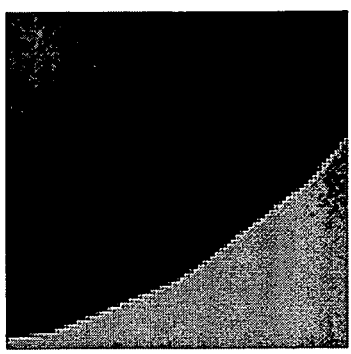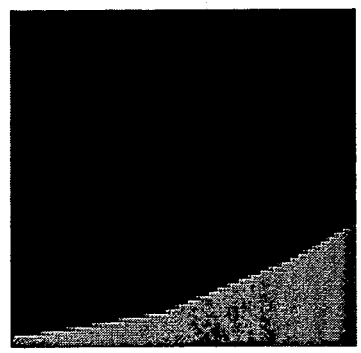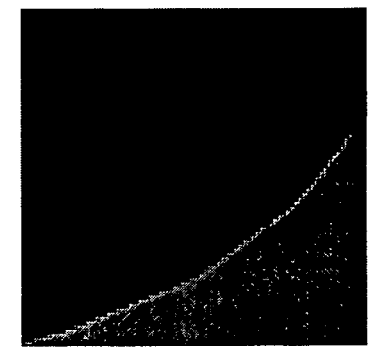

FIG.29
(a)
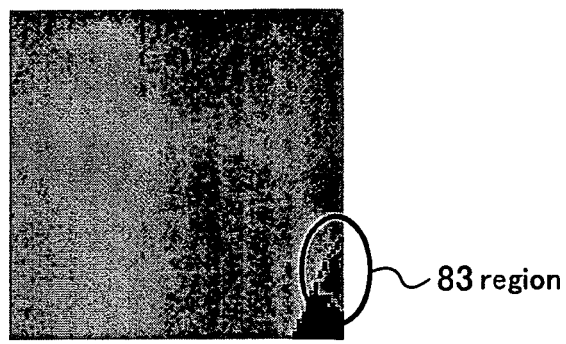
83 region
(b)
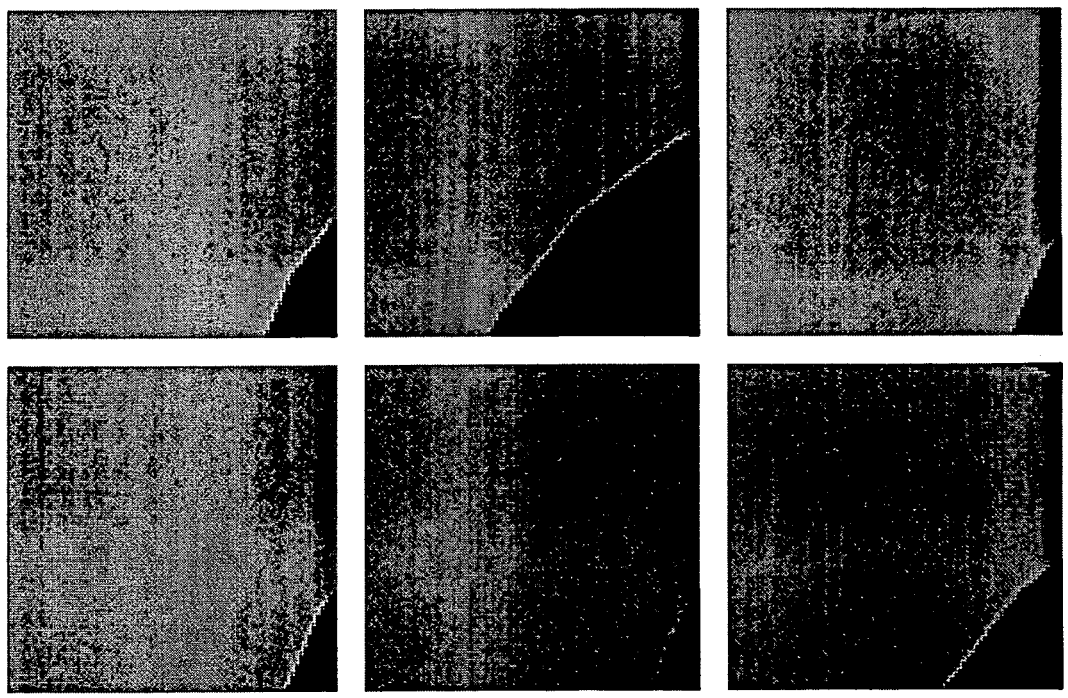

FIG.31
(a)
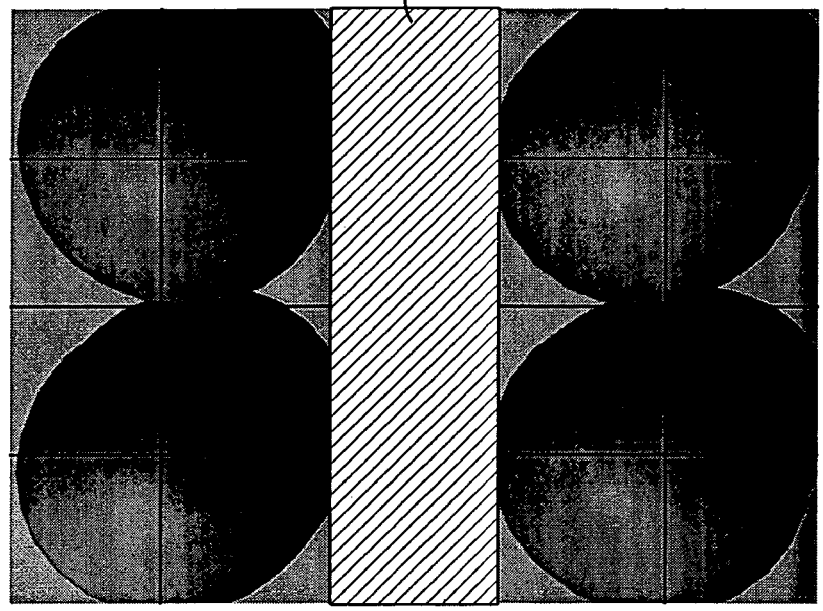
84 plane region
(b)
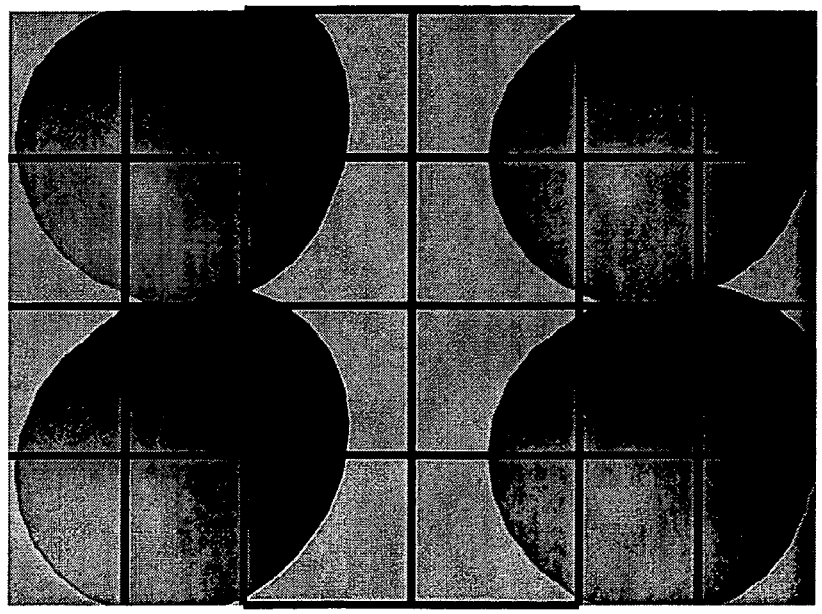

FIG.34
(a)
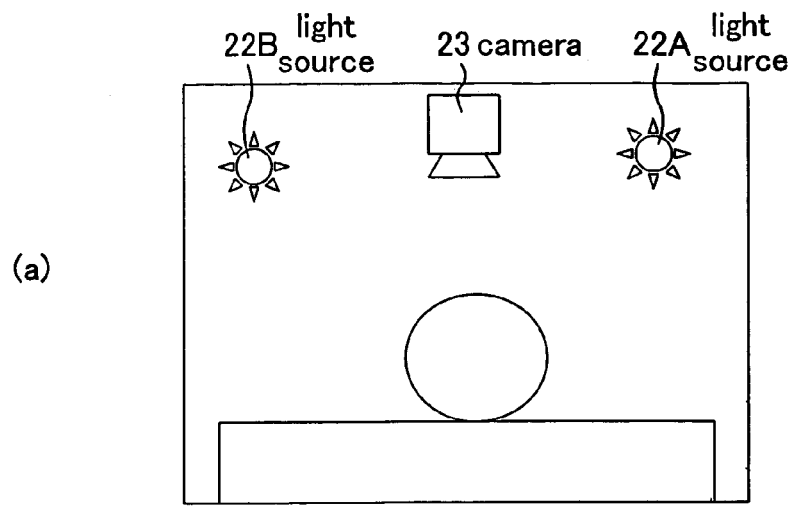
(b)
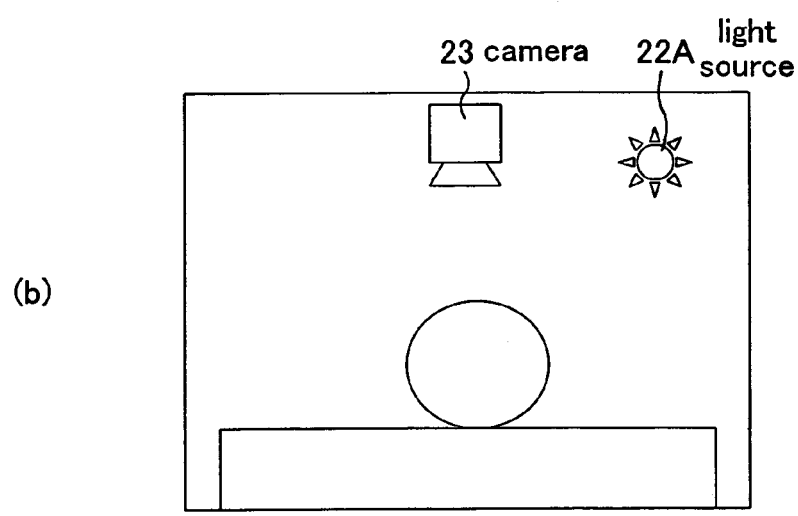
(c)
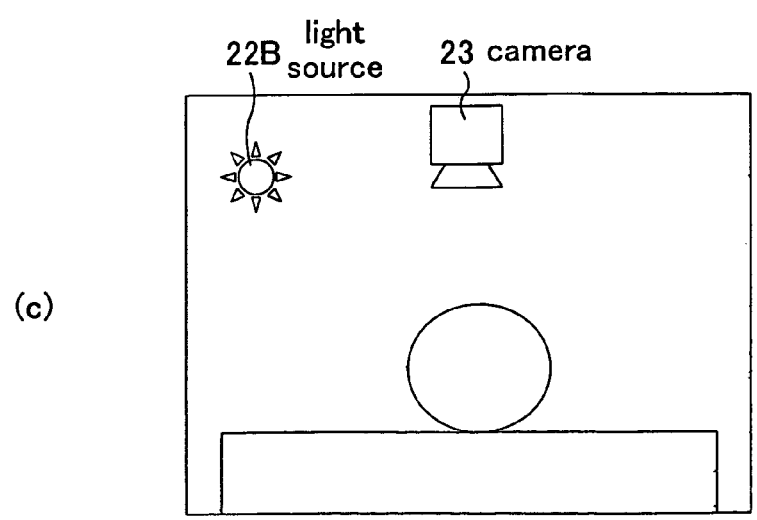

FIG.35
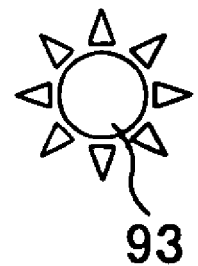
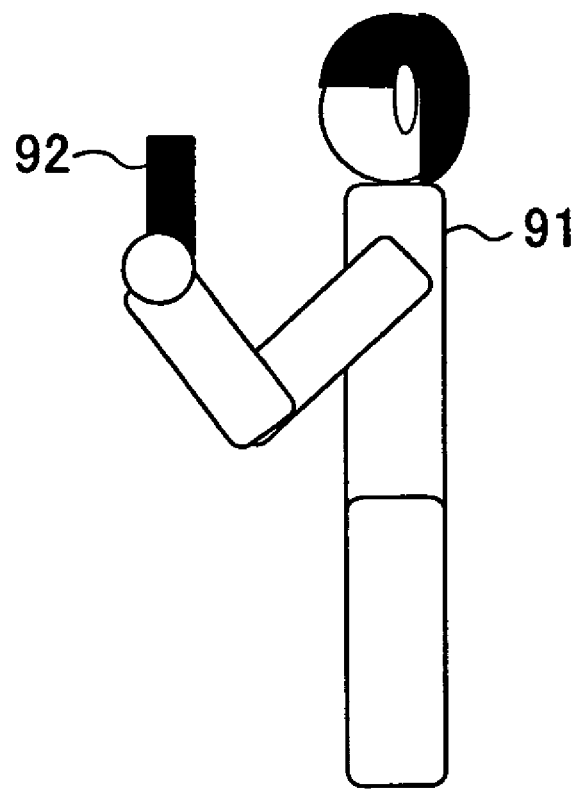

FIG.36
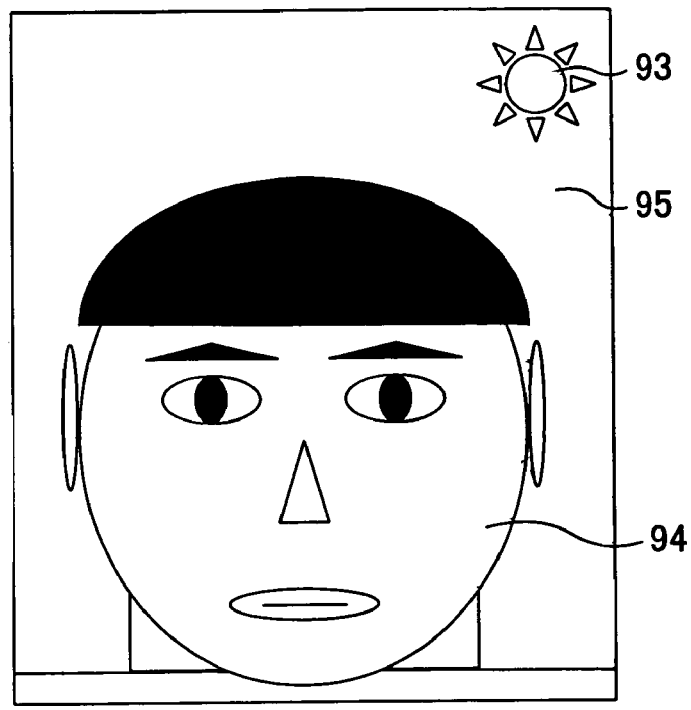
(a)
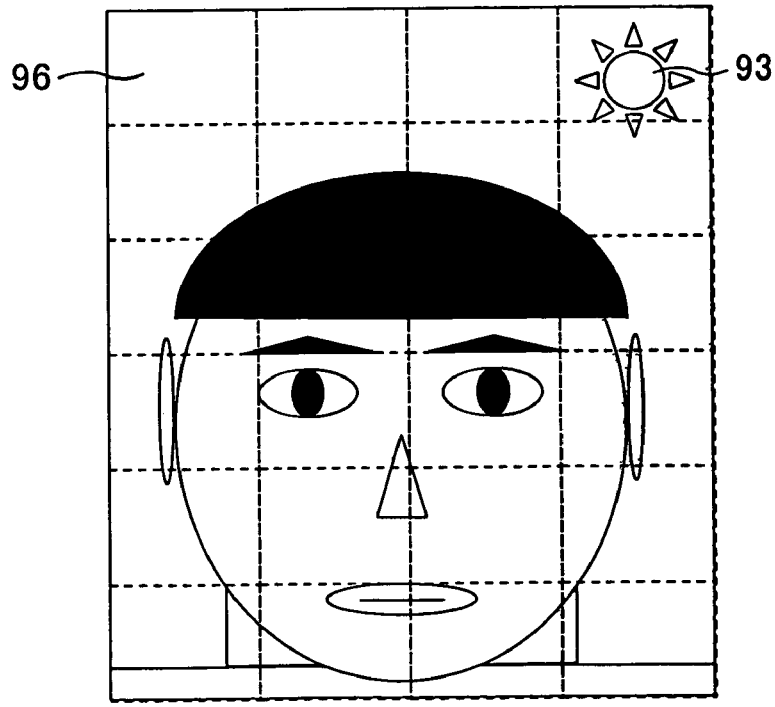
(b)

FIG.39
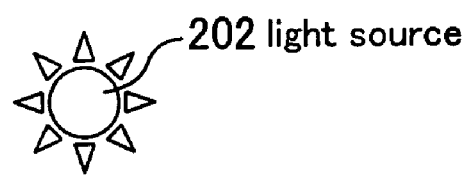
202 light source
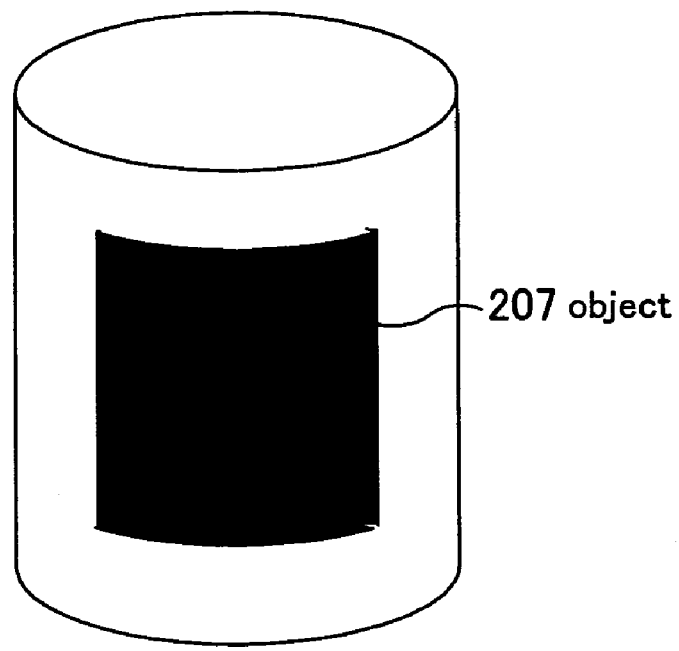
207 object
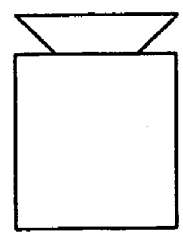
206L
left camera
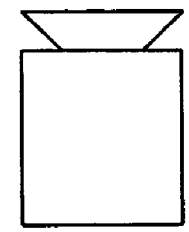
206R
right camera specular reflection region 203L specular reflection region 203R left image right image

FIG.44
(a) input image
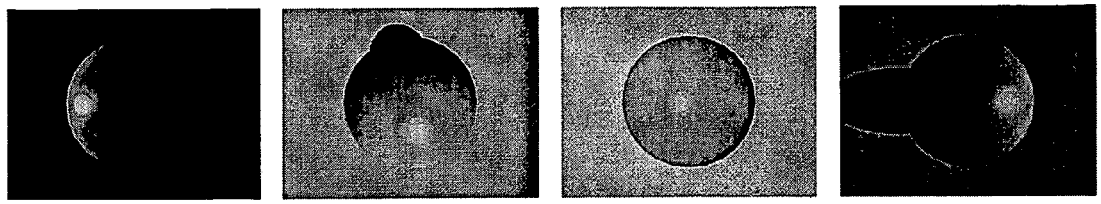
(b) linearized image
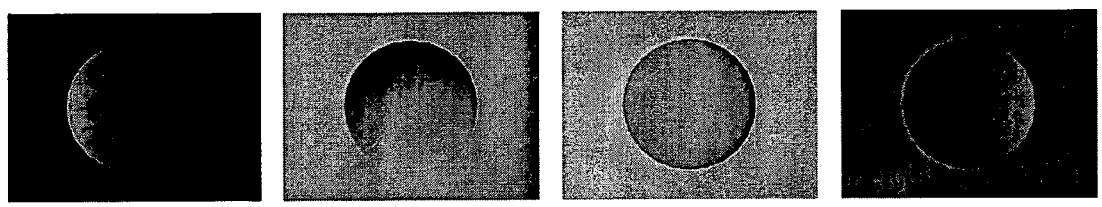
(c) specular reflection
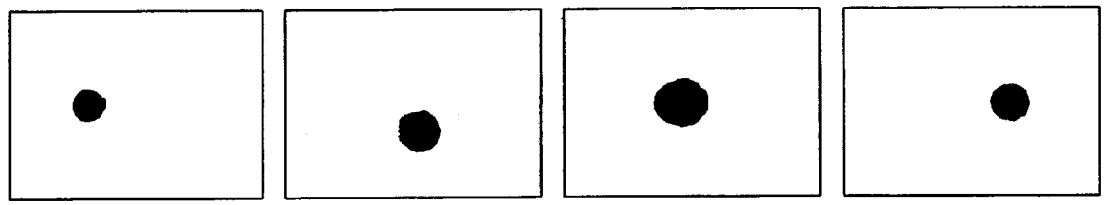
(d) cast shadow
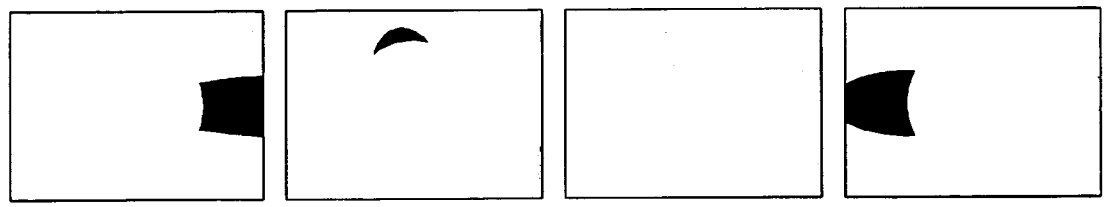
(e) attached shadow
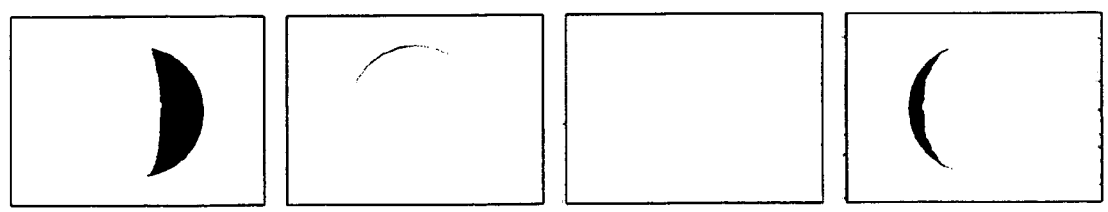

FIG.45
(a) input image
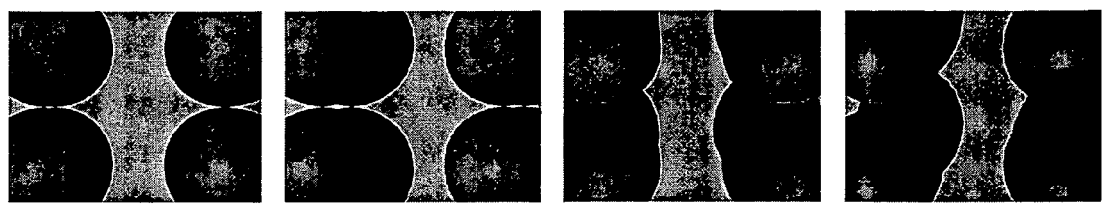
(b) linearized image (third conventional example)
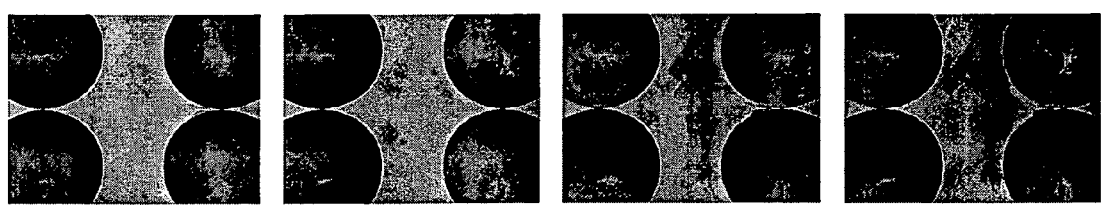
(c) specular reflection (third conventional example)
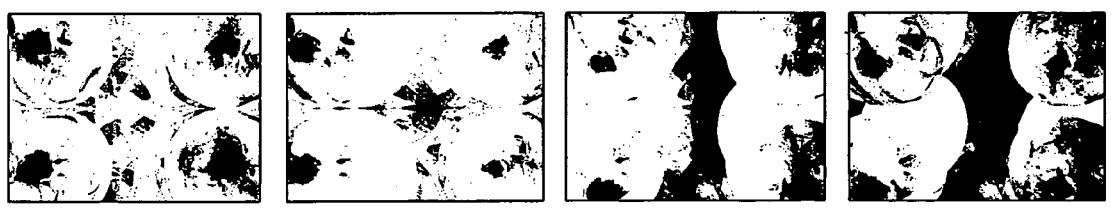

FIG.46
(a)
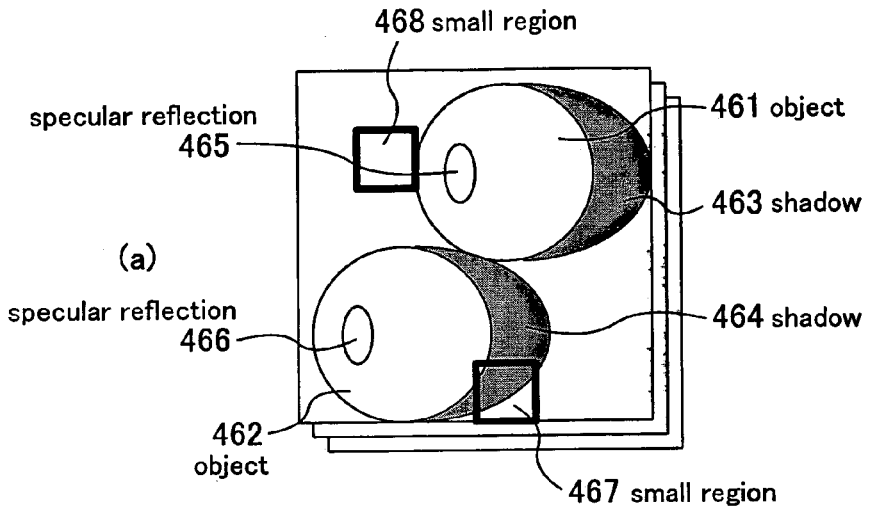
(b)
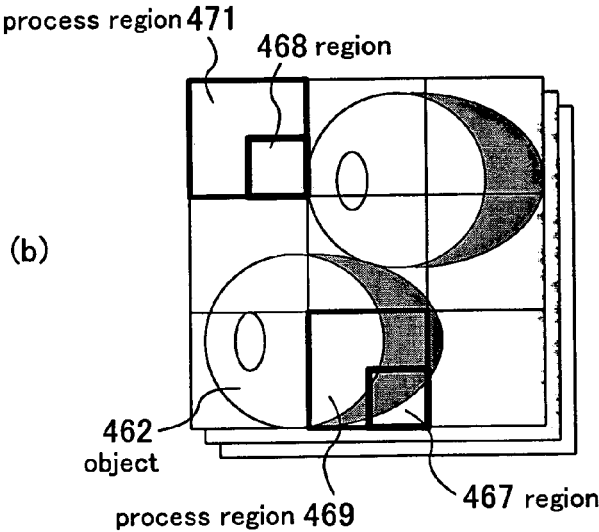
(c)
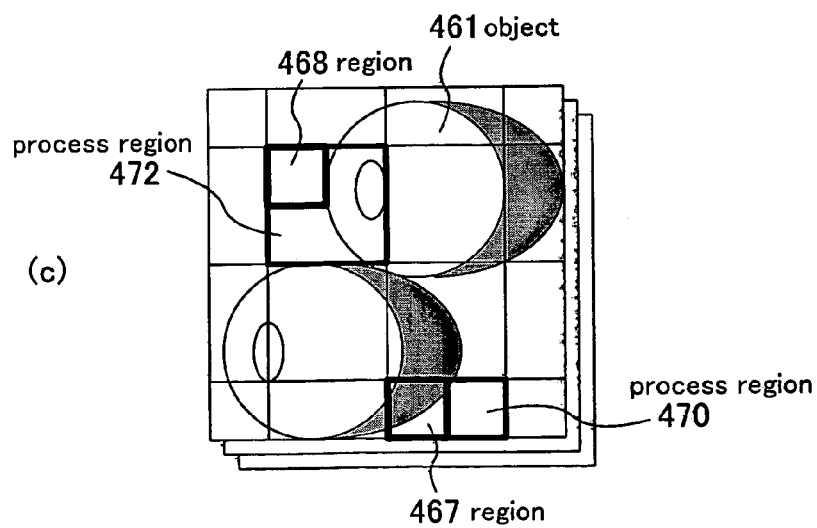

| $f_{i-1,j-1}$ | $f_{i,j-1}$ | $f_{i+1,j-1}$ |
|---|---|---|
| $f_{i-1,j}$ | $f_{i,j}$ | $f_{i+1,j}$ |
| $f_{i-1,j+1}$ | $f_{i,j+1}$ | $f_{i+1,j+1}$ |

FIG.49
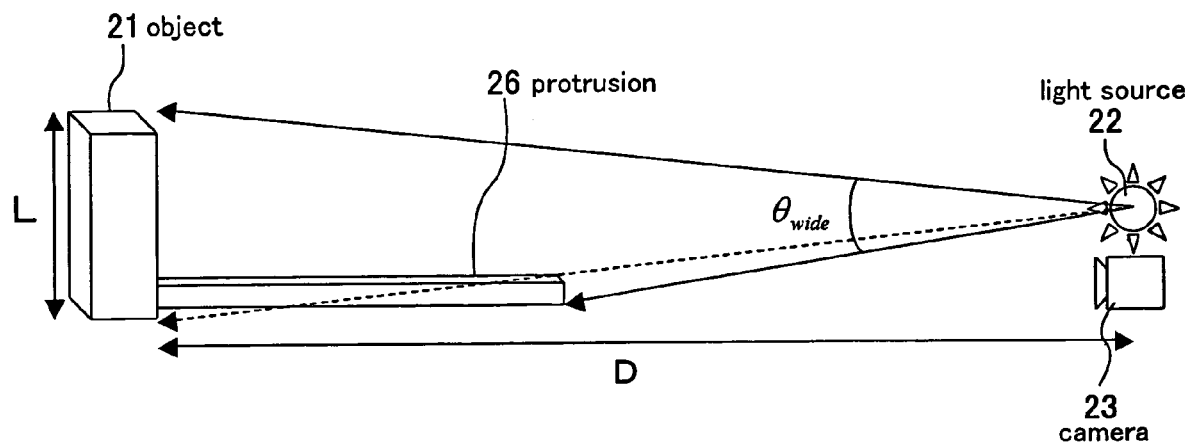
FIG.50
(a)
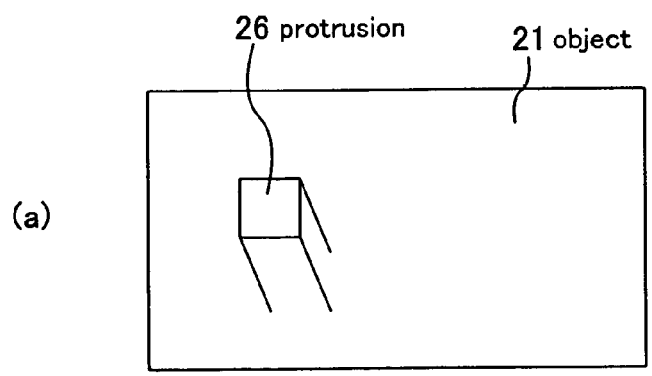
(b)
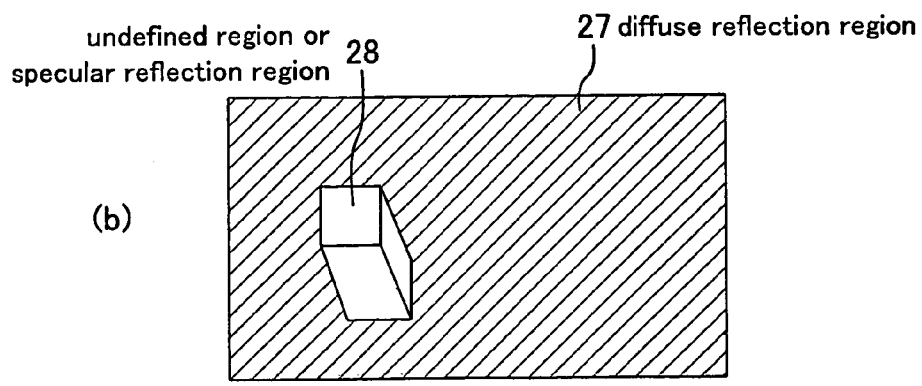

IMAGE PROCESSING METHOD, IMAGE PROCESSING APPARATUS, AND IMAGE PROCESSING PROGRAM

CROSS-REFERENCE TO RELATED APPLICATIONS

This application is a divisional of U.S. patent application Ser. No. 11/141,308 filed on May 31, 2005. The disclosure(s) of the above application(s) is (are) incorporated herein by reference. This application also claims the benefit of PCT/JP2005/003453 filed Mar. 2, 2005 and Japanese Application No. 2004-217864 filed Jul. 26, 2004. The disclosure(s) of the above application(s) are incorporated herein by reference.

This is a continuation of Application PCT/JP2005/003435 filed on Mach 2, 2005.

BACKGROUND OF THE INVENTION

1. Field of the Invention

The present invention relates to a image processing technology and particularly relates to a technology for removing influence of specular reflection and shadows which is a problem in processing images shot under general environment.

2. Description of the Prior Art

Conventionally, methods using cameras are widely used for detecting position and posture of an object, recognizing an object, detecting motion of an object, and the like. These are realized by applying image processing, such as pattern matching, optical flow detection, and feature point extraction, to images shot by a camera.

For example, for detecting position and posture of an object from images shot by a camera, there has been proposed a method in which a 3D model of the object is aligned to an image of a stereo camera for synthesis (for example, Patent Document 1).

However, while the image processing as in the above Patent Document 1 is effective for image without noise, it cannot provide sufficient reliability and accuracy for images shot under general environment (for example, Non-patent Document 1). The main factor is that: general image processing assumes objects to be diffuse reflectors, and therefore, it is ignored that color information of image data varies according to the camera position due to influence of specular reflection and that pixel values change largely due to the presence of shadows.

For example, under real environment such as in a home, specular reflection caused by regular reflection of a light source lowers detection accuracy and a recognition rate. FIG. 37 is an illustration schematically showing an image obtained by shooting a mobile phone 201 in a home. Indoors, at least one light source 202 exists generally. When the light source and a camera satisfy a relationship of regular reflection on the surface of the mobile phone 201, a specular reflection region 203 of which pixel value is high appears. For this reason, when the mobile phone 201 is to be detected in pattern matching using a reference image 204 shown in FIG. 38, the specular reflection region 203 has both an intensity and edge information largely different from those of a region 205 corresponding thereto in the reference image 204. As a result, the detection accuracy is lowered largely. In addition, the specular reflection region moves according to the camera position and varies in intensity according to the lighting condition. Here, the light condition means the numbers and position of the lighting condition.

Specular reflection exerts significant influence also on stereo matching processing. FIG. 40 shows images obtained respectively by shooting an object 207 using a stereo camera set 206L, 206R as shown in FIG. 39. As shown in FIG. 40, specular reflection regions 203L, 203R appear in right and left images, respectively. However, the position and the color information of the specular reflection regions 203L, 203R are different from each other, so that the right image and the left image are quite different from each other. This lowers accuracy of stereo matching.

Moreover, this problem is caused not only by specular reflection but also by a shadow (cast shadow) cast by an object existing in the vicinity and a shadow (attached shadow) appearing when the normal direction N of an object forms an angle at more than 90 degrees with a light source direction L (see FIG. 41). When an occluding object 208 exists in the vicinity of the mobile phone 201, as shown in FIG. 37, the occluding object 208 casts a shadow on the mobile phone 201 to generate a shadow region 209 on the mobile phone 201. The shadow region 209 is an image different from the reference image 204 and causes lowering of the accuracy as well as in the case of the specular reflection.

In order to solve the above problems, correction of the specular reflection and the shadow region are performed widely as pre-processing for image processing. Referring to methods for estimating the specular reflection and the shadow region, there are several proposals: a first conventional example (for example, Patent Document 2) in which difference in polarization characteristic between specular reflection and diffuse reflection is utilized and a polarization filter is used; a second conventional example (for example, Patent Document 3) in which a specular reflection region is separated by rotating an object and utilizing a multi-spectrum camera; and a third conventional example (for example, Non-patent Document 2) in which a "linearized image," which is an image in an ideal state in which specular reflection is not caused, is synthesized by utilizing images of an object illuminated by a light source in various directions and specular reflection and shadow regions are separated by utilizing the linearized image.

However, the first conventional example necessitates mounting of the polarization filter to the camera, which implies difficulty in realization by a general camera. The second conventional example needs shooting while an object is placed on a rotary table, and it is unsuitable for home use.

In the third conventional example only required is to change the position of a light source for illuminating an object and the position of the light source may be unknown. Thus, it is effective under general environment such as in a home.

The third conventional example will be described. First, diffuse reflection, specular reflection, and shadows, which are optical phenomena, will be described with reference to FIG. 42.

When a dichromatic reflection model is assumed, an intensity of an object can be expressed as a sum of a diffuse reflection component and a specular reflection component. In a Lambertian model, a pixel value $I_d$ of the diffuse reflection component is expressed by the following expression.

$$I_d = n \cdot s \qquad \text{(Expression 1)}$$

Wherein, n is a product of the normal direction N of the surface of the object and a diffuse reflectance (albedo), and s is a product of a unit vector in a light source direction and an intensity of the light source.

Shadows are classified into attached shadow, which appearing when the normal direction of an object does not front a light source direction, and cast shadow, which is caused due to occlusion of light by an object. In the case where there is no influence of ambient light and inter-reflection, both of them have an intensity of 0. However, in (Expression 1), attached shadow becomes a negative value and cast shadow becomes a positive value.

Shashua indicates that an image in an arbitrary light source direction can be expressed by linear combination of three images different in light source direction on the assumption of a parallel light source and perfectly diffuse reflection (see Non-patent Document 3). In other words, when three images different in light source direction in terms of vector are $I_1$, $I_2$, and $I_3$, an image $I_k$ in an arbitrary light source direction can be expressed as in the following expression by linear combination.

$$I_k = c_k^1 I_1 + c_k^2 I_2 + c_k^3 I_3 \quad \text{(Expression 2)}$$

Wherein, $$c_k = [c_k^1 \, c_k^2 \, c_k^3]^T$$

is called a "linearization coefficient set" for the image $I_k$. Also, an image generated by a linear sum in this way is called a "linearized image."

However, a real image includes a shadow and specular reflection, and does not satisfy (Expression 2). In this connection, in the third conventional example, a plurality of images different in light source direction are shot and RANSAC (see Non-patent Document 4) is employed for generating three images which satisfy (Expression 2) and include only diffuse reflection. The thus generated images including only diffuse reflection are called "base images." By utilizing such base images in the method by Shashua, a linearized image of which lighting condition corresponds to that of a taken image can be generated. The linearized image is expressed by the following expression.

$$I_k^L = c_k^1 I_1^B + c_k^2 I_2^B + c_k^3 I_3^B \quad \text{(Expression 3)}$$

Wherein, $I_k^L$ is a linearized image corresponding to an input image $I_k$, and $I_1^B$, $I_2^B$, and $I_3^B$ are three base images generated by the above method. The thus generated linearized image is an ideal image in which specular reflection is not caused. Hence, image processing with no influence of specular reflection and shadows involved can be realized by using this linearized image.

Further, the third conventional example also mentions region classification based on an optical characteristic which utilizes the linearized image. Diffuse reflection, specular reflection, cast shadow, and attached shadow can be separated in accordance with the following relational expression, wherein a pixel value of a pixel p in an input image $I_k$ is $i_{k(p)}$, and a pixel value of a linearized image corresponding thereto is $i_{k(p)}^L$. FIG. 43 illustrates this.

| Diffuse reflection | if $|i_{k(p)} - i_{k(p)}^L| T \cdot i_{k(p)}$ |
|---|---|
| Specular reflection | if $(i_{k(p)} - i_{k(p)}^L > T \cdot i_{k(p)})$ and $(i_{k(p)}^L \geq 0)$ |
| Cast shadow | if $(i_{k(p)} - i_{k(p)}^L < - T \cdot i_{k(p)})$ and $(i_{k(p)} < Ts)$ |
| Attached shadow | if $(i_{k(p)}^L < 0)$ and $(i_{k(p)} < Ts)$ |

Patent Document 1: Japanese Patent No. 2961264B

Patent Document 2: Japanese Patent No. 3459981B

Paten Document 3: Japanese Patent Application Laid Open Publication No. 2003-85531A Patent Document 4: Japanese Patent Application Laid Open Publication No. 2004-5509A Non-patent Document 1: Athuhiko Banno and Katsushi Ikeuchi, "Removing Specularities of Vehicles from Image Sequences by using Spacio-Temporal Images taken by a Moving Camera," Research Report, Information Processing Society of Japan, CVIM, 2003-CVIM-141, pp. 17-23, 2003

Non-patent Document 2: Yasunori Ishii, Kohtaro Fukui, Yasuhiro Mukaigawa, and Takeshi Shakunaga, "Photometric Linearization Based on Classification of Photometric Factors," Transaction of Information Processing Society of Japan, vol. 44, no. SIG5 (CVIM6), pp. 11-21, 2003

Non-patent Document 3: Shashua A., "Geometry and Photometry in 3D Visual Recognition," P. D. thesis, Dept. Brain and Cognitive Science, MIT, 1992

Non-patent Document 4: M. A. Fischler and R. C. Bolles, "Random Sample Consensus: A Paradigm for Model Fitting with Applications to Image Analysis and Automated Cartography," Communications of the ACM, Volume 24, Issue 6, pp. 381-395

SUMMARY OF THE INVENTION

Problems that the Invention is to Solve

FIG. 44 shows the results of image processing by the third conventional example. Herein, 24 images in which a parallel light source is changed in direction are used as input images. Wherein, FIG. 44(a) shows some of the input images, FIG. 44(b) shows linearized images generated utilizing the images of FIG. 44(a), FIGS. 44(c), 44(d), and 44(e) show specular reflection, cast shadow, attached shadow separated from the images of FIG. 44(a) and FIG. 44(b) by utilizing (Expression 4), respectively. As can be understood from FIG. 44, excellent results can be obtained in a case using the parallel light source.

In contrast, FIG. 45 shows the results of the same processing to 24 input images in which a near point light source is changed in position. Wherein, FIG. 45(a) shows some of the input images, FIG. 45(b) shows linearized images generated utilizing the images of FIG. 45(a), FIG. 45(c) shows specular reflection separated from the images of FIG. 45(a) and FIG. 45(b) by utilizing (Expression 4). As can be understood from FIG. 45, the use of the near point light source rather than the parallel light source causes failure of generation of linearized images, resulting in erroneous separation of specular reflection components.

It is known in general that sunlight can be approximated to a parallel light source under environment where no occluding object exists such as outdoor while it is also known that lighting equipment such as an electric lump as a home use light source cannot be near approximated to a parallel light source and rather serves as a near point light source. For this reason, the method of the third conventional example, which assumes a parallel light source, cannot be applied directly to home use equipment and the like, and it is essential to extend the third conventional example to a method that takes a near point light source into consideration for utilization under general environment such as in a home.

Further, if a camera and an object are fixed, the third conventional example attains processing even if the position of a light source is unknown. Wherein, the following two conditions must be met.

In random sampling, three points are selected in a diffuse reflection region of an image under processing.

The normal directions of the selected three points in the diffuse reflection region are different from one another.

Now, the second condition will be described. As can be cleared from (Expression 2), $I_1$, $I_2$, and $I_3$ must be independent for obtaining a linearization coefficient set. However, if not all of the normal directions of $I_1$, $I_2$, and $I_3$ are different from one another, the pixel values thereof are not independent. If these pixel values are not independent, in other words, if not all of the normal directions of the three pixels are different from one another, (Expression 2) is degenerated to obtain an inaccurate solution.

The present invention has made in view of the aforementioned problems and has its objective of enabling generation of linearized images and removing the influence of specular reflection and shadows even in general environment where a parallel light source cannot be assumed, such as in a home

MEANS OF SOLVING THE PROBLEMS

In order to solve the aforementioned problems, the present invention provides, as image processing, a method for generating a base image in such a manner that a plurality of input images obtained by shooting the same object are divided into a plurality of small regions in common to generate a base image of each small region from each input image and a base image of a small region of which base image cannot be generated is generated by interpolation using a computed value for base image generation in a neighbor region of the small region, and a method for generating a linearized image of the object under given lighting condition using each base image thus generated.

In the present invention, a plurality of input images are divided into small regions. Accordingly, a parallel light source can be assumed in the respective small regions even in the case where images are shot under lighting condition where a parallel light source cannot be assumed, enabling generation of a base image. For a small region of which base image cannot be generated, a base image can be generated by the interpolation using the computed value for the base image generation in the neighbor small region. Then, a linearized image of the object under the given lighting condition is generated using the thus generated base images. Namely, a linearized image can be generated even under general environment such as in a home, and image processing which influence of specular reflection and shadows is removed is realized with the use of the thus generated linearized image.

EFFECTS OF THE INVENTION

According to the present invention, a linearized image, which is an image in an ideal condition in which specular reflection is not caused, can be generated by a very simple constitution under general environment such as in a home.

In association therewith, the influence of specular reflection and shadows, which involves the conventional problems, can be removed in image processing. Further, a specular reflection region and a shadow region in an image can be separated with the use of this linearized image.

BRIEF DESCRIPTION OF THE DRAWINGS

FIG. 4 shows a given lighting condition and an image shot in the condition.

FIG. 5 shows dividing into small regions in the image of FIG. 4.

FIG. 11 shows other examples of neighbor regions.

FIG. 12 is a view showing neighbor regions and a boundary region.

FIG. 13 shows linearized images corresponding to FIG. 40.

FIG. 14($a$) shows linearized images generated from images of FIG. 45($a$), and FIG. 14($b$) shows specular reflection components separated from images of FIG. 45($a$).

FIG. 20 is a view showing relationships of element vectors at the time when a matrix is degenerated.

FIG. 21 is an illustration showing matrix triangulation and geometric concept of diagonal components thereof.

FIG. 22 shows illustrations for explaining threshold value determination in judgment as to whether the normal directions of three points are the same or not.

FIG. 28 includes views for explaining a method for detecting, utilizing an edge of an image, a region of which base image cannot be obtained.

FIG. 29 includes views for explaining a method for detecting, utilizing an edge of an image, a region of which base image cannot be obtained.

FIG. 31 is a view for explaining region partition change.

FIG. 34 explains processing in the case where a plurality of light sources exist.

FIG. 35 is an illustration showing face recognition utilizing a mobile terminal.

FIG. 36 illustrates an image shot in the condition shown in FIG. 35 and the region partition.

FIG. 39 is an illustration showing a situation where an object is shot by a stereo camera set.

FIG. 44 shows the results of image processing performed under a parallel light source, using the third conventional example.

FIG. 45 shows the results of image processing performed under a near point light source, using the third conventional example.

FIG. 46 is a conceptual view for explaining that a base image varies the position in region partition.

FIG. 49 is an illustration showing a situation where an object having protrusion is shot.

FIG. 50 shows an image shot in FIG. 49 and the result of region classification based on the photometric factors.

DESCRIPTION OF THE PREFERRED EMBODIMENTS

Figure 1:
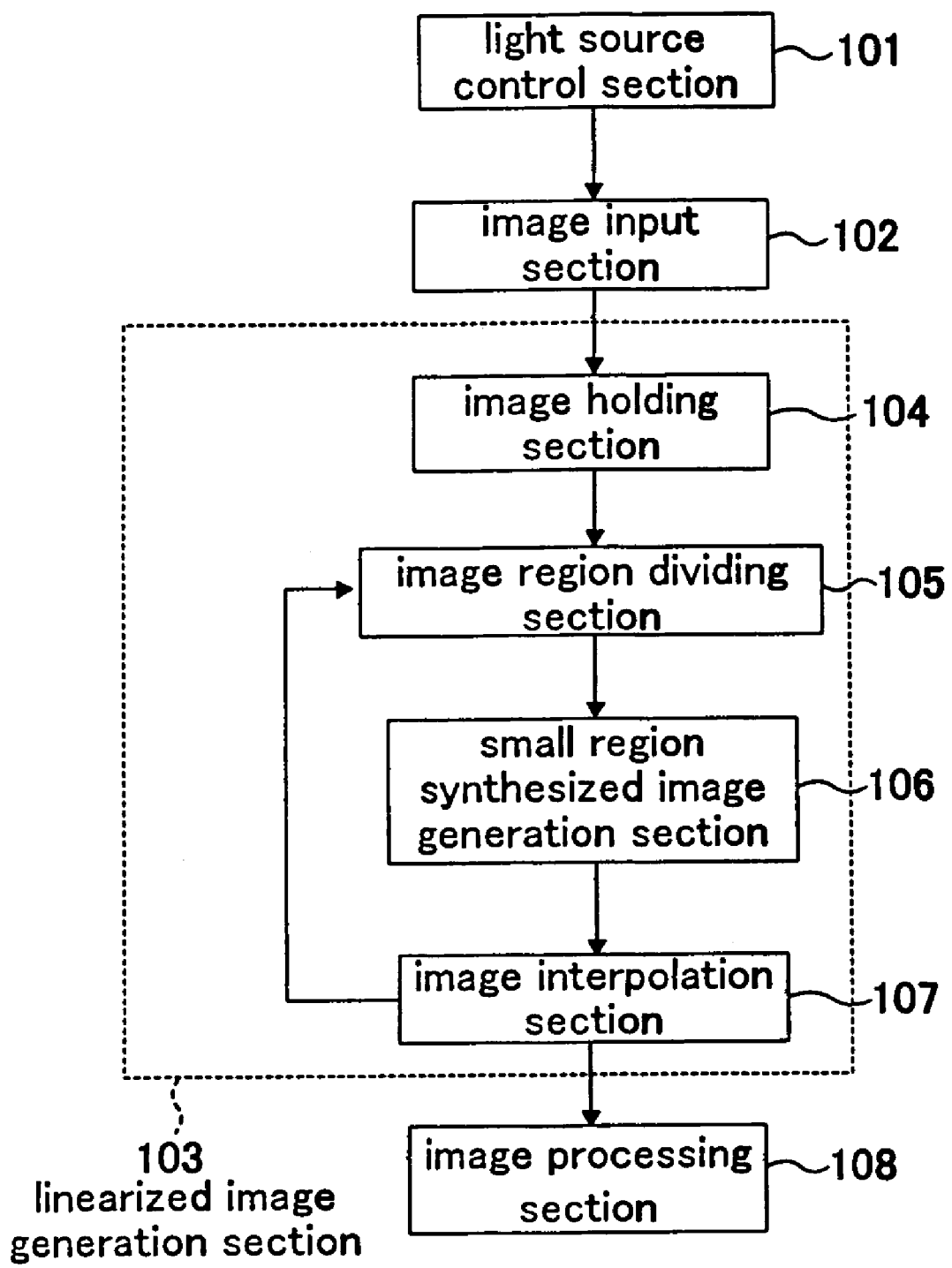
FIG. 1 is a constitutional view of an image processing apparatus according to Embodiment 1 of the present invention.

A first aspect of the present invention provides an image processing method including: a first step of obtaining a plurality of input images obtained by shooting a same object; a second step of dividing each of the obtained input images into a plurality of small regions; a third step of generating a base image of each of the divided small regions using the input images; and a fourth step of generating a base image of a small region having been impossible to generate a base image by interpolation processing using a computed value for base image generation in neighbor small regions, the small region and the neighbor small regions being of the divided small regions, wherein a linearized image of the object under given lighting condition is generated using the generated base images.

A second aspect of the present invention provides the image processing method of the first aspect, further including the step of: performing image processing using the generated linearized image.

A third aspect of the present invention provides the image processing method of the second aspect, wherein the image processing includes at least one of: region classification based on an optical characteristic of an object; object identification; object 3D position/shape estimation.

A fourth aspect of the present invention provides the image processing method of the first aspect, wherein the plurality of images are obtained by shooting the object while changing lighting condition.

A fifth aspect of the present invention provides the image processing method of the fourth aspect, wherein a light source is controlled so that a shadow cast on the object is different in position from each other in the plurality of images.

A sixth aspect of the present invention provides the image processing method of the first aspect, wherein the plurality of images are obtained by shooting the object when variation in lighting condition is detected.

A seventh aspect of the present invention provides the image processing method of the sixth aspect, wherein when a shadow cast on the object varies, it is detected that the lighting condition varies.

An eighth aspect of the present invention provides the image processing method of the first aspect, wherein the third step includes the steps of: selecting N base original images from K input images (N is a positive integer smaller than K); determining a linearization coefficient set for each remaining (K-N) input image using the N base original images; and generating N base images by linearizing the N base original images using the determined linearization coefficient set.

A ninth aspect of the present invention provides the image processing method of the eighth aspect, wherein N is 3.

A tenth aspect of the present invention provides the image processing method of the eighth aspect, wherein the linearization coefficient set determining step includes: repeating candidate obtaining processing for each input image where a predetermined number of points are selected at random from the input image, a linearization coefficient set candidate is obtained from the predetermined number of points, and a value of an evaluation index indicating likelihood thereof is obtained, and determining a linearization coefficient set candidate of which value of the evaluation index is most likely as the linearization coefficient set of the input image.

An eleventh aspect of the present invention provides the image processing method of the tenth aspect, wherein the candidate obtaining processing includes judging whether the predetermined number of points are different in normal direction from each other, and when it is judged that the predetermined number of points selected are same in normal direction in every repetition, the small region is judged as impossible to generate a base image.

A twelfth aspect of the present invention provides the image processing method of the eighth aspect, wherein the fourth step includes interpolating a linearization coefficient set of the small region using a linearization coefficient set obtained in the neighbor small regions.

A thirteenth aspect of the present invention provides the image processing method of the twelfth aspect, wherein in the interpolation, a value of an evaluation index for a linearization coefficient set of each neighbor small region is used in addition.

A fourteenth aspect of the present invention provides the image processing method of the eighth aspect, wherein the third step includes generating a linearized image of which lighting condition is the same as that of at least one of the input images, using the N base images.

A fifteenth aspect of the present invention provides the image processing method of the first aspect, wherein in the second step, a size of the small regions is determined based on at least one of an upper limit value of light expanse that can be regarded as a parallel light source, a distance between a light source and the object, a distance between a camera and the object, and a camera parameter.

A sixteenth aspect of the present invention provides the image processing method of the first aspect, wherein a size of the small region of which base image has been ungenerated is changed and the third step is executed again, instead of the interpolation in the fourth step.

A seventeenth aspect of the present invention provides the image processing method of the first aspect, wherein a position of the small region of which base image has been ungenerated is changed and the third step is executed again, instead of the interpolation in the fourth step.

An eighteenth aspect of the present invention provides the image processing method of the first aspect, wherein the plurality of input images are shot under environment where a plurality of light sources exist.

A nineteenth aspect of the present invention provides the image processing method of the first aspect, wherein the plurality of input images are shot in a home.

A twentieth aspect of the present invention provides the image processing method of the first aspect, wherein the method is executed by a robot that performs work in a home.

A twenty-first aspect of the present invention provides the image processing method of the first aspect, wherein the object is a face of a person.

A twenty-second aspect of the present invention provides the image processing method of the first aspect, wherein the method is utilized for biometrics authentication.

A twenty-third aspect of the present invention provides the image processing method of the second aspect, wherein the image processing is processing for estimating position of a protrusion or a dimple included in the object.

A twenty-fourth aspect of the present invention provides an image processing apparatus including: an image input section that obtains a plurality of images obtained by shooting a same object; an image region dividing section that divides each of the input images obtained by the image input section into a plurality of small regions; a small region synthesized image generation section that generates a base image of each of the small regions divided by the image region dividing section using the input images; and an image interpolation section that generates a base image of a small region having been impossible to generate a base image in the small region synthesized image generation section by interpolation processing using a computed value for base image generation in neighbor regions near to the small region, the small region and the neighbor small region being of the partitioned small regions, wherein a linearized image of the object under given lighting condition is generated using the generated base images.

A twenty-fifth aspect of the present invention provides an image processing program for allowing a computer to execute image processing, which allows a computer to execute the steps of: dividing a plurality of input images obtained by shooting a same object into a plurality of small regions; generating a base image of each of the divided small regions using the input images; generating a base image of a small region having been impossible to generate a base image by interpolation processing using a computed value for base image generation in neighbor small regions near to the small region, the small region and the neighbor small region being of the partitioned small regions; and generating a linearized image of the object under given lighting condition using the generated base images The embodiments of the present invention will be described below with reference to the drawings.

Embodiment 1

FIG. 1 is a block diagram showing a constitution of an image processing apparatus that executes an image processing method according to Embodiment 1 of the present invention. This image processing apparatus includes: a light source control section 101 that controls a position of a light source; an image input section 102 that inputs a plurality of images in a situation in which lighting condition is changed by the light source control section 101; and a linearized image generation section 103 that generates a linearized image using a plurality of images which are different from each other in lighting condition and are input through the image input section 102.

The linearized image generation section 103 includes: an image holding section 104 that holds a plurality of images input; an image region dividing section 105 that partitions an input image that the image holding section 104 holds into small regions; a small region synthesized image generation section 106 that generates base images as a synthesized image of each partitioned small region from a plurality of images; and an image interpolation section 107 that generates by interpolation base images of small regions of which synthesized image cannot be generated. The linearized image generation section 103 generates a linearized image, which is a synthesized image in an ideal state in which specular reflection is not caused, using the generated base images of the small regions.

Further, there may be provided an image processing section 108 that performs image processing, such as region classification based on an optical characteristic, object identification, and 3D position/shape estimation of an object, utilizing the generated linearized image.

Figure 2:
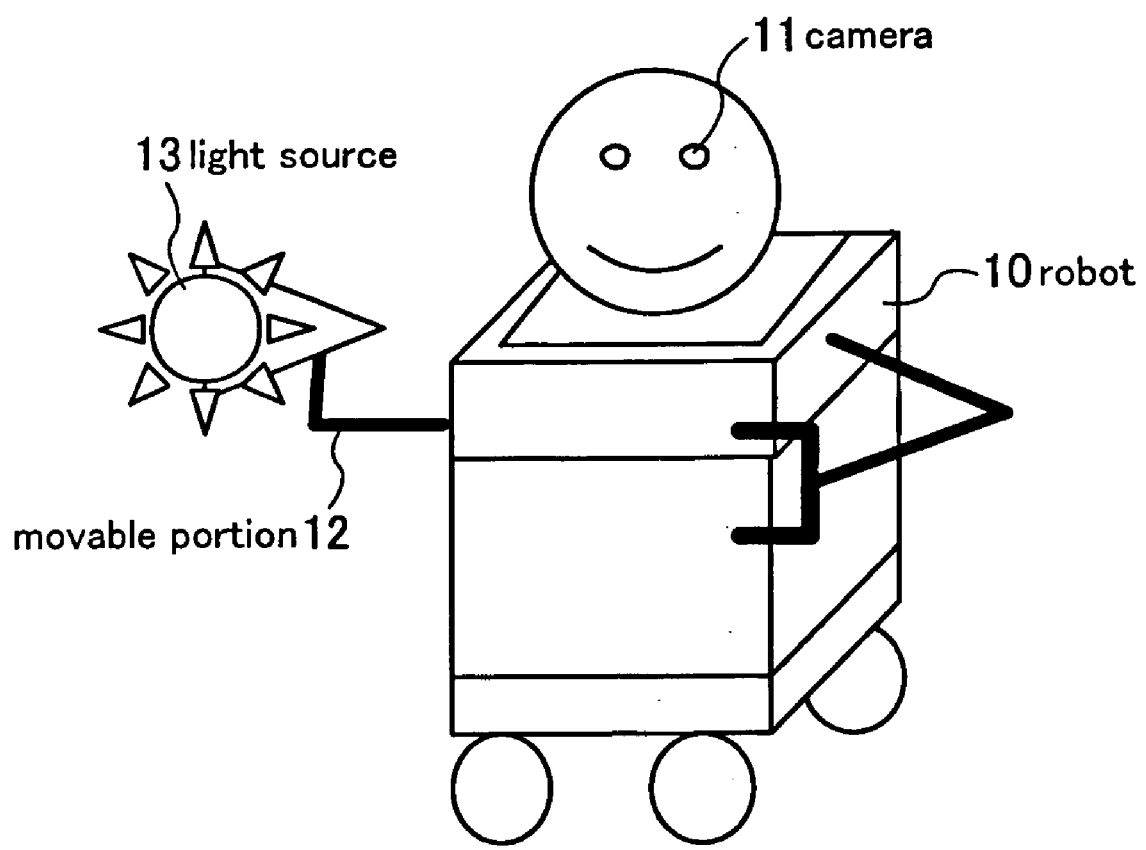
FIG. 2 is a schematic view of a home use working robot.

Herein, the image processing apparatus of FIG. 1 is provided in a home use working robot as in FIG. 2. In FIG. 2, a robot 10 includes a camera 11 that performs shooting, and a light source 13 mounted at a movable portion 12 such as an arm. The light source 13 may be a point light source or an area light source such as a liquid crystal display.

The light source control section 101 controls the motion of the movable portion 12 of the robot 10 to change the position and the posture of the light source 13, thereby changing the lighting condition. The image input section 102 shoots a plurality of images of a given object using the camera 11 while the light source control section 101 changes the lighting condition. The light source 13 may be controlled, for example, so as to change the position of a shadow appearing on the object. The image holding section 104 sequentially holds images that the image input section 102 inputs to store a plurality of images different in lighting condition for preparation for the following processing. It is noted that the image holding section 104 may store base images and linearized images generated by the linearized image generation section 103 in addition to the input images.

<Small Region Dividing>

The image region dividing section 105 partitions an input image held by the image holding section 104 into small regions each as a unit for generating base images. The partition into small regions is performed in order to enable linearized image generation on the assumption that the lighting condition is a parallel light source.

The relationship between a parallel light source and a near point light source will be described first. The parallel light source is a light source of which expanse θ of light made incident to an object within a shooting range is limited to a very narrow range (θ≒0). On the other hand, the near point light source is a light source of which light reaches an object while expanding. Accordingly, the same light source can be regarded as either a parallel light source or a near point light source according to a distance between the light source and an object or an incident range.

Figure 3:
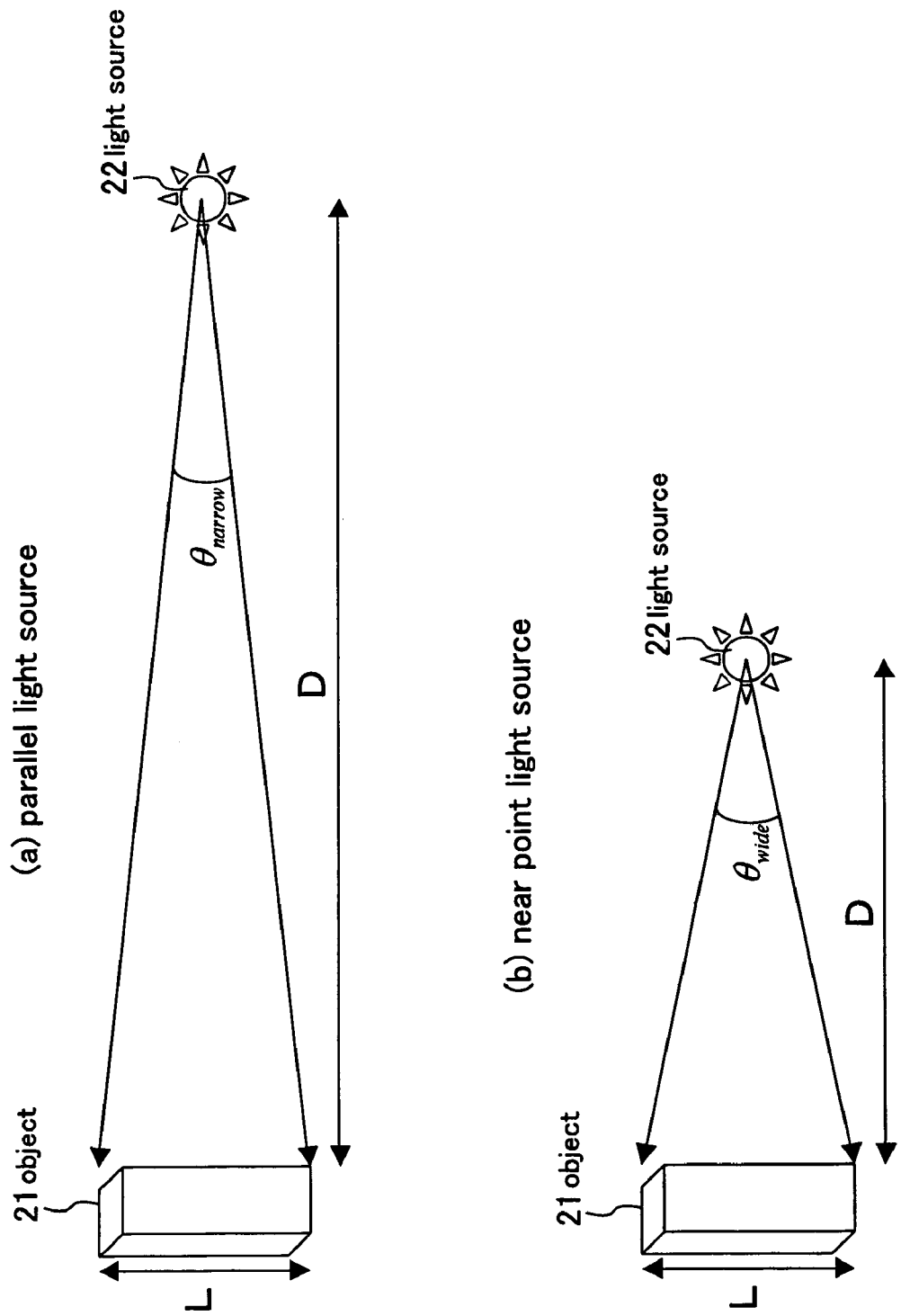
FIG. 3 is an illustration for explaining difference between a parallel light source and a point light source.

Namely, as shown in FIG. 3(*a*), when a distance D between a light source 22 and an object 21 is sufficiently long in comparison with the length L of the object 21, the light expanse $\theta_{narrow}$ becomes sufficiently small ($\theta_{narrow}$≒0), so that all points on the object 21 illuminated by the light source 22 are almost equal to one another in distance from the light source 22 and the light source can be regarded as a parallel light source. On the other hand, as shown in FIG. 3(*b*), when the distance D between the light source 22 and the object 21 is not sufficiently long in comparison with the length L of the object 21, incident light expanse $\theta_{wide}$ becomes large ($\theta_{wide}$≠0). Accordingly, the light source 22 cannot be regarded as a parallel light source but regarded as a near point light source.

In other words, a near point light source can be processed on the assumption that it is a parallel light source by changing the length of an object and the distance between a light source and the object.

In this point of view, in the present embodiment, an input image is divided into small regions so that the lighting condition of the input image can be regarded as a parallel light source and image processing is performed to each divided small region.

Suppose, as shown in FIG. 4(*a*), that a ball 25 placed on a table 24 is illuminated by the light source 22 and is shot by a camera 23 over the table 24. In so doing, an image as shown in FIG. 4(*b*) is obtained. The light expanse $\theta_w$ is so sufficiently wide that the light source 22 is regarded as a near point light source.

Then, the image is divided into small regions as shown in FIG. 5(*a*) and the processing is performed to each small region. FIG. 5(*b*) shows a field-of-view range An corresponding to a small region n indicated in FIG. 5(*a*). It is understood from FIG. 5(*b*) that the light expanse $\theta_n$ becomes sufficiently smaller than $\theta_w$ by partitioning the image into the small regions. In other words, when an image is partitioned so small that the light expanse $\theta_n$ becomes sufficiently small to a degree that a parallel light source can be assumed, image processing assuming the parallel light source can be performed to an image even shot under a near point light source.

Herein, it is premised that an object is a plane, which is an object without protrusions and dimples and of which shape continues smoothly. In FIG. 5(*b*), the light expanse satisfies the following expression, wherein D is a distance between the light source 22 and the object plane and Ls is a length of one side of the object plane in the field-of-view range An.

$$\theta_n \leq 2\cdot\tan^{-1}(Ls/2\cdot D)) \quad \text{(Expression 5)}$$

Herein, if a condition for assuming a parallel light source is known as follows, for example:

$$\theta_n \leq \theta_{Th}$$

a parallel light source can be assumed when the following condition is satisfied.

$$2\cdot\tan^{-1}(Ls/(2\cdot D)) \leq \theta_{Th}$$

$$\therefore Ls \leq 2\cdot D\, \tan(\theta_{Th}/2) \quad \text{(Expression 6)}$$

In short, the small regions are set so that Ls=2·D tan($\theta_{Th}$/2).

Further, for determining the size of the small regions of an image according to the length Ls of one side of the object plane, only a camera parameter and the distance between the camera and the object are required to be known.

It is understood from (Expression 6) that the small regions are to be set based on the distance D between the light source and the object. Specifically, the small region is set comparatively large when the distance D is long and is set comparatively small when the distance D is short.

In the parallel light source, it is assumed that all points of an object illuminated by a light source are equal to one another in illuminance. This assumption is not held in an actual light source such as a point light source because of light decay. However, in a region where the distance between the light source and the object is equal, the degree of light decay becomes equal, and in turn, the illuminance of the light source becomes equal. In this connection, the small regions are desirable to be set region by region where the distance from the light source is substantially equal.

The camera parameter includes intrinsic parameters such as a focal length (a distance between a projection center and a plane to be shot), a coefficient of lens distortion, a distortion center of an image, and an aspect ratio, and extrinsic parameters such as focal position, and posture (direction) of a camera. These parameters must be estimated in advance in performing image processing. The intrinsic parameters can be obtained in advance by employing a method disclosed in "An Efficient and Accurate Camera Calibration Technique for 3D Machine Vision," Roger Y. Tsai, Processings of IEEE Conference on Computer Vision and Pattern Recognition, pp. 364-374, 1986, and the like. Also, the extrinsic parameters can be obtained by employing a known method disclosed in Japanese Patent Application Laid Open Publication No. 5-38688A, for example.

Further, the distance between the camera and the object can be obtained easily. For example, in an article management system disclosed in Japanese Patent Application No. 2003-057886, an image pattern is provided in a robot and pattern matching is performed to an image shot by a camera installed on the ceiling or the like to recognize the position of the robot. Also, a position of an object is recognized by a method such as a background difference. From the result of this processing series, the distance between the camera mounted to the robot and the object can be detected easily.

As described above, setting of the light expanse $\theta_{Th}$ with respect to a region to be processed leads to size setting of the small regions. The light expanse $\theta_{Th}$ may be set to about 5 degrees, for example. Wherein, this value is not limited.

<Generation of Base Image and Linearized Image>

The small region synthesized image generation section 106 generates a synthesized image of each small region divided by the image region partition section 105 based on a plurality of input images held in the image holding section 104. The image holding section 104 holds K (K is a positive integer) input images and the processing to each small region is performed using the K input images.

Herein, a base image and a linearized image are generated based on the method of the aforementioned third conventional example while employing RANSAC. The sequence thereof is that: (1) linearization coefficient sets are computed; (2) base images are generated; and (3) an input image is linearized. The processing to all the partitioned small regions leads to generation of a linearized image corresponding to the input image.

(1) Computation of Linear Coefficient Set

First, three base original images $I_1, I_2, I_3$ are selected from the K input images. The selection method will be described later. Linearization coefficient sets of the remaining input images $I_k$ (k=4, 5, 6, ..., K) for respectively expressing them are computed from the base original images $I_1, I_2, I_3$. Herein, RANSAC is employed.

Figure 6:
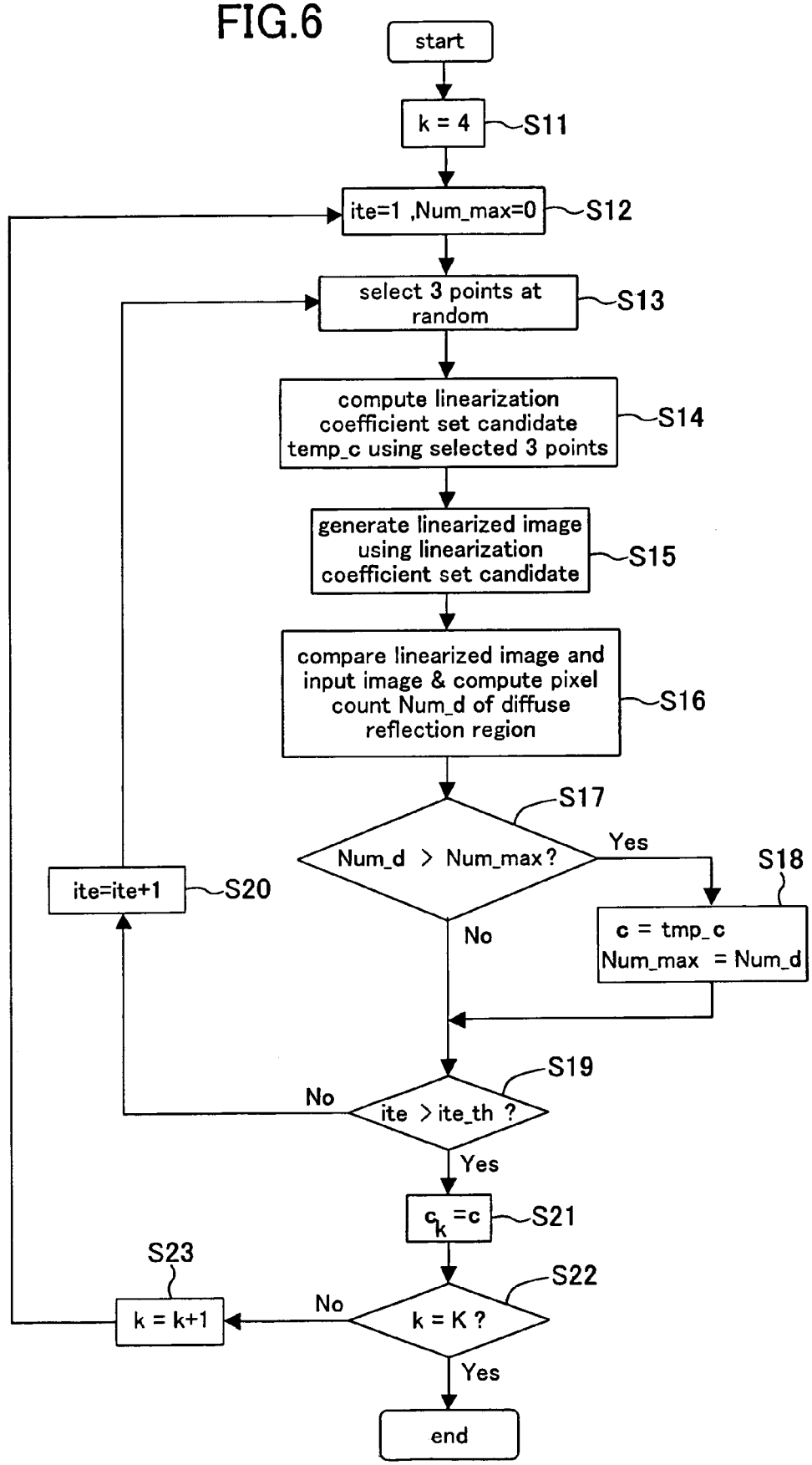
FIG. 6 is a flowchart depicting computation processing of a linearization coefficient set in Embodiment 1 of the present invention.

FIG. 6 is a flowchart depicting the computation processing of linearization coefficient sets. As shown in FIG. 6, 4 is assigned to a counter k as the initial processing (step S11), and 1 and 0 are assigned to a counter ite and to Num_max, respectively (step S12). Wherein, k is a counter indicating an input image under processing, ite is a counter indicating the number of iteration of the computation. Num_max will be described later. The number of iteration of the processing to be performed is set in advance as ite_th.

Next, three points are selected at random within the image region of an input image k (step S13). The three points selected at this time are $(x_1, y_1), (x_2, y_2)$ and $(x_3, y_3)$. A linearization coefficient set candidate tmp_c is computed utilizing the thus selected three points (step S14). It can be obtained by computing the following equation.

$$\begin{bmatrix} i_{1(x_1,y_1)} & i_{2(x_1,y_1)} & i_{3(x_1,y_1)} \\ i_{1(x_2,y_2)} & i_{2(x_2,y_2)} & i_{3(x_2,y_2)} \\ i_{1(x_3,y_3)} & i_{2(x_3,y_3)} & i_{3(x_3,y_3)} \end{bmatrix} \cdot tmp\_c = \begin{bmatrix} i_{k(x_1,y_1)} \\ i_{k(x_2,y_2)} \\ i_{k(x_3,y_3)} \end{bmatrix} \quad \text{(Expression 7)}$$

$$\therefore tmp\_c = \begin{bmatrix} i_{1(x_1,y_1)} & i_{2(x_1,y_1)} & i_{3(x_1,y_1)} \\ i_{1(x_2,y_2)} & i_{2(x_2,y_2)} & i_{3(x_2,y_2)} \\ i_{1(x_3,y_3)} & i_{2(x_3,y_3)} & i_{3(x_3,y_3)} \end{bmatrix}^{-1} \begin{bmatrix} i_{k(x_1,y_1)} \\ i_{k(x_2,y_2)} \\ i_{k(x_3,y_3)} \end{bmatrix} = D^{-1} \begin{bmatrix} i_{k(x_1,y_1)} \\ i_{k(x_2,y_2)} \\ i_{k(x_3,y_3)} \end{bmatrix}$$

Wherein, $$D = \begin{bmatrix} i_{1(x_1,y_1)} & i_{2(x_1,y_1)} & i_{3(x_1,y_1)} \\ i_{1(x_2,y_2)} & i_{2(x_2,y_2)} & i_{3(x_2,y_2)} \\ i_{1(x_3,y_3)} & i_{2(x_3,y_3)} & i_{3(x_3,y_3)} \end{bmatrix}$$

Wherein, $i_{k(u, v)}$ is a pixel value of a pixel (u, v) in the input image k.

Subsequently, a linearized image is generated from the following expression utilizing the thus obtained linearization coefficient set candidate (step S115).

$$I_k^L = tmp\_c^1 I_1 + tmp\_c^2 I_2 + tmp\_c^3 I_3 \quad \text{(Expression 8)}$$

Wherein, tmp_c=[tmp_c$^1$ tmp_c$^2$ tmp_c$^3$]

Next, the image region of the input image k is classified using (expression 4) and the linearized image $I_k^L$ generated from (Expression 8), based on an optical characteristic. Then, a diffuse reflection region in the image is obtained and the pixel count Num_d of pixels belonging to the diffuse reflection region is computed (step S16). The steps S13 through S16 correspond to the candidate computation processing.

When taking into consideration that a diffuse reflection region is dominant in an input image, it is thought that the pixel count Num_d in the diffuse reflection region becomes larger as the generated linearization coefficient set candidate tmp_c is more suitable. Namely, with the use of the pixel count Num_d in the diffuse reflection region as an evaluation index, a linearization coefficient set candidate tmp_c that makes the pixel count the largest is detected as an optimum linearization coefficient set. Then, the largest pixel count Num_d obtained through the iteration of the processing is set as Num_max and a linearization coefficient set candidate tmp_c at that time is held as c.

Specifically, the pixel count Num_d computed in the step S16 is compared with the maximum value Num_max until then (step S17). When Num_d is larger (Yes in S17), the value of Num_max and c are replaced by Num_d and tmp_c, respectively (step S18), and next random sampling is prepared (step S19). Otherwise, when Num_d is smaller (No in S17), Num_d and c are not replaced and the routine proceeds to the step S19.

In the step S19, check is performed as to whether the random sampling has been performed predetermined times (ite_th times) or not. If the random sampling has not been performed predetermined times yet (No in S19), the counter ite is incremented by 1 (step S20) and the random sampling is performed again (step S13). Otherwise, if the random sampling has been already performed predetermined times (Yes in S19), c is selected as a linearization coefficient set $c_k$ of the input image k (step S21) and the processing to the input image k is terminated.

At this time, if any input image that has not been processed yet is present (No in S22), the counter k is incremented by 1 (step S23) and the processing to the next input image is performed (step S12). Otherwise, if the processing has been performed to all the input images (Yes in S22), the processing is terminated.

It is noted that an image with less influence of specular reflection and shadows is preferably selected as a base original image herein. In this connection, it is preferable to set an input image including many pixels having not so extremely high and low intensities as a base original image, for example.

Further, it is preferable to select three input images of which lighting condition is largely different from one another as the base original images. For attaining this, three input images in which pixel values of several points in each image are largely different from one another may be selected, for example. Alternatively, the lighting condition is estimated and three input images different in position of the light source and in intensity as largely as possible may be selected, for example. As methods for estimating lighting condition, there are well known methods such as a method utilizing a spherical mirror and a method of shooting a lighting condition while directing a wide-angle camera upward to the ceiling. An object reflected on the surface of the sphere of which surface is made of a mirror material serves as information on a light source of which light is made incident at the position where the sphere is placed. Accordingly, an image of such a spherical mirror is shot by a camera and is analyzed to estimate the position of the light source and an irradiation intensity distribution (for example, "Spectral Measurement of Ambient Lighting and its Application to Image Rendering," Norihiro Tanak and Masaharu Tominaga, Meeting on Image Recognition and Understanding (MIRU2002), vol. II, pp. 99-1004, 2000)

(2) Generation of Base Image

Next, the base original image is linearized using the linearization coefficient set $C_k$ obtained in the section (1) and each input image $I_k$ to generate a base image. Herein, RANSAC is employed also for performing pixel by pixel processing.

Now, (Expression 3) is referred to again. When (Expression 3) is adopted to a pixel m of the input image k, the following equation is obtained.

$$i_{k(m)}^L = c_k^1 i_{1(m)}^B + c_k^2 i_{2(m)}^B + c_k^3 i_{3(m)}^B \qquad \text{(Expression 9)}$$

Wherein, $i_{(m)}^B = [i_{1(m)}^B \; i_{2(m)}^B \; i_{3(m)}^B]$ are pixel values in the base images at the pixel m, and are called base pixel values. In this expression, the linearization coefficient set $c_k = [c_k^1 \; c_k^2 \; c_k^3]^T$ has been already determined by the processing in the section (1). Accordingly, if the pixel m of the input image k satisfies $i_{k(m)} = i_{k(m)}^L$, namely, if it causes diffuse reflection, unknowns in the (Expression 9) are only three, the base pixel values $i_{(m)}^B = [i_{1(m)}^B \; i_{2(m)}^B \; i_{3(m)}^B]$.

Under the circumstances, if three images in which the pixel m is present in a diffuse reflection region can be selected from the input image k (k=4, 5, 6, ..., K), (Expression 9) is solved necessarily. However, which pixel causes diffuse reflection is not known actually. Therefore, the random sampling by RANSAC is utilized and the pixel count in the diffuse reflection region is used as well as in the processing in the section (1) to obtain the base pixel values.

Figure 7:
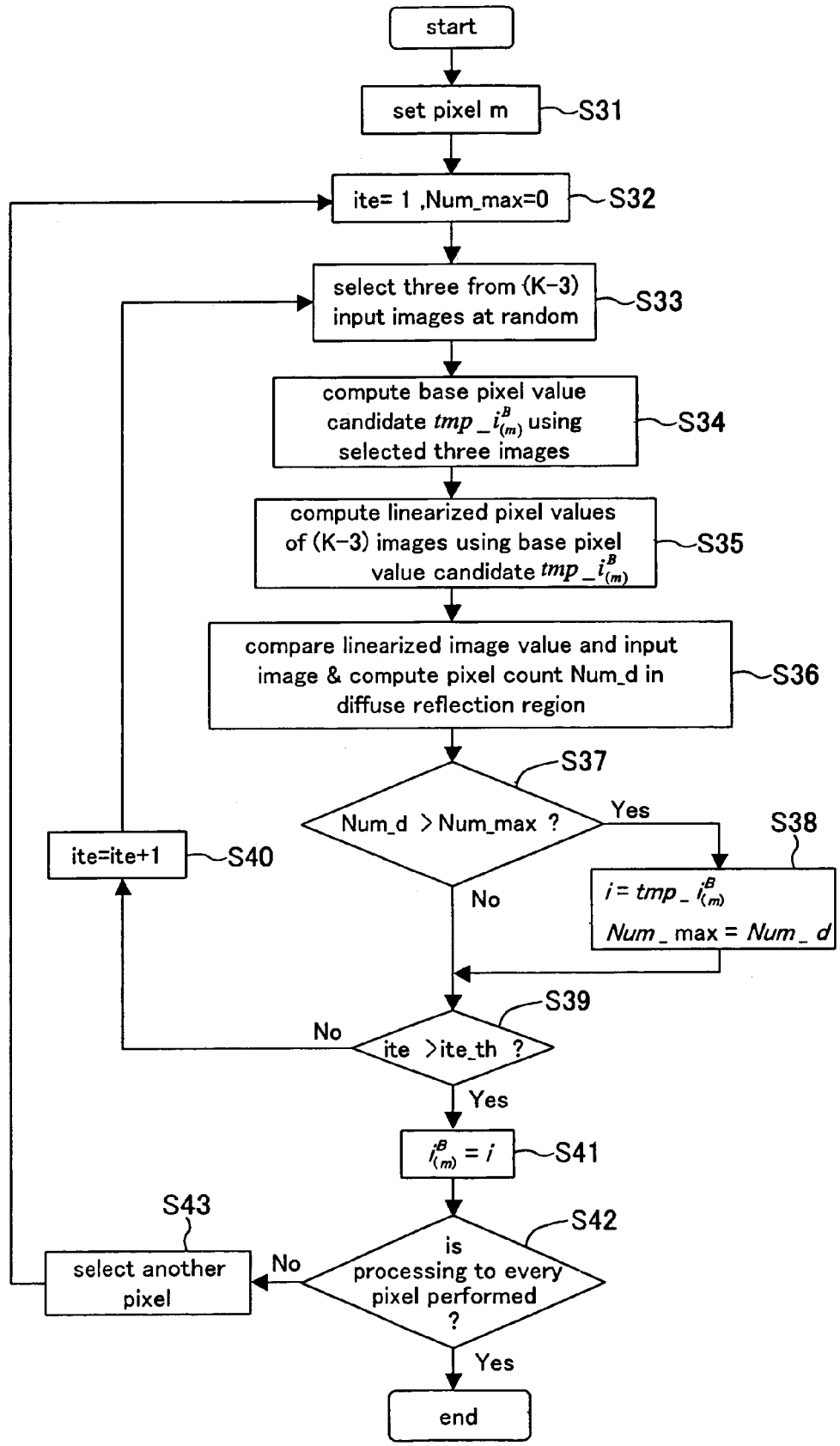
FIG. 7 is a flowchart depicting generation processing of a base image in Embodiment 1 of the present invention.

FIG. 7 is a flowchart depicting generation processing of a base image. Different from the aforementioned computing processing of a linearization coefficient set, the processing is performed pixel by pixel. In other words, a base pixel value is obtained for each pixel under the scheme of RANSAC.

First, a pixel m to be processed is set (step S31). Next, 1 and 0 are assigned to the counter ite and Num_max, respectively, for initialization (step S32). The counter ite indicates the number of iteration of the computation, wherein the processing iteration times is set to be ite_th in advance. Num_max will be described later. Then, three input images are selected at random from the (K-3) input images of which linearization coefficient sets are already obtained (step S33). Wherein, the three selected input image are $k_1$, $k_2$, and $k_3$. When the pixel values of the thus selected three images are assigned in (Expression 9), the following equation is obtained.

$$\begin{bmatrix} c_{k_1(m)}^1 & c_{k_1(m)}^2 & c_{k_1(m)}^3 \\ c_{k_2(m)}^1 & c_{k_2(m)}^2 & c_{k_2(m)}^3 \\ c_{k_3(m)}^1 & c_{k_3(m)}^2 & c_{k_3(m)}^3 \end{bmatrix} \begin{bmatrix} \text{tmp\_i}_{1(m)}^B \\ \text{tmp\_i}_{2(m)}^B \\ \text{tmp\_i}_{3(m)}^B \end{bmatrix} = \begin{bmatrix} i_{k_1(m)} \\ i_{k_2(m)} \\ i_{k_3(m)} \end{bmatrix} \qquad \text{(Expression 10)}$$

Wherein, $\text{tmp\_i}_{(m)}^B = [\text{tmp\_i}_{1(m)}^B \; \text{tmp\_i}_{2(m)}^B \; \text{tmp\_i}_{3(m)}^B]^T$ become base pixel values when all of $i_{k1(m)}$, $i_{k2(m)}$, and $i_{k3(m)}$ are in a diffuse reflection region. Otherwise, it becomes a value of no concern. In this connection, $\text{tmp\_i}_{(m)}^B$ is called a base pixel value candidate. The base pixel value candidate $\text{tmp\_i}_{(m)}^B$ is computed by solving (Expression 10) (step S34). Namely:

$$\text{tmp\_i}_{(m)}^B = \begin{bmatrix} \text{tmp\_i}_{1(m)}^B \\ \text{tmp\_i}_{2(m)}^B \\ \text{tmp\_i}_{3(m)}^B \end{bmatrix} = \begin{bmatrix} c_{k_1(m)}^1 & c_{k_1(m)}^2 & c_{k_1(m)}^3 \\ c_{k_2(m)}^1 & c_{k_2(m)}^2 & c_{k_2(m)}^3 \\ c_{k_3(m)}^1 & c_{k_3(m)}^2 & c_{k_3(m)}^3 \end{bmatrix}^{-1} \begin{bmatrix} i_{k_1(m)} \\ i_{k_2(m)} \\ i_{k_3(m)} \end{bmatrix} = E^{-1} \begin{bmatrix} i_{k_1(m)} \\ i_{k_2(m)} \\ i_{k_3(m)} \end{bmatrix} \qquad \text{(Expression 11)}$$

Wherein, $$E = \begin{bmatrix} c_{k_1(m)}^1 & c_{k_1(m)}^2 & c_{k_1(m)}^3 \\ c_{k_2(m)}^1 & c_{k_2(m)}^2 & c_{k_2(m)}^3 \\ c_{k_3(m)}^1 & c_{k_3(m)}^2 & c_{k_3(m)}^3 \end{bmatrix}$$

Subsequently, a linearized pixel value $i_{k(m)}^L$ is generated for each of the (K-3) input images utilizing the thus obtained base pixel value candidate $\text{tmp\_i}_{(m)}^B$ from the following expression (step S35).

$$i_{k(m)}^L = c_k^1 \text{tmp\_i}_{1(m)}^B + c_k^2 \text{tmp\_i}_{2(m)}^B + c_k^3 \text{tmp\_i}_{3(m)}^B \qquad \text{(Expression 12)}$$

Wherein, k=4, 5, 6, ..., K

Further, the pixel value of the input image k is classified based on the optical characteristic using (Expression 4) and the linearized pixel value $i_{k(m)}^L$ obtained from (Expression 12). Then, the pixel count Num_d in the diffuse reflection region in the classified $i_{k(m)}$ (k=4, 5, 6, ..., K) is computed (step S36).

When taking into consideration that a diffuse reflection region is dominant in an input image, it is thought that the pixel count Num_d in the diffuse reflection region becomes larger as the generated linearized image candidate is more suitable. Namely, with the use of the pixel count Num_d in the diffuse reflection region as an evaluation index, a base pixel value candidate that makes the pixel count the largest is detected as an optimum base pixel value. Then, the largest pixel count Num_d obtained through the iteration of the processing is set as Num_max and a base image value candidate $\text{tmp\_i}_{(m)}^B$ at that time is held as i.

Specifically, the pixel count Num_d computed in the step S36 is compared with the maximum value Num_max until then (step S37). When Num_d is larger (Yes in S37), the value of Num_max and i are replaced by Num_d and $\text{tmp\_i}_{(m)}^B$, respectively (step S38), and next random sampling is prepared (step S39). Otherwise, when Num_d is smaller (No in S37), Num_d and i are not replaced and the routine proceeds to the step S39.

In the step S39, check is performed as to whether the random sampling has been performed predetermined times (ite_th times) or not. If the random sampling has not been performed predetermined times yet (No in S39), the counter ite is incremented by 1 (step S40) and the random sampling is performed again (step S43). Otherwise, if the random sampling has been already performed predetermined times (Yes in S39), i is selected as a base pixel value $i_{(m)}^B$ of the pixel m (step S41) and the processing to the pixel m is terminated.

At this time, if any pixel that has not been processed yet is present (No in S42), the counter m is incremented by 1

(step S43) and the processing to the next pixel is performed (step S32). Otherwise, if the processing has been performed to all the pixels (Yes in S42), the processing is terminated.

The above series of processing is performed to all the pixels of all the partitioned images to generate each base image.

(3) Linearization of Input Image

Next, a linearized image $I_k^L$ of the input image k is generated in accordance with (Expression 3) by linearly combining the base images $I_1^B$, $I_2^B$, $I_3^B$ using the linearization coefficient set $c_k$ of each input image.

$$I_k^L = c_k^1 I_1^B + c_k^2 I_2^B + c_k^3 I_3^B \quad \text{(Expression 3)}$$

As described above, the linearized image is an image observed at the time when the image is in an ideal state in which specular reflection is not caused. Hence, image processing utilizing the linearized image enables image processing with no influence of specular reflection and shadows involved.

It is noted that the linearization coefficient set $c_k$ obtained in the processing in the section (1) may be used directly, or may be re-computed by the processing in the section (1) using the base images $I_1^B$, $I_2^B$, $I_3^B$, rather than the input images $I_1$, $I_2$, $I_3$.

The above described processing attains generation of a linearized image of an image held in the image holding section 104.

It is noted that the processing up to input image linearization is described here, but the processing may be terminated at the base image generation in the section (2). Holding the base images by the image holding section 104 enables generation of a linearized image only by performing the processing in the section (3) to an image input through the image input section 102.

<Interpolation Processing>

As described above, when an image is divided into small regions for processing, images can be coped with by the same manner as the third conventional example on the assumption that a light source, which may be a point light source though, is a parallel light source. However, the image partition into small regions involves the following problems.

The third conventional example stands on the premise that three or more pixels that satisfy the following prerequisites are present.

The pixels have the normal directions different from one another.

The pixels are in a diffuse reflection region.

When the former prerequisite is not satisfied, the matrix D in (Expression 7) and the matrix E in (Expression 11) degenerate, which in turn disables any solution of (Expression 7) and (Expression 8) to be obtained. Also, when the latter prerequisite is not satisfied, the pixel count in a diffuse reflection region used as an evaluation function in RANSAC becomes always 0 due to the absence of a diffuse reflection region from the beginning, and therefore, it cannot function as the evaluation function. In consequence, partition into small regions serves as a factor of increasing possibility that a region not satisfying these prerequisites is present.

Figure 8:
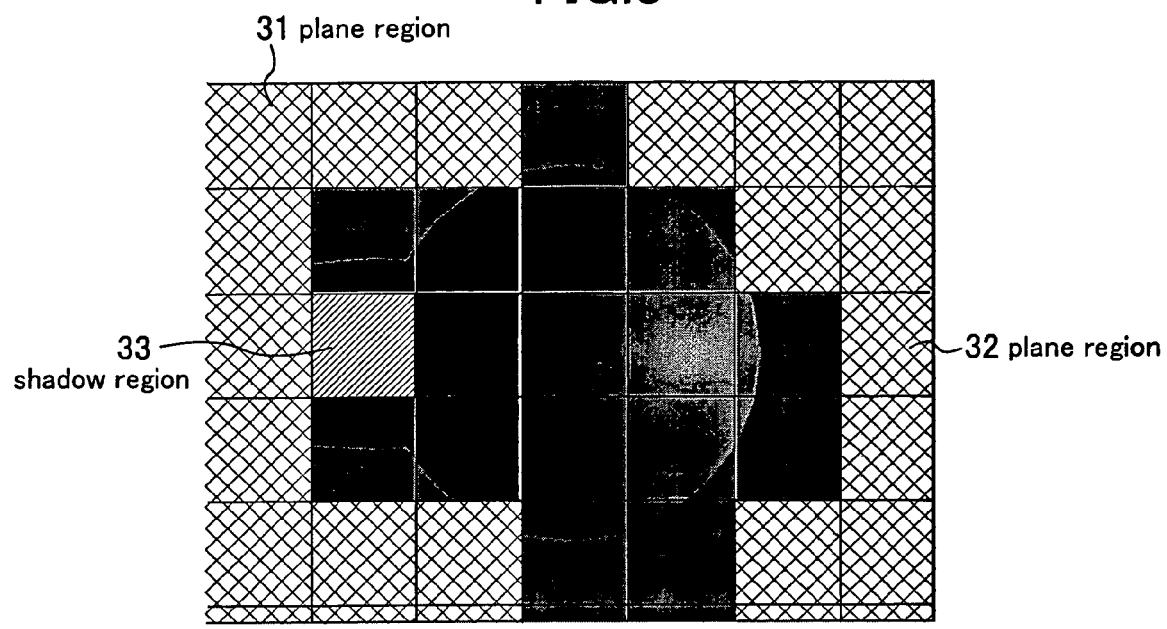
FIG. 8 is a view showing the result when the third conventional example is applied to FIG. 5($a$).

FIG. 8 indicates the result of application of the third conventional example in each small region partitioned as in FIG. 5(*a*). In each plane regions 31, 32, within which only one plane is present and in which the normal direction of almost all the pixel is the same, a linearized image cannot be generated. In a shadow region 33, within which a diffuse reflection region is not included and only a shadow or specular reflection is present, a solution cannot be obtained, also. In this way, the partition into small regions does not necessarily enable generation of base images and linearized images of all of the small regions, and therefore, and there may be a case where base images and linearized images can be generated for only a part of a whole image while they cannot be generated for the other part thereof.

In the present invention, for a small region of which base image and linearized image cannot be generated in the small region synthesized image generation section 106, the image interpolation section 107 generates a base image and a linearized image by interpolation. First, a hypothesis as follows is formulated.

In each small region into which an image is partitioned, a linearization coefficient set correlates with linearization coefficient sets of neighbor small regions.

When taking into consideration that an incident angle of light in each small region varies continuously, this hypothesis is proper. The hypothesis leads to the following expression.

$$I_{k(x,y)}^L = c_{k(x,y)}^1 I_{1(x,y)}^B + c_{k(x,y)}^2 I_{2(x,y)}^B + c_{k(x,y)}^3 I_{3(x,y)}^B \quad \text{(Expression 13)}$$

Wherein, $$c_{k(x,y)}^1 = f(c_{k(x-1,y-1)}^1, c_{k(x-1,y)}^1, c_{k(x-1,y+1)}^1, c_{k(x,y-1)}^1, c_{k(x,y+1)}^1, c_{k(x+1,y-1)}^1, c_{k(x+1,y)}^1, c_{k(x+1,y+1)}^1)$$

$$c_{k(x,y)}^2 = f(c_{k(x-1,y-1)}^2, c_{k(x-1,y)}^2, c_{k(x-1,y+1)}^2, c_{k(x,y-1)}^2, c_{k(x,y+1)}^2, c_{k(x+1,y-1)}^2, c_{k(x+1,y)}^2, c_{k(x+1,y+1)}^2)$$

$$c_{k(x,y)}^3 = f(c_{k(x-1,y-1)}^3, c_{k(x-1,y)}^3, c_{k(x-1,y+1)}^3, c_{k(x,y-1)}^3, c_{k(x,y+1)}^3, c_{k(x+1,y-1)}^3, c_{k(x+1,y)}^3, c_{k(x+1,y+1)}^3)$$

Wherein, $I_{k(x,y)}^L$ is a linearized image of a small region (x, y) in an input image k (a region 41 of interest in FIG. 9), $I_{1(x,y)}^B$, $I_{2(x,y)}^B$, and $I_{3(x,y)}^B$ are images of the small region (x, y) in the three base images, $c_{k(x,y)} = [c_{k(x,y)}^1 \ c_{k(x,y)}^2 \ c_{k(x,y)}^3]^T$ is a linearization coefficient set of the small region (x, y) in the input image k. Namely, (Expression 13) indicates that "a linearization coefficient set of a given small region (x, y) can be generated by utilizing the linearization coefficient sets of eight neighbor regions (regions 42 in FIG. 9)."

Specifically, for a small region (region of interest) of which base image cannot be generated, a linearization coefficient set as a computed value for base image generation is obtained by the interpolation using the linearization coefficient sets of small regions in the neighborhood thereof to generate a base image and a linearized image. The method thereof will be described below.

1. Nearest Neighbor

First of all, it is premised as a prerequisite that a diffuse reflection region is dominant in a shot image compared with a specular reflection region. This is apparent from that specular reflection is caused only when a light source direction and a direction of a camera are in a relationship of regular reflection with respect to the normal direction of an object.

Figure 10:
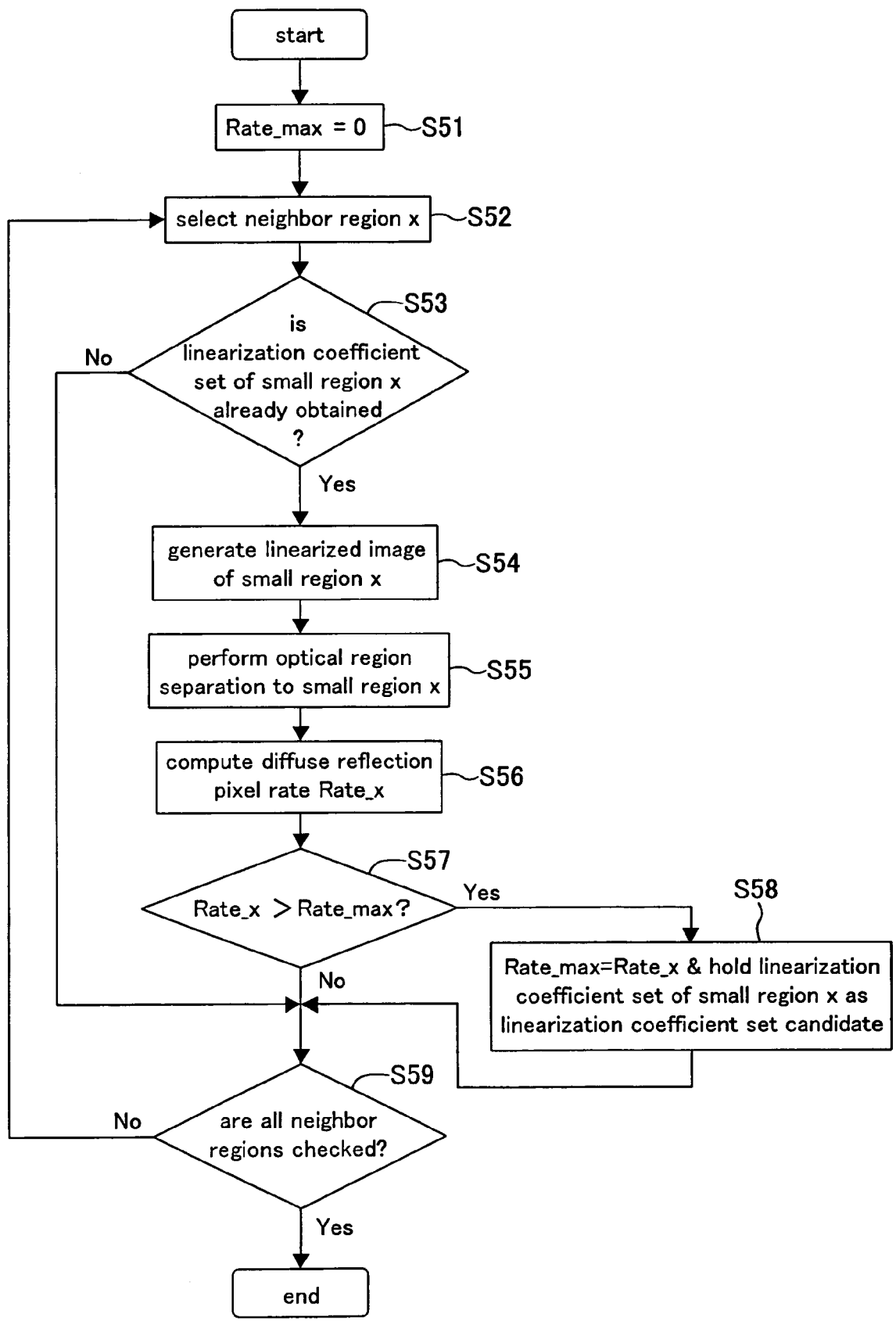
FIG. 10 is a flowchart depicting a method for selecting an optimum set from linearization coefficient sets of the neighbor regions.

FIG. 10 is a flowchart depicting a method for selecting, as a linearization coefficient set of a region of interest, an optimum set from the linearization coefficient sets of the neighbor regions. First, 0 is assigned to Rate_max for initialization (step S51). Then, one of the neighbor regions of the region of interest is selected (step S52). Check is performed as to whether a linearization coefficient set of the selected neighbor region x has been obtained or not (step S53). If it has not been obtained (No in S53), the check is performed to another neighbor region (step S59). If the check has ended for all the neighbor regions (Yes in S59), the processing is terminated.

On the other hand, the linearization coefficient set of the selected neighbor region x has been obtained (Yes in S53), a linearized image of the neighbor region x is generated using the already-obtained linearization coefficient set and (Expression 3) (step S54). Further, region classification based on the optical characteristic is performed to the image of the neighbor region x using the thus generated linearized image and (Expression 4) (step S55). Then, a diffuse reflection pixel rate Rate_x defined by the following expression is computed, wherein the thus obtained pixel counts of the respective regions of diffuse reflection, specular reflection, cast shadow, and attached shadow are Xd, Xs, Xc, and Xa, respectively, and the total pixel count in the neighbor region is Xall (step S56).

$$Rate\_x = Xd/(Xall-(Xc+Aa)) \quad \text{(Expression 14)}$$

The diffuse reflection pixel rate Rate_x defined by (Expression 14) indicates a ratio of a pixel count obtained by subtracting a pixel count of a region that is judged as a shadow region from the total pixel count to a pixel count of a region that is judged as a diffuse reflection region. Because a diffuse reflection region is dominant in an input image compared with a specular reflection, as described above, the diffuse reflection pixel rate Rate_x becomes larger as the obtained linearization coefficient set is more accurate. Namely, the diffuse reflection pixel rate Rate_x can be used as an evaluation index indicating likelihood of a linearization coefficient set.

Then, Rate_x and Rate_max are compared with each other (step S57). When Rate_x is larger (Yes in S57), the reliability of the linearization coefficient set of the neighbor region x is considered to be sufficiently high. Accordingly, Rate_x is assigned to Rate_max and the linearization coefficient set of the neighbor region x is held as a linearization coefficient set candidate (step S58). When Rate_x is smaller than Rate_max otherwise (No in S57), it is judged that the reliability of the linearization coefficient set of the neighbor region x is lower than an already-held linearization coefficient set candidate and the check is performed to another neighbor region with the linearization coefficient set not set as a linearization coefficient set candidate (step S59).

Through repetition of the above processing for all the neighbor small regions, the most likely linearization coefficient set out of the eight neighbor regions can be obtained as a linearization coefficient set candidate. The linearization coefficient sets of the neighbor regions correlate with each other, as described above, and accordingly, it is thought that the most likely linearization coefficient set in the neighbor regions is the most likely linearization coefficient set of the region of interest. Thus, with the use of the linearization coefficient set candidate obtained through the interpolation, linearized image generation and optical region classification can be performed to a region where a solution cannot be obtained in the base image generation.

Figure 24:
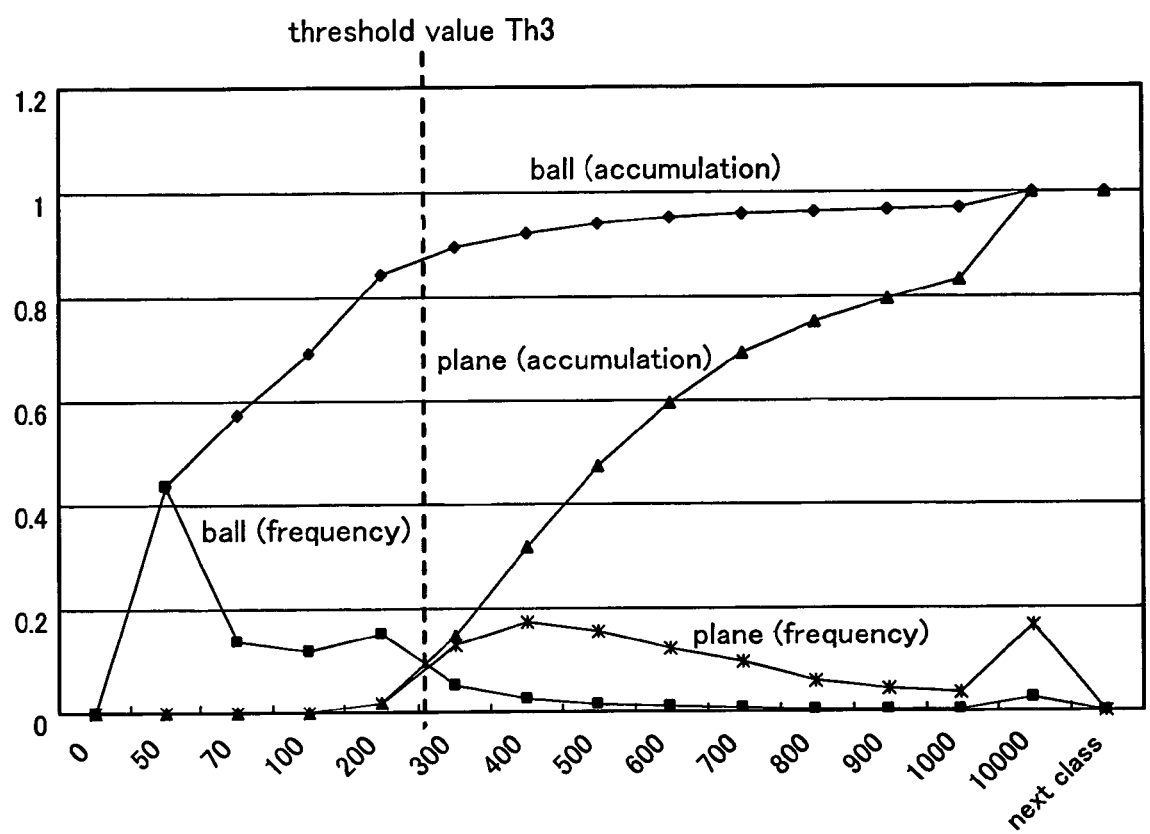
FIG. 24 is a graph indicating evaluation values of each conditional expression in FIG. 22.

It is noted that the eight neighbor regions are used herein as a range from which the most likely linearization coefficient set of the region of interest is selected, but is not limited thereto. For example, as shown in FIG. 11(a), only four neighbor regions 43 may be used. Setting the neighbor regions limitedly in this way shortens the time period required for the processing. Contrarily, the neighbor regions may be set wide to be 12 neighbor regions 44 as shown in FIG. 11(b) or 24 neighbor regions 45 shown in FIG. 11(c). Setting wide the neighbor regions increases alternatives, enabling highly accurate selection of a linearization coefficient set of the region of interest.

Further, the diffuse reflection pixel rate Rate_x is used as an evaluation function herein, but the evaluation index for selecting a linearization coefficient set is not limited thereto. For example, the pixel count Xd in the diffuse reflection region may be used as the evaluation index. Alternatively, the pixel count Xd+Xc+Xa to which the pixel count of shadow regions are added may be used as the evaluation index.

Moreover, the computation of an evaluation index value is performed only in the neighbor regions herein, but an evaluation region for computing the evaluation index value may be set separately from the neighbor regions, instead. For example, it is possible that for an evaluation region set separately from the neighbor region X, a linearized image is generated, region classification is performed based on the optical characteristic, and then, the diffuse reflection pixel rate Rate_x as an evaluation index is computed in the steps S54 through S56 in the aforementioned flow of FIG. 10.

This method is effective in the case where partitioned regions are quite different from one another in image feature. For example, it is often that ⅔ of a region (x−1, y) is a shadow region while a region (x+1, y) does not include a shadow region at all as in FIG. 9. In this case, it is not necessarily appropriate to evaluate the respective linearization coefficient sets of the respective regions with the use of the respective diffuse reflection pixel rates Rate_x of the respective regions. In this connection, the nine small regions in combination of the region of interest 41 and the eight neighbor regions 42 is set as an evaluation region as a whole, for example. Specifically, the linearization coefficient set of each neighbor region is used for the combination regions 41, 42 to compute an evaluation index value such as a diffusion reflection pixel rate Rate_x, and the comparison is performed. Whereby, more appropriate evaluation can be performed.

Figure 9:
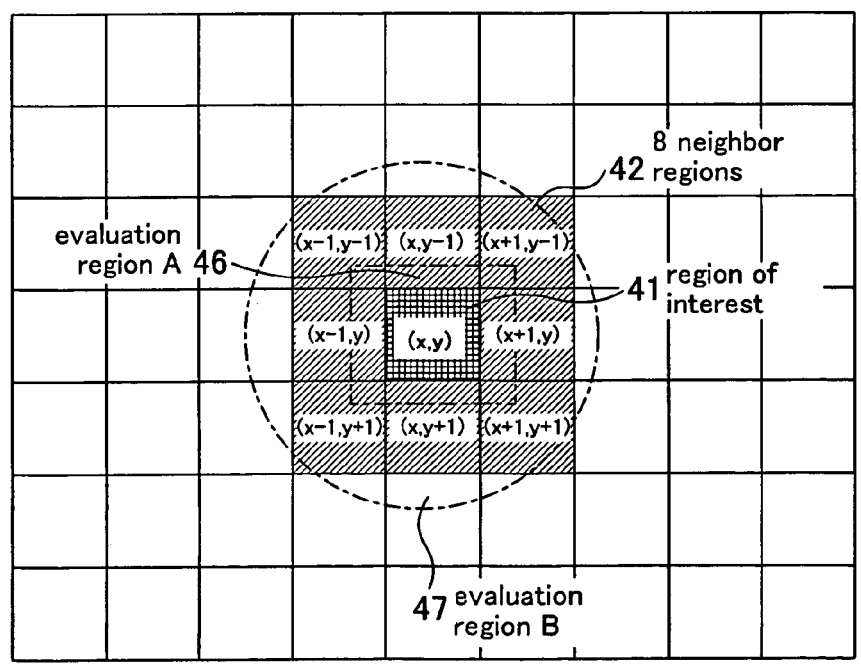
FIG. 9 is a view showing an example of neighbor regions.

This evaluation region is, of course, not necessarily set based on the small regions partitioned for obtaining the linearization coefficient set, and may be set likewise the evaluation regions 46, 47 in FIG. 9.

In addition, the linearization coefficient set may be estimated utilizing continuity of a boundary region. Adjacent pixels are considered to correlate with each other strongly, and accordingly, the pixel value of a pixel located at an outermost point of a region of interest is considered to be nearly equal to a pixel value of the neighbor region next to the pixel (a boundary region 48 in FIG. 12). Under the circumstances, this continuity is utilized as an evaluation function. Specifically, $Func(X_{k(x, y)}^L)$ in the following expression that takes the continuity of a boundary region into consideration is used as an evaluation function.

$$Func(X_{k(x,y)}^L) = g_{(x-1,y)}\left(\sum_{q=1}^{Q} |x_{k(x,y,1,q)}^L - x_{k(x-1,y,P,q)}^L|\right) +$$

$$g_{(x,y-1)}\left(\sum_{p=1}^{P} |x_{k(x,y,p,1)}^L - x_{k(x,y-1,p,Q)}^L|\right) +$$

$$g_{(x+1,y)}\left(\sum_{q=1}^{Q} |x_{k(x,y,P,q)}^L - x_{k(x+1,y,1,q)}^L|\right) +$$

$$g_{(x,y+1)}\left(\sum_{p=1}^{P} |x_{k(x,y,p,Q)}^L - x_{k(x,y+1,p,1)}^L|\right)$$

Wherein, $$g_{(m,n)}(f) = \begin{cases} f & \text{if linearization coefficient set of region } (m, n) \text{ is obtained} \\ 0 & \text{if linearization coefficient set of region } (m, n) \text{ is not obtained} \end{cases}$$

Wherein, the pixel counts of small regions are all (PxQ), and $x_{k(x, y, p, q)}{}^L$ is a linearized pixel value of a pixel (p, q) of a small region (x, y) in an input image k.

2. Quadratic Interpolation

A method for obtaining a linearization coefficient set of a region of interest by quadratic interpolation of linearization coefficient sets of neighbor regions will be described herein.

First, consider that the surface of a region is approximated by the following quadratic expression with a value of a linearization coefficient set of the region used as a function g(m, n) of a position (m, n) of the region.

$$g(m,n) = A/2 \cdot m^2 + B/2 \cdot n^2 + Cmn + Dm + En + F \quad \text{(Expression b 15)}$$

Wherein, the position (m, n) indicates the center of the region. For solving (Expression 15), six or more determined linearization coefficient sets are enough. Six regions of which linearization coefficient sets have been obtained are selected from neighbor regions of the region of interest, and the linearization coefficient sets and the positions (m, n) of the thus selected regions are assigned to solve (Expression 15).

At this time, (Expression 15) may be solved independently for each element $c_k{}^1$, $c_k{}^2$, $C_k{}^3$ of the linearization coefficient set $c_k$. Alternatively, it is possible that each element $c_k{}^1$, $c_k{}^2$, $c_k{}^3$ is expressed in polar coordinates and (Expression 15) is solved for each element thereof.

Further, rather than obtaining a solution necessarily from the six regions, the solution may be obtained by the least squares method following the selection of six or more regions. Alternatively, approximation of a wider range by (Expression 15) is possible. In this case, for example, a solution may be obtained with the use of linearization coefficient sets of many regions with RANSAC employed.

Of course, spline interpolation may be adopted, for example, or cubic or higher-degree fitting may be performed.

3. Weighed Average

A method for obtaining a linearization coefficient set of a region of interest by weighting will be described here. In this case, an index of likelihood of a linearization coefficient set of a neighbor region, such as the aforementioned diffuse reflection pixel rate Rate_x, is utilized as a weigh. Suppose that the diffuse reflection pixel rate in a neighbor small region (m, n) is Rate_x(m, n), the linearization coefficient set of the region of interest (x, y) is expressed by the following expression.

$$c_{k(x,y)} = \frac{\sum_{(m,n) \in S} (\text{Rate\_x}(m, n) \cdot c_{k(m,n)})}{\sum_{(m,n) \in S} \text{Rate\_x}(m, n)} \quad \text{(Expression 16)}$$

Wherein, S is a region where a linearization coefficient set has been obtained among the neighbor regions of the region of interest (x, y). Namely, (Expression 16) expresses a mean linearization coefficient set of the neighbor regions weighted with the respective diffuse reflection pixel rates.

The weight is not limited, of course, to the diffuse reflection pixel rate, and a pixel count of a diffuse reflection region, as described above, may be used. Or, it is possible that no weighing is performed and a mean value of linearization coefficient sets of neighbor regions is used simply.

Alternatively, it is possible that the linearization coefficient set obtained as in the chapters 1. to 3. is used as an initial value and an optimum linearization coefficient set is obtained further by employing a gradient method.

As described above, when regions to be processed of a plurality of images shot while controlling a point light source are partitioned and the interpolation is performed, a linearized image in which influence of specular reflection and shadows is corrected can be generated from the images shot under the point light source. Then, the image processing section 108 performs image processing using the linearized image generated by the linearized image generation section 103. The linearized image is an ideal image from which specular reflection and shadows are removed, and therefore, image processing with no influence of specular reflection and shadows is realized by utilizing the linearized image. The image processing herein includes, for example, 3D position/shape estimation of an object, object recognition, region classification based on an optical characteristic.

Figure 40:
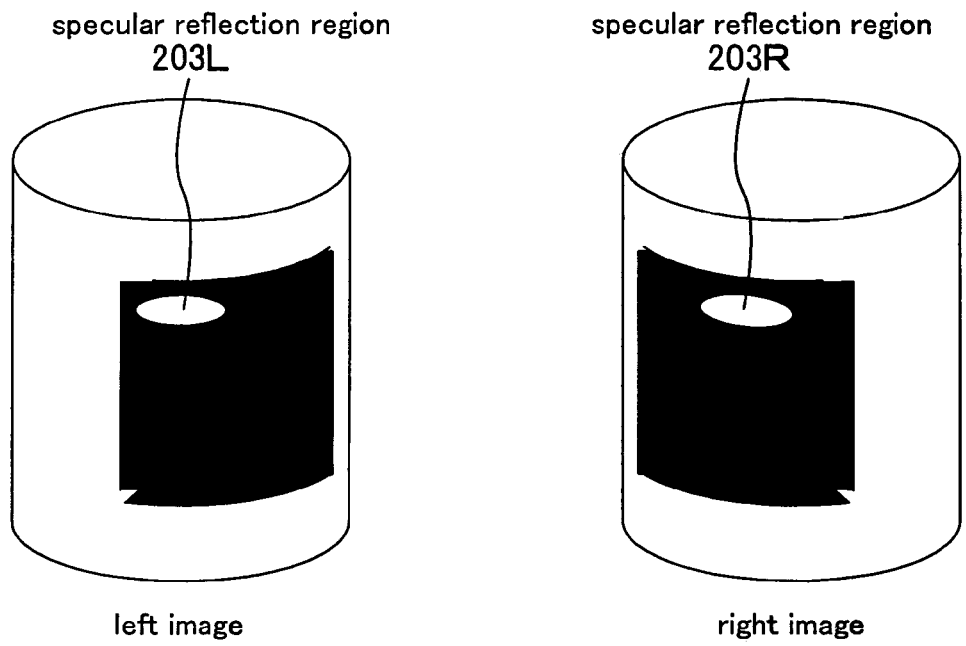
FIG. 40 shows images shot in the situation in FIG. 39.
Figure 41:
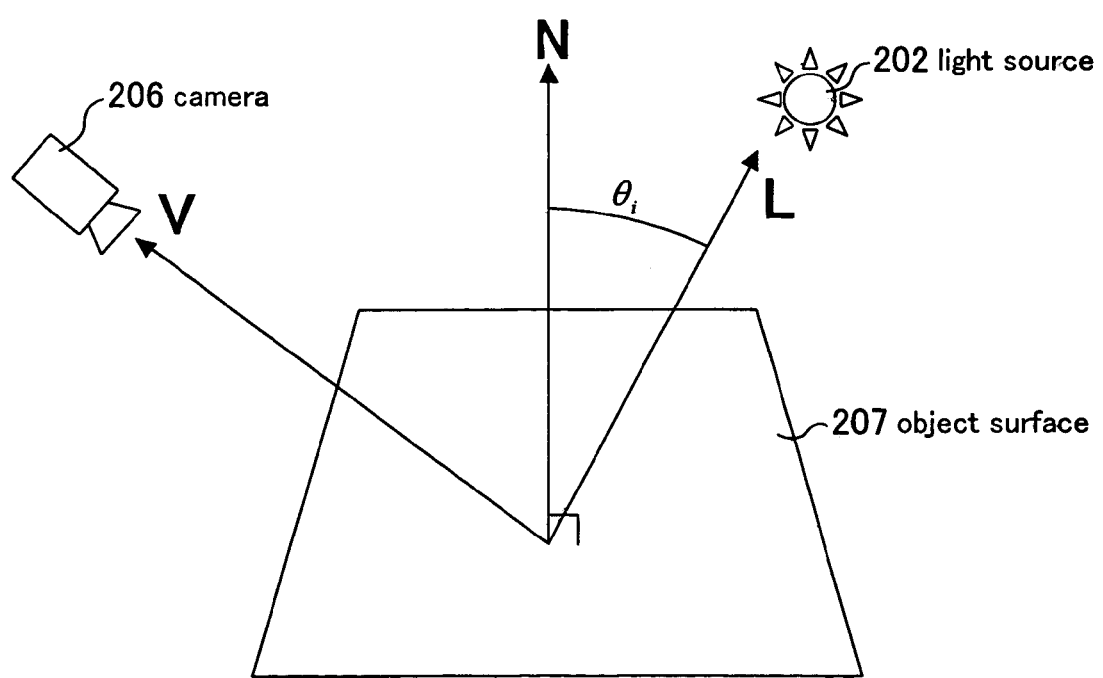
FIG. 41 is a conceptual illustration showing a relationship among a light source, a camera, and the normal direction of an object.
Figure 42:
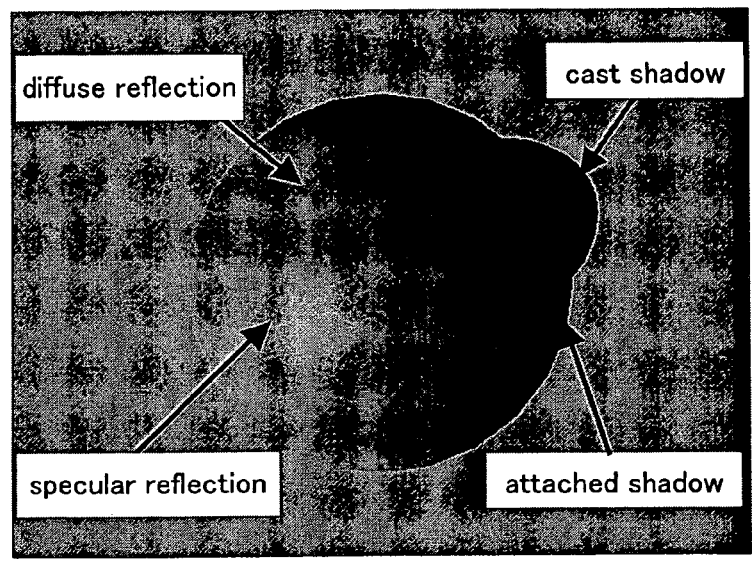
FIG. 42 is a conceptual drawing showing diffuse reflection, specular reflection, and shadows, which are optical phenomena.
Figure 43:
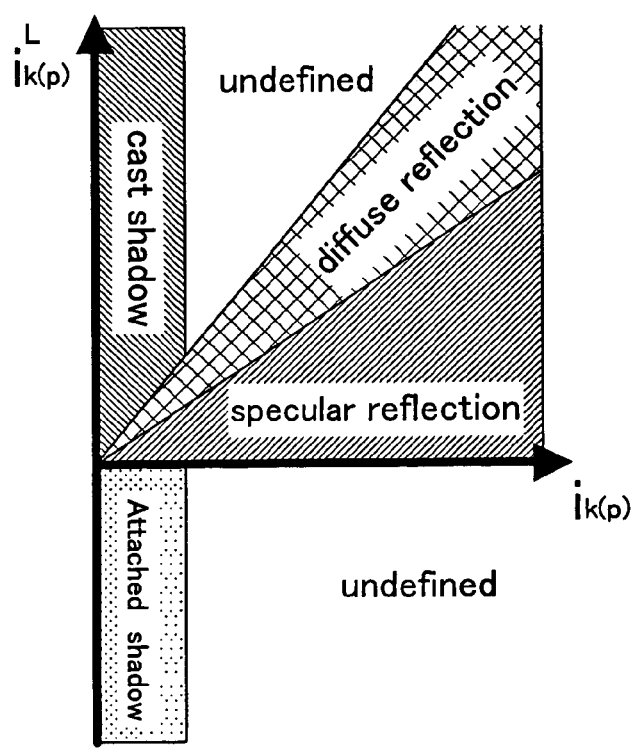
FIG. 43 is a view indicating criteria in region classification based on an optical characteristic.

FIG. 13 shows linearized images of stereo images in FIG. 40. It is observed in FIG. 13 that specular reflection is clearly removed from the images. In association therewith, accuracy of stereo matching is increased and accuracy of 3D position/shape estimation is also increased. Further, in object recognition, the use of the linearized image restrains accuracy lowering caused due to specular reflection and the like.

Further, it is possible that with the use of the linearized image and (Expression 4), region classification of an input image can be performed, based on an optical characteristic such as diffuse reflection, specular reflection, cast shadow, and attached shadow.

FIG. 14(a) shows linearized images generated from the input images of FIG. 45(a) by the method according to the present embodiment. FIG. 14(b) shows specular reflection components separated from the input images of FIG. 45(a) by using the linearized images of FIG. 14(a) and (Expression 4). In comparison of FIG. 14(a) and FIG. 14(b) with FIG. 45(b) and FIG. 45(c) according to the third conventional example, it is understood that accuracy of linearized image generation is increased particularly in plane regions. Also, accuracy of separation between the specular reflection region and the diffuse reflection region is 70% in the third conventional example while it is 91% in the present embodiment, which means a remarkable improvement. Wherein, the separation accuracy is computed by the following expression.

$$(\text{seperation accuracy}) = \left( \binom{\text{pixel count of pixels correctly}}{\text{estimated as specular reflection}} + \binom{\text{pixel count of pixels correctly}}{\text{estimated as diffuse reflection}} \right) \Big/ \left( \binom{\text{pixel count of}}{\text{diffuse reflection}} + \binom{\text{pixel count of}}{\text{specular reflection}} \right)$$

Figure 15:
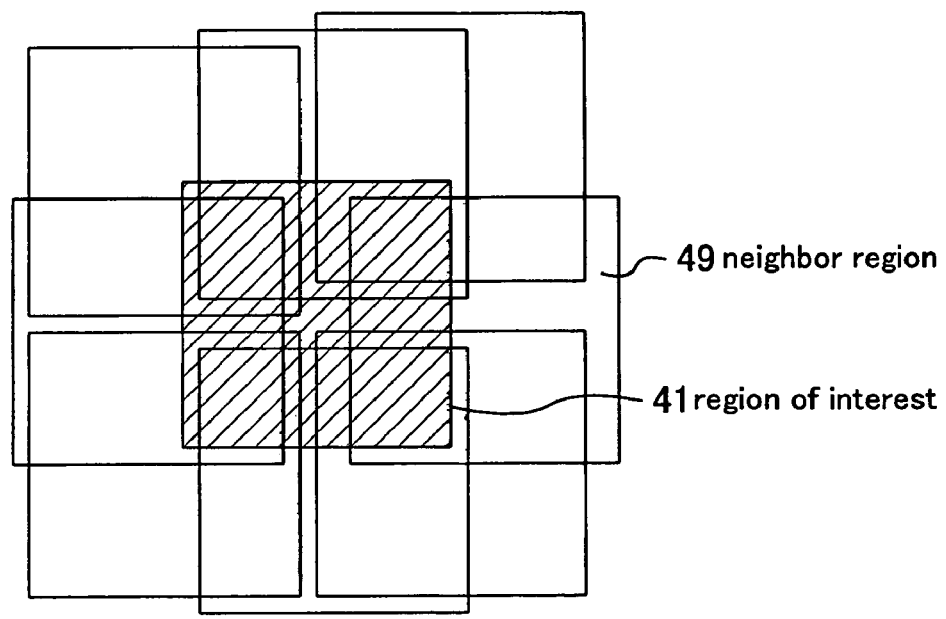
FIG. 15 is a view of another example of the region partition, which is an example of small regions having overlaps.

It is noted that the region partition is performed so that each small region does not overlap each other in the above description but may be, of course, performed so that small regions overlap each other as shown in FIG. 15. The region partition as in this way increases correlation between a region 41 of interest and a neighbor region 49, increasing the accuracy of the interpolation.

Figure 16:
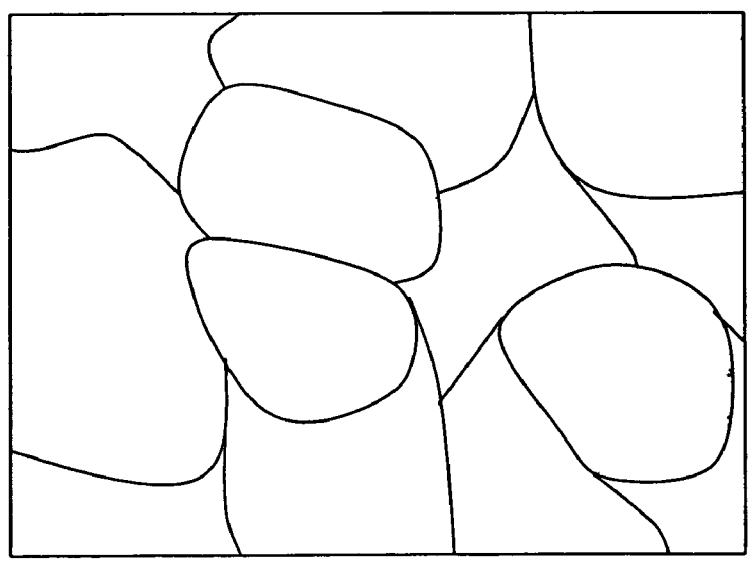
FIG. 16 is a view of another example of the region partition, which is an example in which the small regions are not in rectangular forms.

Further, the small regions are not necessarily in the shape of rectangles, and may be in arbitrary shapes as shown in FIG. 16, for example.

Figure 17:
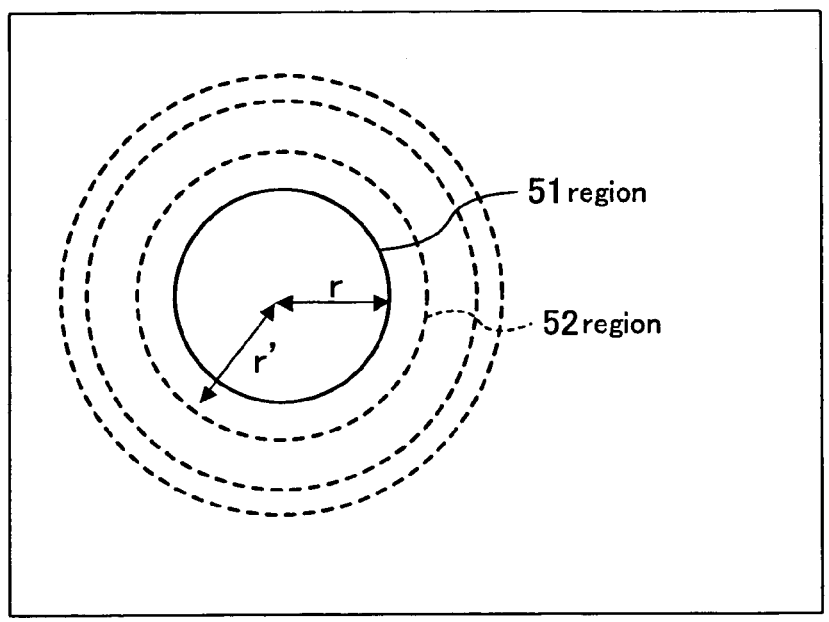
FIG. 17 is a view for explaining a method for computing a linearization coefficient set with a weight set as a position function.
Figure 18:
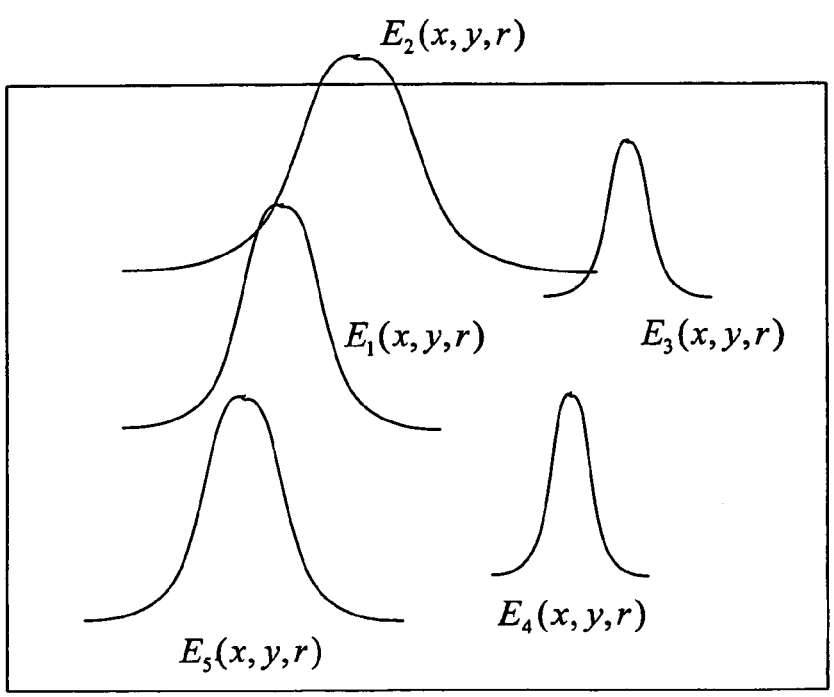
FIG. 18 is an illustration schematically showing separation accuracy of linearization coefficient sets.

Moreover, instead of setting a weight for each region, a weight may be set as a function of a position in an image. FIG. 17 shows an aspect of this processing, wherein small regions are set in the form of circles. First, an evaluation region is set as a circular region 51 with a radius r and a classification accuracy E(r) is obtained. Next, the evaluation region is changed to a circular region 52 with a radius r' and a classification accuracy E(r') is obtained again. Repetition of this processing while changing the radius of the evaluation region leads to expression of the classification accuracy as a function E(x, y, r) of the central position (x, y) and the radii r of the circular evaluation regions. The classification accuracy E(x, y, r) is present in each obtained linearization coefficient. With this being the situation, suppose that the classification accuracy E(x, y, r) of a given linearization coefficient set $C_1=[c_1\ c_2\ c_3]$ is $E_1(x, y, r)$. FIG. 18 is a schematic view showing the respective classification accuracies $E_1$ to $E_5$ of the respective linearization coefficients $C_1$ to $C_5$.

At this time, a linearization coefficient set $C_m$ of an arbitrary point (xm, ym) is obtained by the following weighting.

$$C_m = \frac{1}{\sum_l E_l(xn, yn, rn)} \sum_l (E_l(xn, yn, rn) \cdot C_l)$$

wherein, $(xm-xn)^2+(ym-yn)^2=rn^2$

Of course, the linearization coefficient set $C_m$ of the arbitrary point (xm, ym) may be obtained as follows by employing the aforementioned Nearest neighbor.

$C_m = C_l$ $l = \arg\max_l(E_l(xn, yn, rn))$

By employing the above processing, a linearized image can be generated with regions of images partitioned not so definitely. This is because a fixed evaluation region does not need to be used because of an evaluation region changed as described above.

Moreover, the light source control section 101 may change lighting condition by switching lighting equipment installed in a home, for example. This light source switching may be realized by utilizing ECHONET that uses an electric power line, for example.

Incandescent lamps and fluorescent lamps generally used in a home cannot be used as a light source in the third conventional example because the assumption of a parallel light source is not held. On the other hand, in the present invention, linearized image generation and region classification based on the optical characteristic are attained. As a result, the processing is enabled by regarding home use lighting equipment as an aggregate of point light sources. Utilization of home use lighting equipment as a light source eliminates the need for preparation of separate lighting equipment, achieving the present invention in a very simple image processing apparatus.

Furthermore, change in lighting condition by the light source control section 101 may be performed periodically, if it is a case of home use, in night or in a time frame when residents have gone out for commuting and working.

Figure 19:
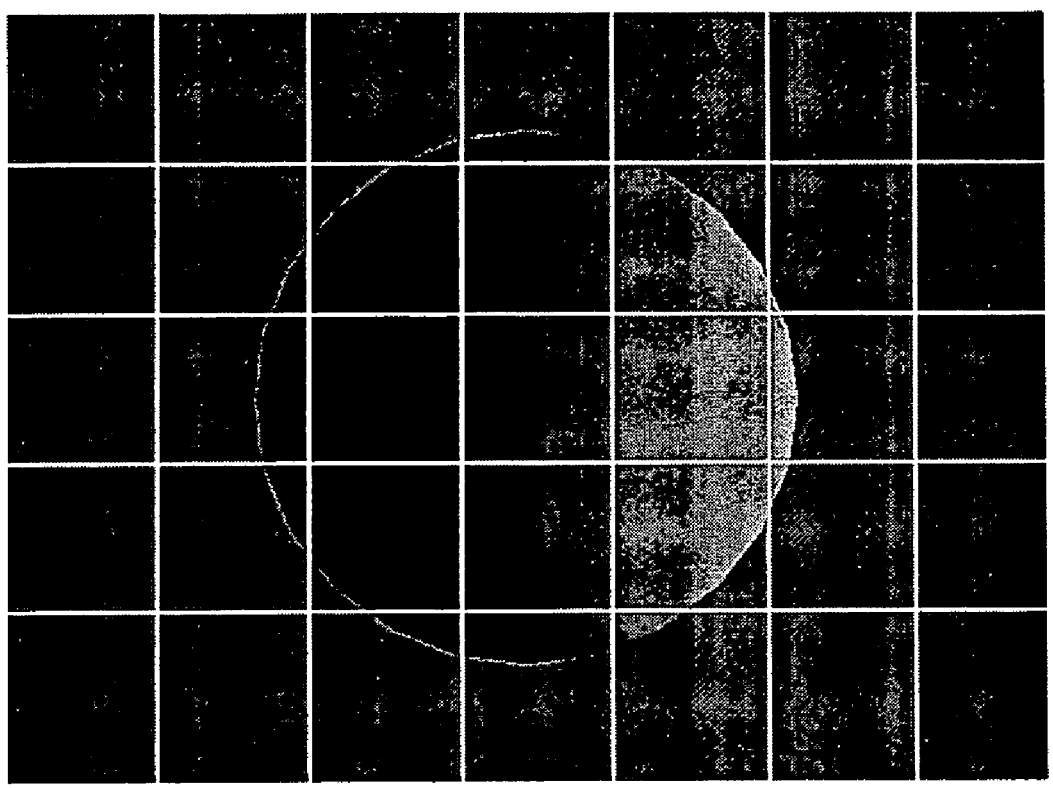
FIG. 19 is an example of a linearized image generated according to Embodiment 1 of the present invention.

FIG. 19 shows an example of a linearized image generated according to the present embodiment. As shown in FIG. 19, the image processing method according to the present embodiment generates a linearized image which is an image in an ideal state in which specular reflection is not caused.

Also, the image input section 102 does not necessarily perform shooting, and it may take images stored in a memory, a hard disk or the like through a network or an interface, for example.

In addition, a synthesized image may be generated from shot images. This is effective in the case where a plurality of shot images are different from each other in position and/or direction of their view point. The position of the view point must be fixed in the present embodiment, as described above. However, with the use of a technique of virtual viewpoint image synthesis, conversion to an image shot as if it is shot from the same view point is realized with the use of camera position information, motion information and the like even in the case where the view point is moved. The image input section 102 may generate a synthesized image of which view point is the same by utilizing this virtual viewpoint image synthesis technique.

(Modified Examples)

Further, the image interpolation section 107 may include control means for exchanging the following three pieces of processing.

Interpolation processing is performed by the above method.

An image generated by the small region synthesized image generation section 105 is sent to the image processing section 108 directly without performing the interpolation The small regions are changed in size and/or position by the image region dividing section 105 and a synthesized image is regenerated by the small region synthesized image generation section 106.

In the present embodiment, the processing is performed to each divided small region, and therefore, all the normal directions of selected three points are liable to be the same in the random sampling in RANSAC. In this case, the matrix D is degenerated, so that neither solution nor linearization coefficient can be obtained.

In this connection, whether the normal directions of three points sampled in RANSAC are the same or not is judged first by checking degeneration of the matrix D. If the matrix D is degenerated, the processing is interrupted, thereby improving the efficiency of the processing. In other words, a check on degeneration of the matrix D attains high-speed processing. On the other hand, if the matrix D is degenerated in every set of randomly sampled points, the processing is exchanged as described above.

Referring to an index of check on matrix degeneration, the number of dimensions of matrix is listed first. For checking the number of dimensions of a matrix, a determinant is obtained generally. The determinant |A| of the following matrix A is expressed by (Expression 17).

$$A = \begin{bmatrix} a_{11} & a_{12} & a_{13} \\ a_{21} & a_{22} & a_{23} \\ a_{31} & a_{32} & a_{33} \end{bmatrix} = \begin{bmatrix} a_1^T \\ a_2^T \\ a_3^T \end{bmatrix}$$

Wherein, $a_i=[a_{i1}\ a_{i2}\ a_{i3}]^T$ (i=1, 2, 3)

$|A|=a_{11}a_{22}a_{33}+a_{12}a_{23}a_{31}+a_{13}a_{32}a_{21}-a_{13}a_{22}a_{31}-a_{12}a_{21}a_{33}-a_{11}a_{32}a_{23}$ (Expression 17)

When the determinant |A| is 0, the matrix A is considered to be degenerated.

In the present embodiment, however, even in the case where the normal directions of selected three points are the same, the determinant |A| is a small value and does not necessarily become 0 because of the use of a near point light source approximated to a parallel light source and influence of quantization error and noise. In this connection, it is judged that the normal directions of selected three points are the same when the following condition is satisfied.

$$|A| \leq Th1 \quad \text{(Expression 18)}$$

As anther method for detecting matrix degeneration, a method may be considered which utilizes three vectors $a_1$, $a_2$, $a_3$ as elements of the matrix A, for example. As shown in FIG. 20(a) and FIG. 20(b), the vectors $a_1$, $a_2$, $a_3$ align on a plane or on a straight line when the matrix A is degenerated. Under the circumstances, angle components formed by the three vectors $a_1$, $a_2$, $a_3$ are used as an index of matrix degeneration. Specifically, angles formed between $a_1$ and $a_2$, between $a_2$ and $a_3$, and between $a_3$ and $a_1$ are obtained and the minimum value of the angles is determined. When the following condition is satisfied, it is judged that the normal directions of three pixels are the same.

$$\max\left(\frac{|a_1 \cdot a_2|}{|a_1| \cdot |a_2|}, \frac{|a_2 \cdot a_3|}{|a_2| \cdot |a_3|}, \frac{|a_3 \cdot a_1|}{|a_3| \cdot |a_1|}\right) \geq Th2 \quad \text{(Expression 19)}$$

The index unit in (Expression 19) is the angles. Therefore, while a threshold value is recognized better than that in (Expression 18), detection may fail when three vectors are present on the same plane as in FIG. 20(a). Hence, it is preferable to use the determinant in combination.

As a similar method, a method can be considered in which the determinant is normalized with the length of the three vectors.

$$\frac{|A|}{|a_1| \cdot |a_2| \cdot |a_3|} \leq Th3 \quad \text{(Expression 20)}$$

The determinant |A| expresses a volume of a parallelepiped 61 spanned by the three vectors $a_1$, $a_2$, $a_3$, as shown in FIG. 20(c). When the determinant |A| is normalized with the size of each vector, only angle components in the vectors are extracted.

As another index for the check on matrix degeneration, a condition number (the number of conditions) of a matrix may be used. The condition number of the matrix A is an index as to whether the matrix A is well conditioned or ill conditioned, and may be expressed as follows.

Ratio of the maximum eigenvalue to the minimum eigenvalue in the matrix A

Ratio of the maximum singular value to the minimum singular value in the matrix A Ratio of a norm of the matrix A to a norm of the inverse matrix $A^{-1}$ Further, it is possible that a matrix is triangulated and a diagonal component thereof is used. The matrix A can be expanded to the following expression.

$$A = \begin{bmatrix} a_{11} & a_{12} & a_{13} \\ a_{21} & a_{22} & a_{23} \\ a_{31} & a_{32} & a_{33} \end{bmatrix} = \begin{bmatrix} x_{11} & 0 & 0 \\ x_{21} & x_{22} & 0 \\ x_{31} & x_{32} & x_{33} \end{bmatrix} \begin{bmatrix} v_1 & v_2 & v_3 \end{bmatrix} \quad \text{(Expression 21)}$$

This processing is called matrix triangulation, and is realized by employing Gram-Schmidt orthogonalization, and the like. In a case employing the Gram-Schmidt orthogonalization, (Expression 21) can be obtained as follows.

$$b_{k+1} = a_{k+1} - (a_{k+1} \cdot v_1)v_1 - (a_{k+1} \cdot v_2)v_2 - \ldots - (a_{k+1} \cdot v_k)v_k$$

$$v_{k+1} = \frac{b_{k+1}}{|b_{k+1}|}$$

When focusing attention on the fact that $v_1$, $v_2$, $v_3$ are normal orthogonal basis, the following matters are found.

$x_{22}$ is a perpendicular length from $a_2$ to $a_1$ $x_{33}$ is a perpendicular length from $a_3$ to a plane spanned by $a_1$ and $a_2$ FIG. 21 shows this relationship. In this connection, it is judged that the normal directions of three points are the same when the following conditional expression is satisfied.

$$\min(x_{22}, x_{33}) \leq Th4$$

A method for determining each threshold value in the judgment methods respectively using the conditional expressions described above will be described next. Herein, each threshold value is determined by shooting a plane and an object other than the plane separately under a condition that actual shooting might be performed.

As shown in FIG. 22, a plane 72 and a ball 73 as an object are shot by a camera 71 first. Wherein, the normal directions of all points in the image are the same when the plane 72 is shot as in FIG. 22(a) while the normal directions of points in the image are different when the ball 73 is shot as in FIG. 22(b). The camera 71 and the object 73 are placed just the same as they are placed under actual environment. On the assumption that a home use working robot works, the camera 71 is set 50 cm apart from the plane 72 and the radius of the ball 73 is set to be 10 cm. As the camera 72, a camera with 56 degrees in horizontal angle of view and 640×480 in pixel count is used, which is the same as that installed actually in the robot.

Figure 23:
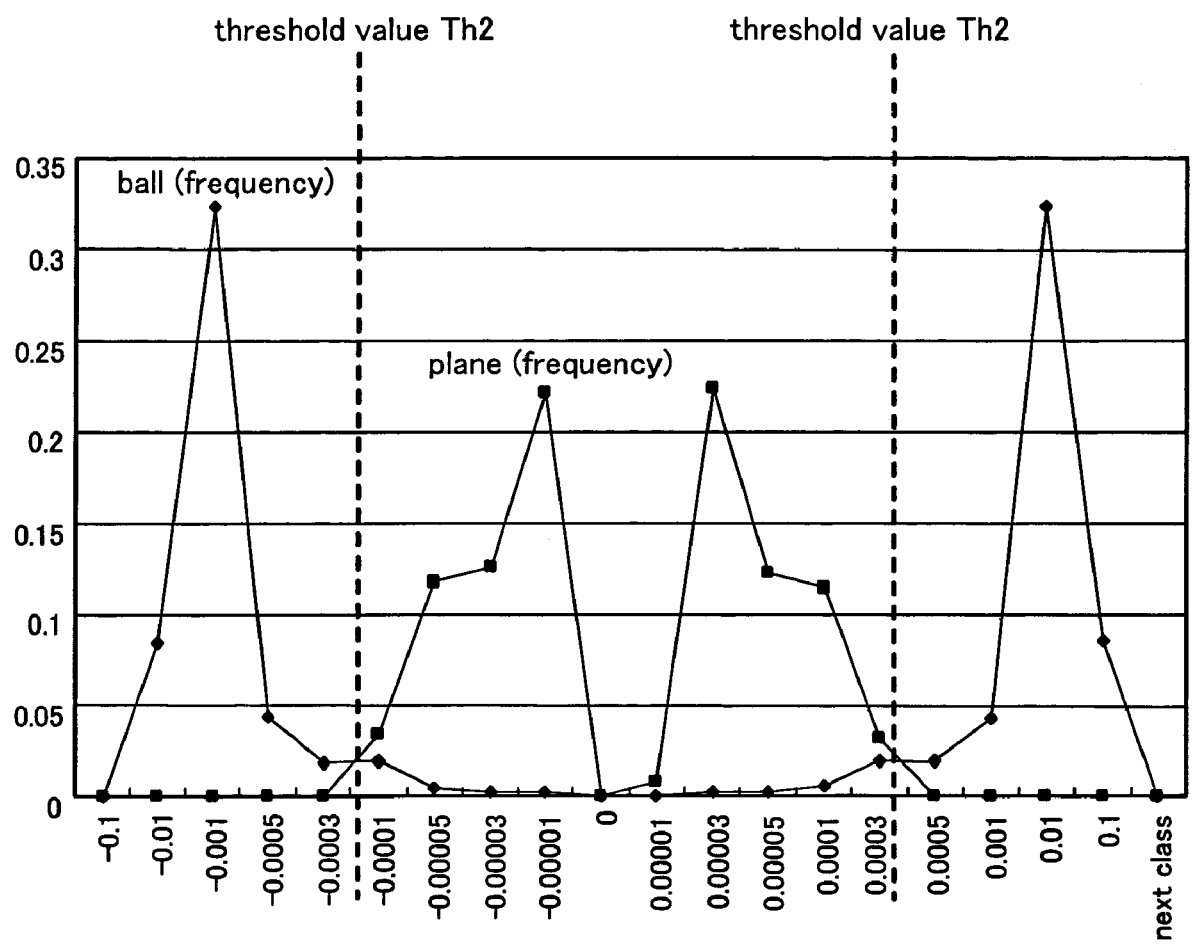
FIG. 23 is a graph indicating evaluation values of each conditional expression in FIG. 22.
Figure 25:
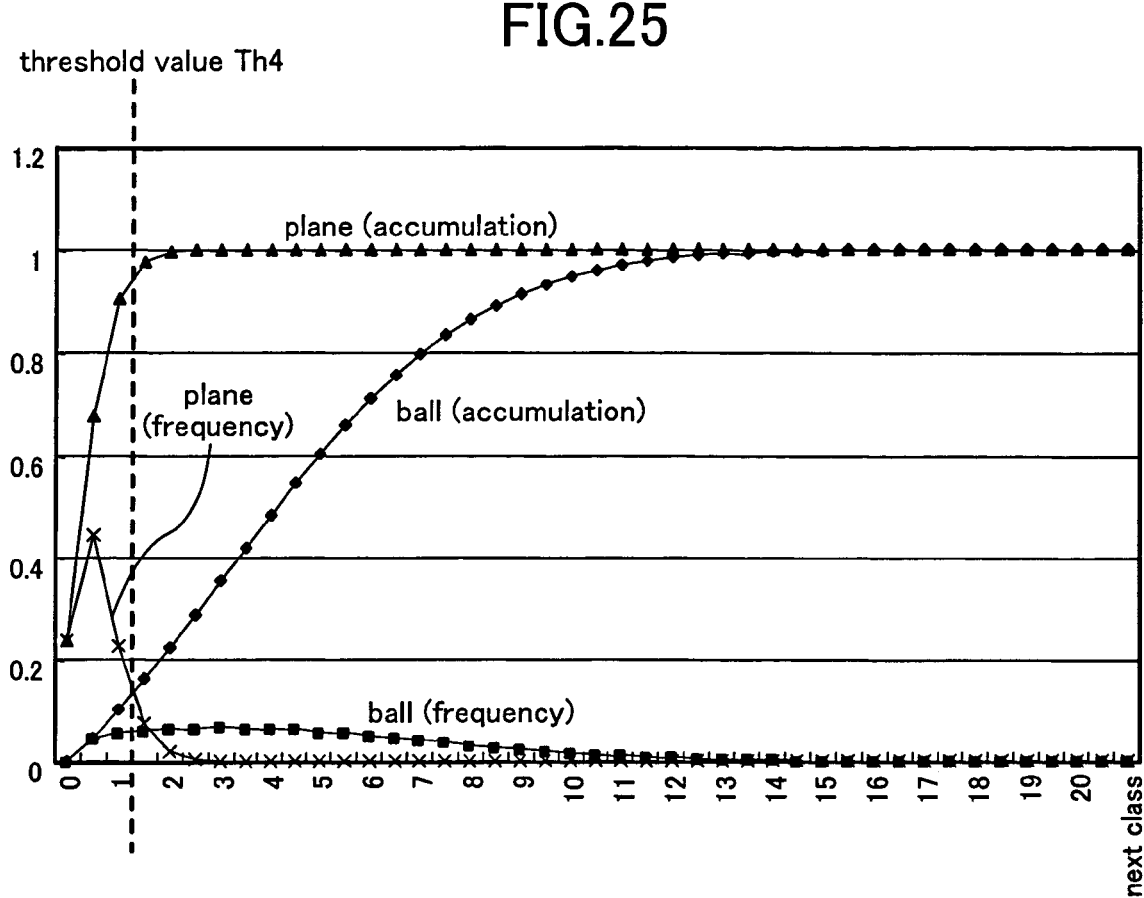
FIG. 25 is a graph indicating evaluation values of each conditional expression in FIG. 22.

When a frequency of an evaluation function of each conditional expression in the images respectively shot in the situations shown in FIG. 22(a) and FIG. 22(b) is obtained, an optimum threshold value can be determined. FIG. 23 through FIG. 25 are graphs indicating the evaluation values of the respective conditional expression. Wherein, these evaluation values are evaluation values of pixels (160×160) in the central part of a shot image.

FIG. 23 is a graph indicating values obtained by normalizing the determinant with the lengths of three vectors, that is, frequencies of those in (Expression 20) from which magnitudes are removed. FIG. 24 is a graph indicating frequencies of the values of condition number which utilizes the ratio of the maximum eigenvalue to the minimum eigenvalue of the matrix and their accumulated values. FIG. 25 is a graph indicating frequencies of the minimum values of the diagonal component in matrix triangulation indicated in (Expression 22) and their accumulated values. In any of the conditional expressions, it is understood that by setting the threshold values Th2, Th3, Th4 indicated by broken lines in the graphs, the judgment as to whether the normal directions of three points are the same or not can be realized with accuracy at 90% or higher.

It is noted that the method using the row element vectors $a_1$, $a_2$, $a_3$ of the matrix A is described here but the method may use the following column element vectors $b_1$, $b_2$, $b_3$, of course.

$$A = \begin{bmatrix} a_{11} & a_{12} & a_{13} \\ a_{21} & a_{22} & a_{23} \\ a_{31} & a_{32} & a_{33} \end{bmatrix} = [b_1 \; b_2 \; b_3]$$

Wherein, $b_i = [a_{1i} a_{2i} a_{3i}]^T$ (i=1, 2, 3)

Figure 26:
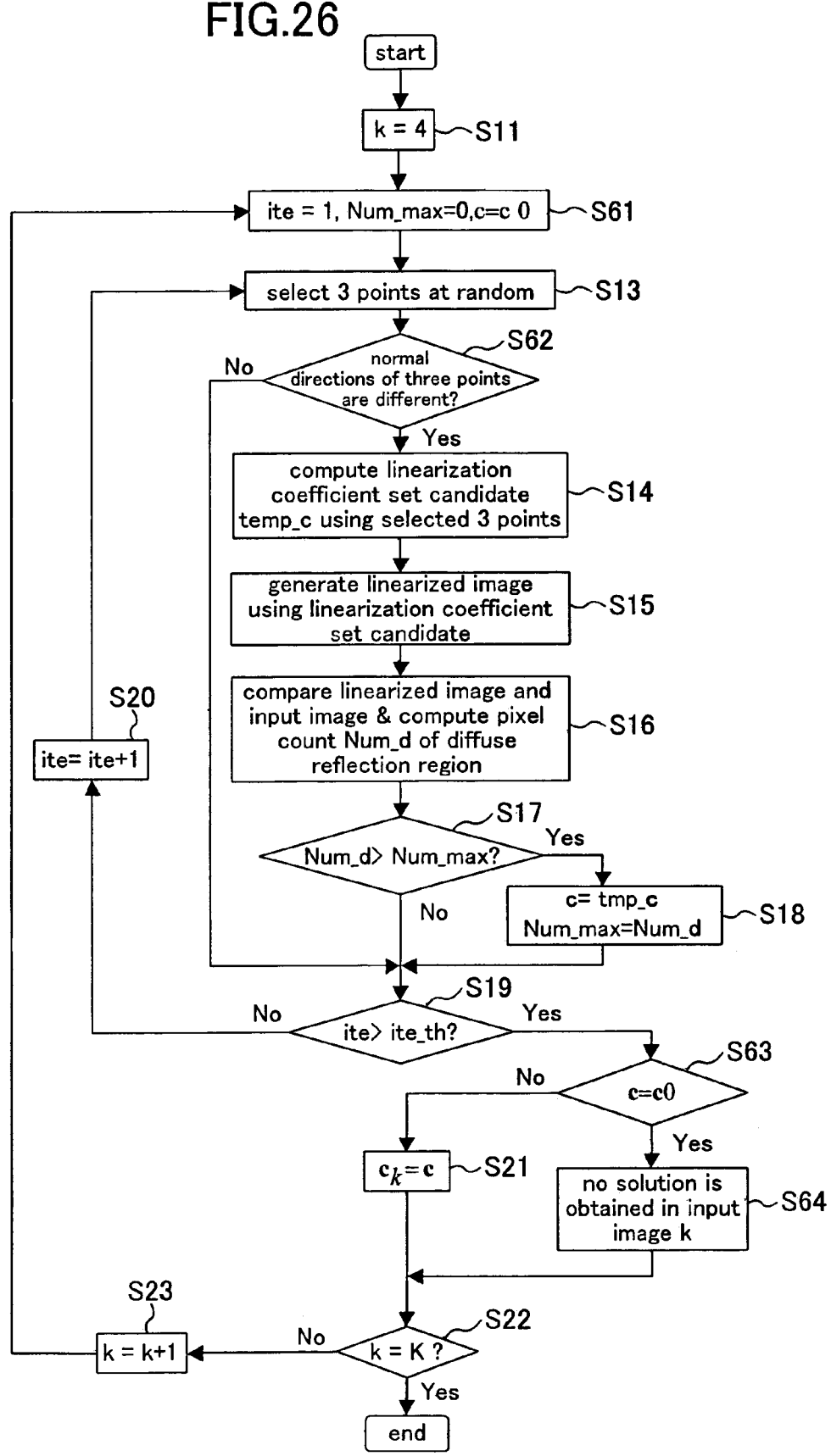
FIG. 26 is a flowchart depicting computation processing of a linearization coefficient set utilizing normal direction detection in another example of Embodiment 1 of the present invention.

A linearization coefficient set computation method utilizing this normal direction detection will be described with reference to the flowchart of FIG. 26. FIG. 26 is the same as FIG. 6 in the principal process flow. The same reference numerals are allotted to the same steps and the detailed description thereof is omitted.

As shown in FIG. 26, 4 is assigned to the counter k for initialization (step S11) and 1, 0, and an initial value $c_0$ are assigned to the counter ite, Num_max; and c, respectively (step S61). As the initial value $c_0$, it is desirable to set a value not present as a linearization coefficient set. For example, $c_0 = [0 \; 0 \; 0]^T$.

Next, three points are selected at random from the image of an input image k (step S13). Suppose that the selected three points are $(x_1, y_1)$, $(x_2, y_2)$, and $(x_3, y_3)$. To these three points, the aforementioned judgment as to whether the normal directions of three points are the same or not is performed (step S62). When the normal directions of the three points are different (Yes in S62), a linearized image is generated utilizing the selected three points and the linearization coefficient set is evaluated using the pixel count Num_d of a diffuse reflection region as an evaluation index (S14 to S18). When the normal directions of the three points are the same otherwise (No in S62), the routine proceeds to the step S19 without performing the linearized image generation.

After performing the random sampling predetermined times (ite_th times) in this way (Yes in S19), whether c indicates a value other than the initial value $c_0$ or not is checked (step S63). When the initial value $c_0$ is indicated still (Yes in S63), it is judged that no solution is obtained in the small region under processing in the input image k and the processing is terminated (Step S64). Then, another input image is processed (S22 and S23). The reason why no solution is obtained is that: the normal directions are almost the same within the small region under processing; or a shadow region and/or a specular reflection region are dominant in the small region under processing. Processing to be performed to a region judged as a region where no solution is obtained will be described later.

On the other hand, when c indicates a value other than the initial value $c_0$ (No in S63), c is selected as a linearization coefficient set $c_k$ of the input image k (step S21) and the processing for the input image k is terminated. Then, another input image is processed (S22 and S23).

To the region judged as a region where no solution is obtained in the step S64, the aforementioned interpolation may be performed by the image interpolation section 107.

Further, for the region judged as a region where no solution is obtained, it is possible that the small region is expanded again in the image region dividing section 105 and the processing is performed again. This is attained on the ground that the possibility that the normal directions of three points are the same becomes lower as a region to be processed becomes larger. However, to set a region to be processed too large fails to hold the assumption of a parallel light source. In this connection, it is desirable to expand a region to be processed within the range where the assumption of a parallel light source is held. For example, it is possible that the size of a region to be processed which is expressed by (expression 6):

$Ls = 2 \cdot D \tan(\theta_{Th}/2)$ is set by referencing a distance between the light source and the object as a criterion and the region is expanded when no solution is obtained in the small region under processing. Contrarily, it is also possible that a random size is set to a region to be processed, the size is reduced when a solution thereof is obtained, and the minimum-sized region where a solution is obtained is set as an optimum region to be processed. In this case, the distance between the light source and the object may be unknown.

Further, when it is judged that no solution is obtained in (1) linearization coefficient set computation, the base original images $I_1$, $I_2$, $I_3$ may be changed to other input images $I_1$, $I_2$, $I_3$. In so doing, it is desirable to select images including a smaller specular reflection region and a smaller shadow region as new base original images, likewise the aforementioned base original image selection.

Wherein, if the base original image change is performed to only some of the small regions, the aforementioned relational expression (Expression 13) cannot be held. In this connection, it is desirable to change, in a region (m, n), base images $I_{x(m,n)}^B$, $I_{y(m,n)}^B$, $I_{z(m,n)}^B$ generated based on the base original images $I_{x(m,n)}$, $I_{y(m,n)}$, $I_{z(m,n)}$ after the change to base images $I_{1(m,n)}^B$, $I_{2(m,n)}^B$, $I_{3(m,n)}^B$ generated based on the base original images $I_{1(m,n)}$, $I_{2(m,n)}$, $I_{3(m,n)}$ before the change. This processing will be described.

The following relational expression is held when focusing attention on the fact that the base images are linearized images.

$$\begin{bmatrix} I_{1(m,n)}^B \\ I_{2(m,n)}^B \\ I_{3(m,n)}^B \end{bmatrix} = \begin{bmatrix} c_{1(m,n)}^x & c_{1(m,n)}^y & c_{1(m,n)}^z \\ c_{2(m,n)}^x & c_{2(m,n)}^y & c_{2(m,n)}^z \\ c_{3(m,n)}^x & c_{3(m,n)}^y & c_{3(m,n)}^z \end{bmatrix} \begin{bmatrix} I_{x(m,n)}^B \\ I_{y(m,n)}^B \\ I_{z(m,n)}^B \end{bmatrix} =$$

$$C_{1(m,n)} \cdot \begin{bmatrix} I_{x(m,n)}^B \\ I_{y(m,n)}^B \\ I_{z(m,n)}^B \end{bmatrix} = C_{1(m,n)} \cdot \begin{bmatrix} I_{x(m,n)}^L \\ I_{y(m,n)}^L \\ I_{z(m,n)}^L \end{bmatrix}$$

(Expression 23)

Wherein, a matrix $C_{1(m,n)}$ is unknown. If this can be known, the base images $I_{1(m,n)}^B$, $I_{2(m,n)}^B$, $I_{3(m,n)}^B$ can be generated from the base images $I_{x(m,n)}^B$, $I_{y(m,n)}^B$, $I_{z(m,n)}^B$.

On the other hand, in a neighbor region (m', n') of the region (m, n), base images $I_{1(m',n')}^B$, $I_{2(m',n')}^B$, $I_{3(m',n')}^B$ generated based on base original images $I_{1(m',n')}$, $I_{2(m',n')}$, $I_{3(m',n')}$ before the change has been already obtained, and the following relational expression is held.

$$\begin{bmatrix} I^L_{x(m',n')} \\ I^L_{y(m',n')} \\ I^L_{z(m',n')} \end{bmatrix} = \begin{bmatrix} c^1_{x(m',n')} & c^2_{x(m',n')} & c^3_{x(m',n')} \\ c^1_{y(m',n')} & c^2_{y(m',n')} & c^3_{y(m',n')} \\ c^1_{z(m',n')} & c^2_{z(m',n')} & c^3_{z(m',n')} \end{bmatrix} \begin{bmatrix} I^B_{1(m',n')} \\ I^B_{2(m',n')} \\ I^B_{3(m',n')} \end{bmatrix} = \quad \text{(Expression 24)}$$

$$C_{2(m',n')} \cdot \begin{bmatrix} I^B_{1(m',n')} \\ I^B_{2(m',n')} \\ I^B_{3(m',n')} \end{bmatrix}$$

Wherein, a matrix $C_{2(m,n)}$ is known, different from the matrix $C_{1(m,n)}$. As described above, also, in view of the correlation to the linearization coefficient sets of the neighbor regions, the following hypothesis is introduced.

$$C_{2(m,n)} = C_{2(m',n')} \quad \text{(Expression 25)}$$

Now, when focusing attention on the fact that:

$$\begin{bmatrix} I^L_{x(m,n)} \\ I^L_{y(m,n)} \\ I^L_{z(m,n)} \end{bmatrix} = C_{2(m,n)} \cdot \begin{bmatrix} I^B_{1(m,n)} \\ I^B_{2(m,n)} \\ I^B_{3(m,n)} \end{bmatrix} \quad \text{(Expression 26)}$$

the matrix $C_{1(m,n)}$ is obtained as follows by (Expression 23), (Expression 25) and Expression 26).

$$C_{1(m,n)} = \quad \text{(Expression 27)}$$

$$C^{-1}_{2(m,n)} = C^{-1}_{2(m',n')} = \begin{bmatrix} c^1_{x(m',n')} & c^2_{x(m',n')} & c^3_{x(m',n')} \\ c^1_{y(m',n')} & c^2_{y(m',n')} & c^3_{y(m',n')} \\ c^1_{z(m',n')} & c^2_{z(m',n')} & c^3_{z(m',n')} \end{bmatrix}^{-1}$$

According to (Expressing 23) and (expression 27), the base images $I_{1(m,n)}{}^B, I_{2(m,n)}{}^B, I_{3(m,n)}{}^B$ are obtained from the base images $I_{x(m,n)}{}^B, I_{y(m,n)}{}^B, I_{z(m,n)}{}^B$ by the following relational expression.

$$\begin{bmatrix} I^B_{1(m,n)} \\ I^B_{2(m,n)} \\ I^B_{3(m,n)} \end{bmatrix} = \begin{bmatrix} c^1_{x(m',n')} & c^2_{x(m',n')} & c^3_{x(m',n')} \\ c^1_{y(m',n')} & c^2_{y(m',n')} & c^3_{y(m',n')} \\ c^1_{z(m',n')} & c^2_{z(m',n')} & c^3_{z(m',n')} \end{bmatrix}^{-1} \begin{bmatrix} I^B_{x(m,n)} \\ I^B_{y(m,n)} \\ I^B_{z(m,n)} \end{bmatrix} \quad \text{(Expression 28)}$$

Referring to the neighbor region (m', n'), an optimum one may be selected by the nearest neighbor, the quadratic interpolation, the weighting or the like, as described above.

It is noted that detection of a region where no solution is obtained may be attained not only by checking the normal directions but also by checking edges within a region of the generated base image or linearized image, for example. In general, images have a property of changing in neighbor regions smoothly. In this connection, this edge information is utilized to detect a region where no solution is obtained.

Figure 27:
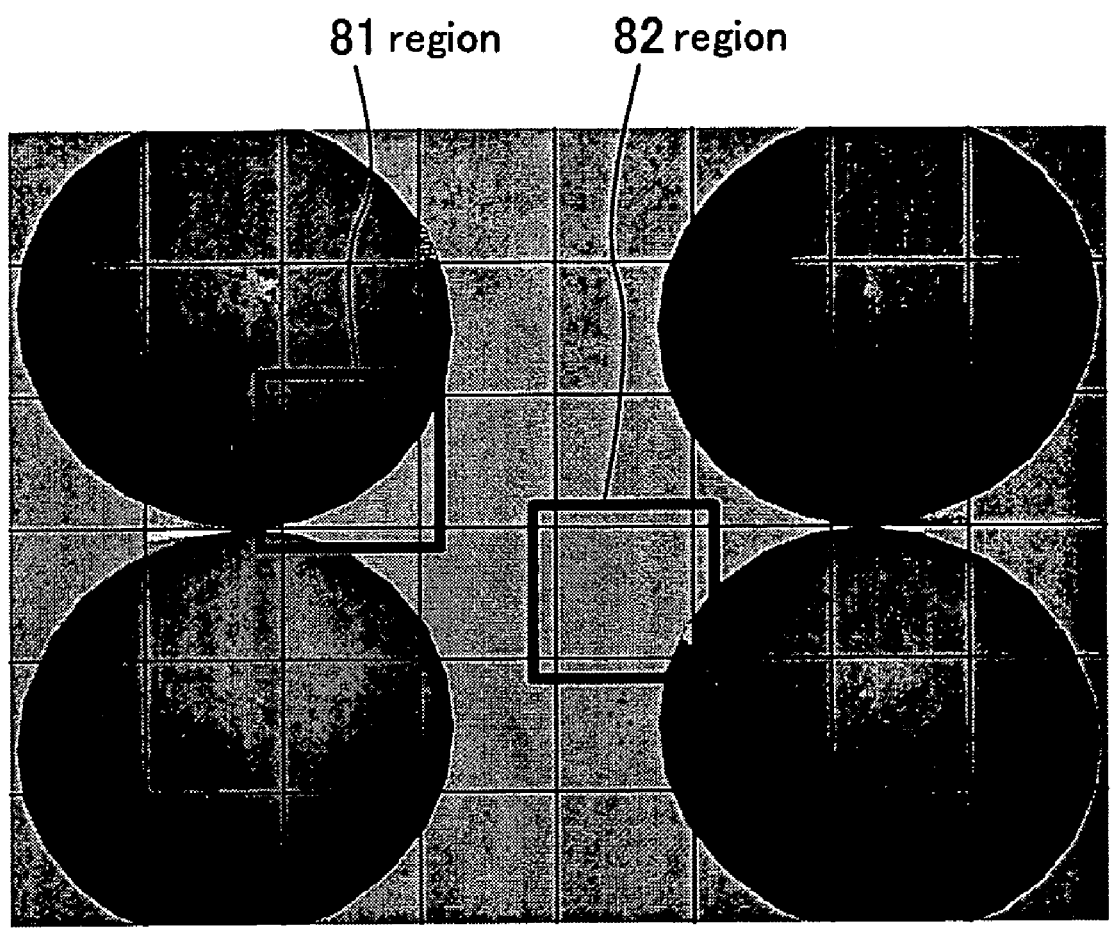
FIG. 27 is a view for explaining a method for detecting, utilizing an edge of an image, a region of which base image cannot be obtained.

FIG. 27 shows an example of a base image generated by the above described method. In FIG. 27, a region 81 is a region where a solution is obtained and a base image is generated accurately and a region 82 is a region where inaccurate solution is obtained and an accurate base image cannot be generated.

An edge in an image is considered to be generated due to the following three factors.

1) Edge derived from texture
2) Edge generated on a boundary among a plurality of objects or on a boundary form which the depth is changed abruptly
3) Edge on a boundary between a region of a shadow or diffuse reflection and a region other than those Wherein, only edges of 3) changes in position in the images shot under the condition that the lighting condition is changed while the camera and the object are fixed. Also, the edge of 3) is not present in base images and linearized images by its nature. In this connection, it is understood that the edges of 1), 2), and 3) may be present in input images while the edges of 3) are not present in base images and linearized images. Hence, the following relational expression is satisfied when a base image or a linearized image are obtained accurately.

$$\text{Edge}(I^B) \in \sum_k \text{Edge}(I_k) \quad \text{(Expression 33)}$$

Wherein, Edge(I) is a result of edge extraction from an image I.

In FIG. 28, FIG. 28(a) is a view obtained by expanding the region 81 in FIG. 27 and FIG. 28(b) shows regions corresponding to the region 81 in the respective input images. As can be understood from FIG. 28, (Expression 33) is satisfied in the region 81. On the other hand, in FIG. 29, FIG. 29(a) is a view obtained by expanding the region 82 in FIG. 27 and FIG. 29(b) shows regions corresponding to the region 82 in the respective input images. As can be understood from FIG. 29, an edge in a region 83 is not included in any of the input images (FIG. 29(b)), and therefore, (Expression 33) is not satisfied in the region 82. This results from no solution obtained in the region 82.

In this way, (Expression 33) can be utilized for judging whether a solution is obtained or not. Specifically, it is judged that an accurate base image is obtained in a region where (Expression 33) is satisfied while an accurate base image is not obtained in a region where it is not satisfied.

Further, as described above, for a small region where no solution is obtained, the processing may be performed again after the size expansion. However, the change of a small region in partition is not limited to only change in size, and position of the region to be partitioned may be changed.

Figure 30:
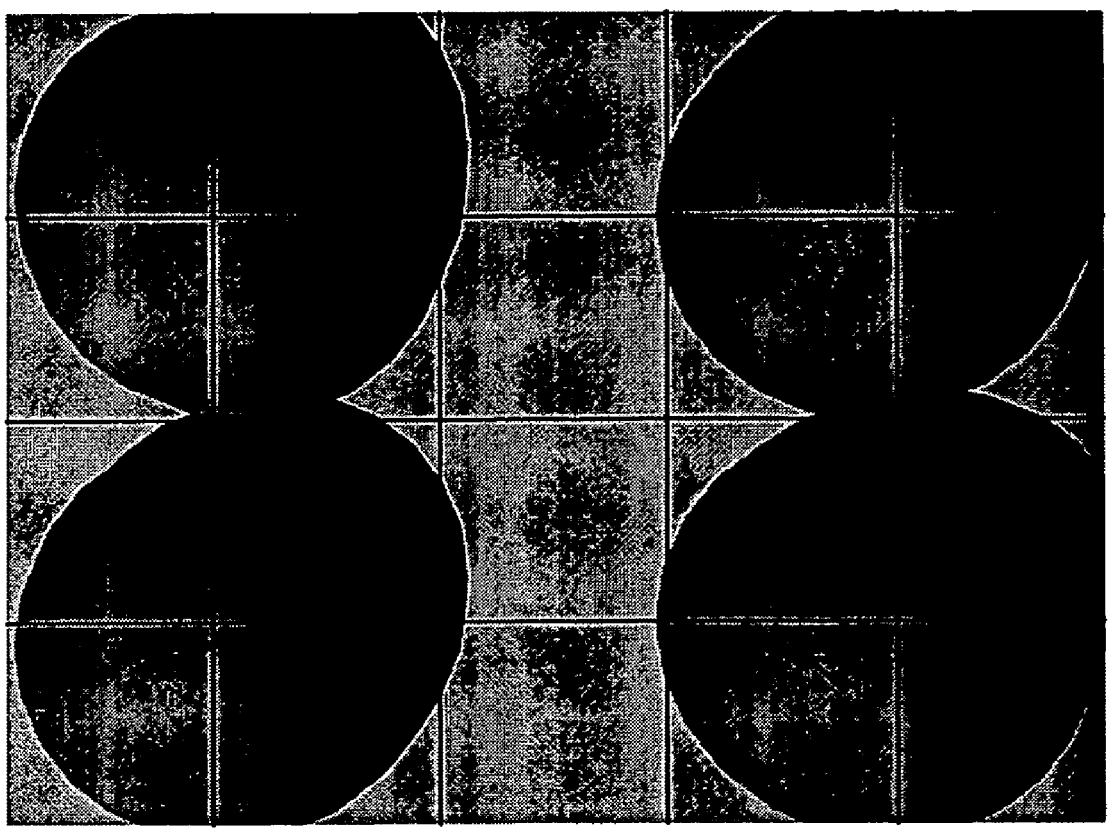
FIG. 30 is a view for explaining region partition change.

FIG. 30 shows an image obtained by shooting a situation that four balls are placed. When this image is partitioned into regions as indicated by the solid lines, a plane region 84 of which linearized image cannot be generated is present, as shown in FIG. 31(a), due to the presence of only one plane in the region. On the other hand, when the image of FIG. 30 is partitioned into regions as in FIG. 31(b), every region has plural normal directions so that a linearized image can be generated in every region. Therefore, the position of the regions to be partitioned may be changed when a small region where no solution is obtained is present.

Moreover, as in FIG. 15, small regions may be set so as to overlap each other. Even in the case where the regions are not uniform in size and there is an overlap between regions, the linearization coefficient set can be interpolated by the above described interpolation. This can be attained, for example, by weighting interpolation utilizing a distance between the centroid of a region of interest and a neighbor region, reliability such as the diffuse reflection pixel rate of the neighbor region, and the like.

The interpolation may be performed, of course, to a small region judged as a region where no solution is obtained, rather than retry of the processing starting from the region partition.

Furthermore, it is possible that a plurality of base images are generated while changing the small region partition method (position and size) and the thus generated base images are combined to generate an optimum base image. This processing will be described.

FIG. 46(a) shows an image obtained by shooting two spherical objects 461, 462 placed on a plane. In this situation, K images are shot while changing the position of a light source, and a linearized image is generated using the shot images as input images.

Now, consider that a process position in image region partition is changed and the processing is performed individually, as shown in FIG. 46(b) and FIG. 46(c). In the drawings, regions partitioned by the straight lines indicate partitioned small regions.

A region 467 is referred to first. When the region partition as shown in FIG. 46(b) is performed, the region 467 is included in a process region 469. In the process region 469, the spherical object 462 is dominant as seen from FIG. 46(b), and therefore, an accurate base image is considered to be obtained. On the other hand, when the region partitioned as shown in FIG. 46(c) is performed, the region 467 is included in a process region 470. As seen from FIG. 46(c), a plane is dominant in the process region 470, and therefore, a base image is obtained not so accurately, as described above.

On the other hand, referring to a region 468, the region 468 is included in a process region 471 when the region partition as shown in FIG. 46(b) is performed. In the process region 471, a plane is dominant as seen from FIG. 46(b), and therefore, a base image is considered to be obtained not so accurately. On the other hand, when the region partition as shown in FIG. 46(c) is performed, the region 468 is included in a process region 472. As seen from FIG. 46(c), the spherical object 461 is dominant in the process region 472, and therefore, a base image is obtained accurately, as described above.

As described above, the regions of which base image is obtained accurately and a region of which base image is obtained inaccurately change according to process position in the region partition even in the same input image. Under the circumstances, base image generation is performed plural times while changing the dividing position and only regions of which base images are obtained accurately are selected from a plurality of thus obtained base images and are combined, thereby generating an accurate base image.

Figures 47, 48:
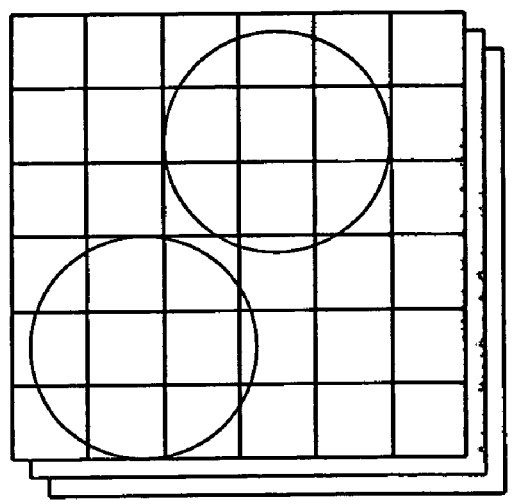
FIG. 47 is a conceptual view for expressing qualitative ternary representation utilizing eight neighbor regions.
FIG. 48 is a conceptual view for explaining generation processing of a base image while changing the position in region partition.

An evaluation function for judging whether a base image is obtained accurately is necessitated in this case. This can be obtained by utilizing qualitative ternary representation (QTR) (see, for example, "Image Matching Based on Qualitative Ternary Representation," Osamu Yamaguchi and Kazuhiro Fukui, Technical Research Report of Institute of Electronics, Information and Communication Engineers, PRMU2002-34, pp. 23-30, 2002). QTR is an expression of the order and the equivalence relation of intensity values to a neighbor pixel, and is known as a feature strong against light source variation. Eight neighbor regions as in FIG. 47 are expressed in QTR as follows.

$$b_{0(i,j)} = \begin{cases} -1 & \text{if } f_{i-1,j-1} - f_{i,j} \geq Th \\ 0 & \text{if } |f_{i,j} - f_{i-1,j-1}| \leq Th \\ 1 & \text{if } f_{i,j} - f_{i-1,j-1} \geq Th \end{cases} \dots b_{7(i,j)} = \begin{cases} -1 & \text{if } f_{i+1,j+1} - f_{i,j} \geq Th \\ 0 & \text{if } |f_{i,j} - f_{i+1,j+1}| \leq Th \\ 1 & \text{if } f_{i,j} - f_{i+1,j+1} \geq Th \end{cases}$$

Wherein, $f_{i,j}$ is an intensity value of (i, j).

The processing flow will be described below.

First, as descried above, the generation processing of a base image is performed plural times while changing dividing position S in region partition to generate a plurality of base images. Suppose now that base images obtained in a region at the dividing position S are $[I_{S1}^B \ I_{S2}^B \ I_{S3}^B]$.

The thus obtained plural base images are partitioned into small regions again as in FIG. 48 to obtain QTR in each region. In this drawing, regions partitioned by the straight lines are the partitioned small regions. Further, QTRs are obtained in corresponding regions in each of the K input images $I_1, I_2, \ldots, I_K$, likewise. Supposing that QTR of an image I in (x, y) is QTR(I(x, y)), base images $[I_1^B(m) \ I_2^B(m) \ I_3^B(m)]$ of a region m is expressed as follows.

$$[I_1^B(m) I_2^B(m) I_3^B(m)] = [I_{\tilde{S}1}^B(m) I_{\tilde{S}2}^B(m) I_{\tilde{S}3}^B(m)]$$

$$\tilde{S} = \arg\max_S \left( \sum_{j=1}^{K} \sum_{i=1}^{3} \sum_{x,y \in m} Dh(I_{Si}^B(x, y), I_{j(x,y)}) \right)$$

$$Dh(I_1, I_2) = \sum_{k=1}^{8} \begin{pmatrix} 1 & \text{if } QTR(I_1) = QTR(I_2) \\ 0 & \text{if } QTR(I_1) \neq QTR(I_2) \end{pmatrix}$$

Though the eight neighbor regions are utilized for QTR herein, the present method is not limited thereto, of course. For example, QTR in only horizontal direction and a vertical direction may be employed. QTR is, of cause, not necessarily used as an evaluation function, and the aforementioned edge information, spatial intensity gradient, and incremental code correlation may be used, for example (see, for example, "Robust Image Verification by Incremental Code Correlation," Ichiro Murase, Shunichi Kaneko, and Satoru Igarashi, Transactions of the Institute of Electronics, Information and Communication Engineers, vol. J83-D-II, No. 5, pp. 1323-1331, 2000).

Figure 51:
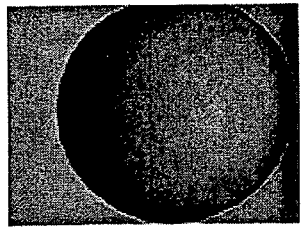
FIG. 51 is a view showing an input image used for base image generation with the position changed in region partition.
Figure 52:
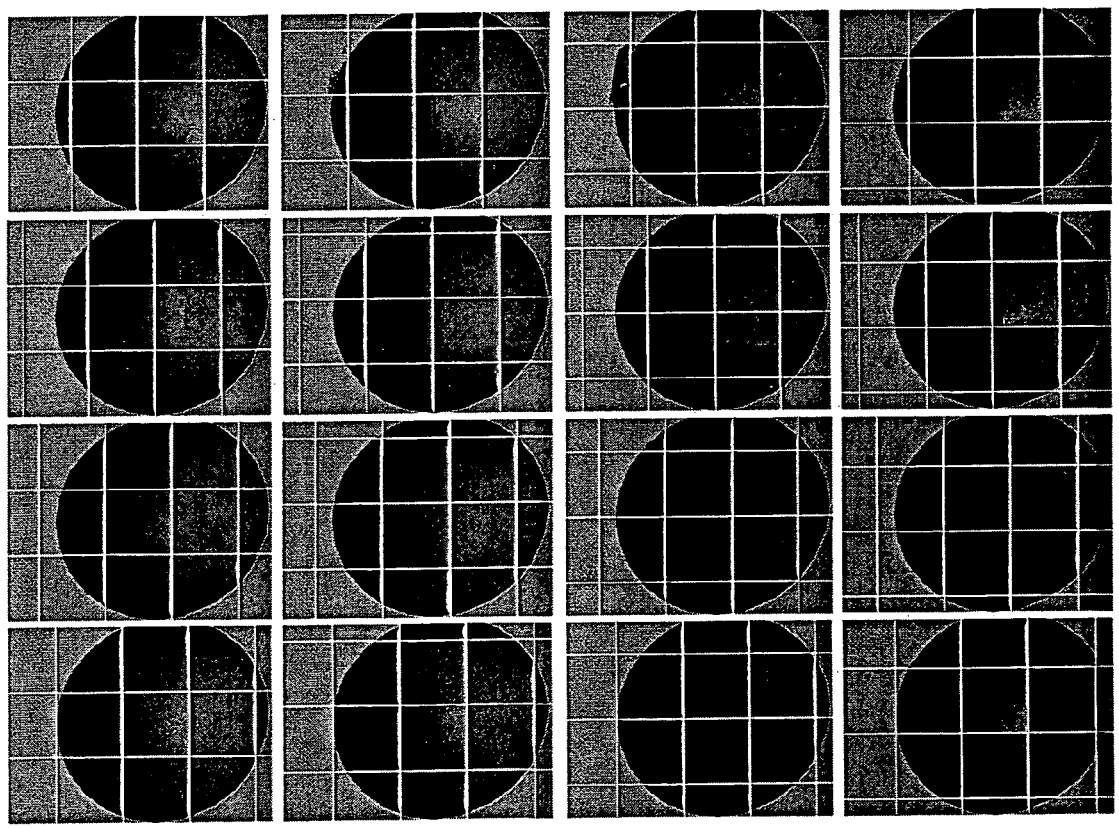
FIG. 52 shows 16 base images generated while changing the position in region partition to 16 patterns.
Figure 53:
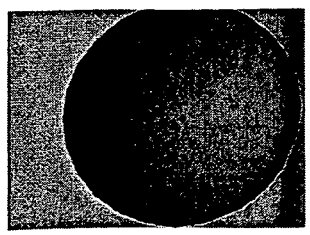
FIG. 53 is a view showing an accurate base image generated by combining the base images of FIG. 52.

FIG. 51 through FIG. 53 show aspects of base images generated by this processing. FIG. 52 shows base images generated from an input image of FIG. 51 while changing dividing position S to 16 patterns. In this drawing, the white solid lines indicate the partitioned regions. FIG. 53 shows a base image synthesized from the thus obtained 16 base images by utilizing QTR. As shown in the drawings, it is understood that an accurate base image can be generated by changing the dividing position in region partition and combining the base images respectively obtained in the cutout positions.

Embodiment 2

Figure 32:
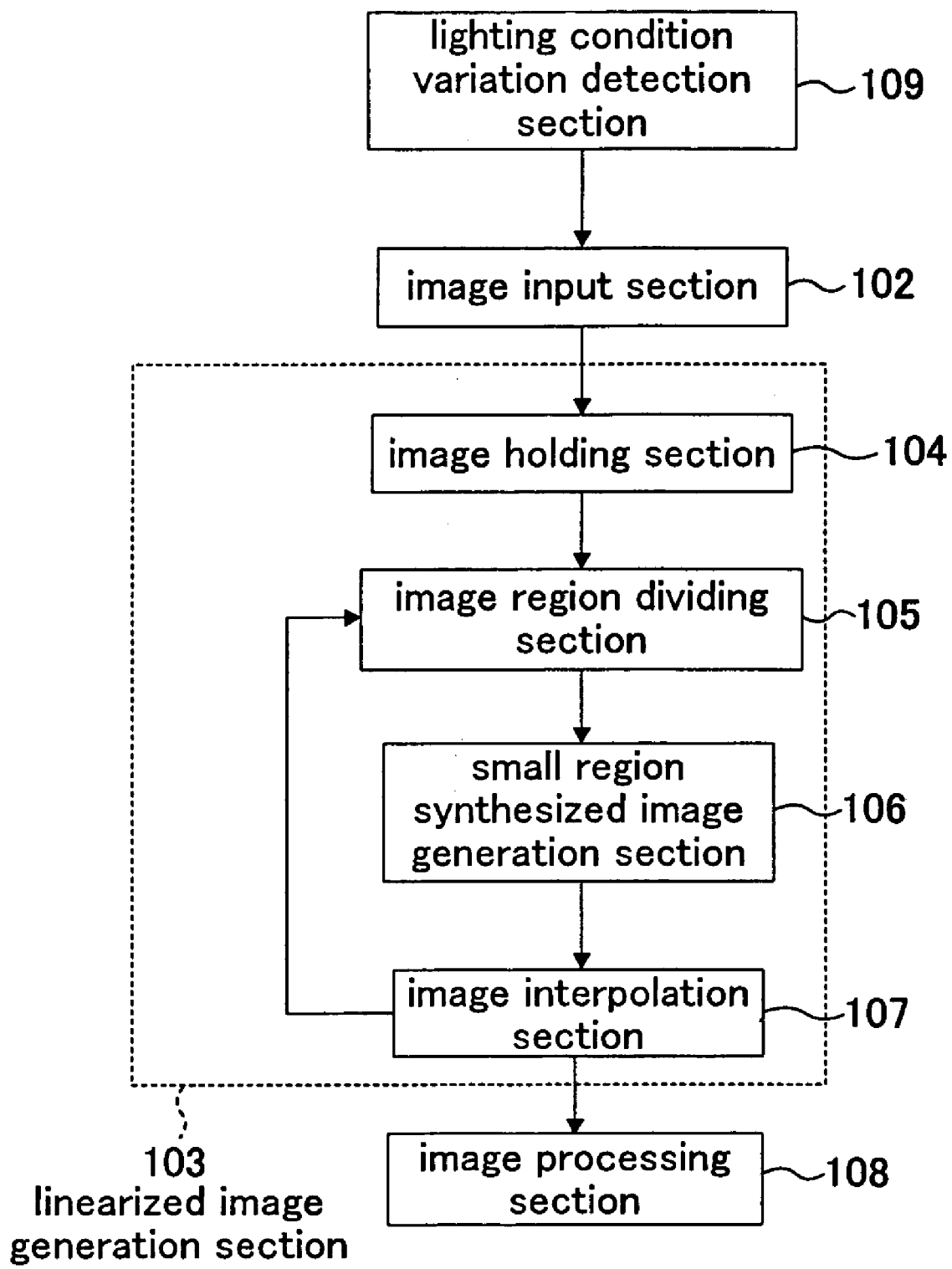
FIG. 32 is a constitutional view of an image processing apparatus according to Embodiment 2 of the present invention.

FIG. 32 is a view showing a constitution of an image processing apparatus that executes an image processing method according to Embodiment 2 of the present invention.

In FIG. 32, the same constitutional elements as in FIG. 1 are assigned to the same reference numerals and description thereof is omitted.

In comparison of the constitution in FIG. 32 with that in FIG. 1, a lighting condition variation detection section 109 for detecting variation in lighting condition under shooting environment is provided instead of the light source control section 101. In the present embodiment, the image input section 102 performs shooting when variation in lighting condition is detected by the lighting condition variation detection section 109 to obtain a plurality of images. In other words, in the present embodiment, a plurality of images of which lighting condition is different from each other are obtained by performing shooting at variation in lighting condition, rather than the light source control by itself. The thus obtained images are held in the image holding section 104 and processing is performed by the same method as in Embodiment 1.

The lighting condition variation detection section 109 includes, for example, an illuminometer and judges that lighting condition varies when a measured value by the illuminometer changes. Referring to the illuminometer, only one or plural illuminometers may be provided at a part within a field-of-view range.

Alternatively, the section 109 may have a constitution in which an intensity value, a RGB value or the like in each image is measured and variation in lighting condition is judged when the measured value changes. In this case, it is possible that a region to be measured is set in a part or plural parts in each image and value change only in the region is checked. It is noted that a region to be measured is desirable to be set in a white region so that the change is recognized easily. Further, it is possible that perfectly diffuse reflection is caused in a field-of-view region, an object to be measured which does not cause specular reflection, such as barium sulfate and Spectralon is placed, and change in intensity value or RGB value is detected in the region.

The lighting condition is considered to vary temporally, and therefore, the lighting condition variation detection section 109 may have a constitution that judges variation in lighting condition in every predetermined period. This constitution is effective particularly under environment where sunlight enters through a window, for example.

It is also possible that the lighting condition is observed actually and the variation thereof is detected. As described above, the observation of the lighting condition can be realized by shooting the lighting condition using a spherical mirror or by shooting the light source while directing a wide-angle camera upward to the ceiling.

Furthermore, it is possible that the position of the pixel having the highest intensity value is recognized in the field-of-view region and the lighting condition variation is judged when the recognized position is moved. This can be employed because: it is thought that the light source position moves when the position of the pixel having the highest intensity value, which might cause specular reflection, is moved.

Alternatively, change in position of a shadow cast by an object may be detected as variation in lighting condition.

As described above, according to the present embodiment, a linearized image can be generated likewise Embodiment 1 even if a light source is not positively changed.

Embodiment 3

Figure 33:
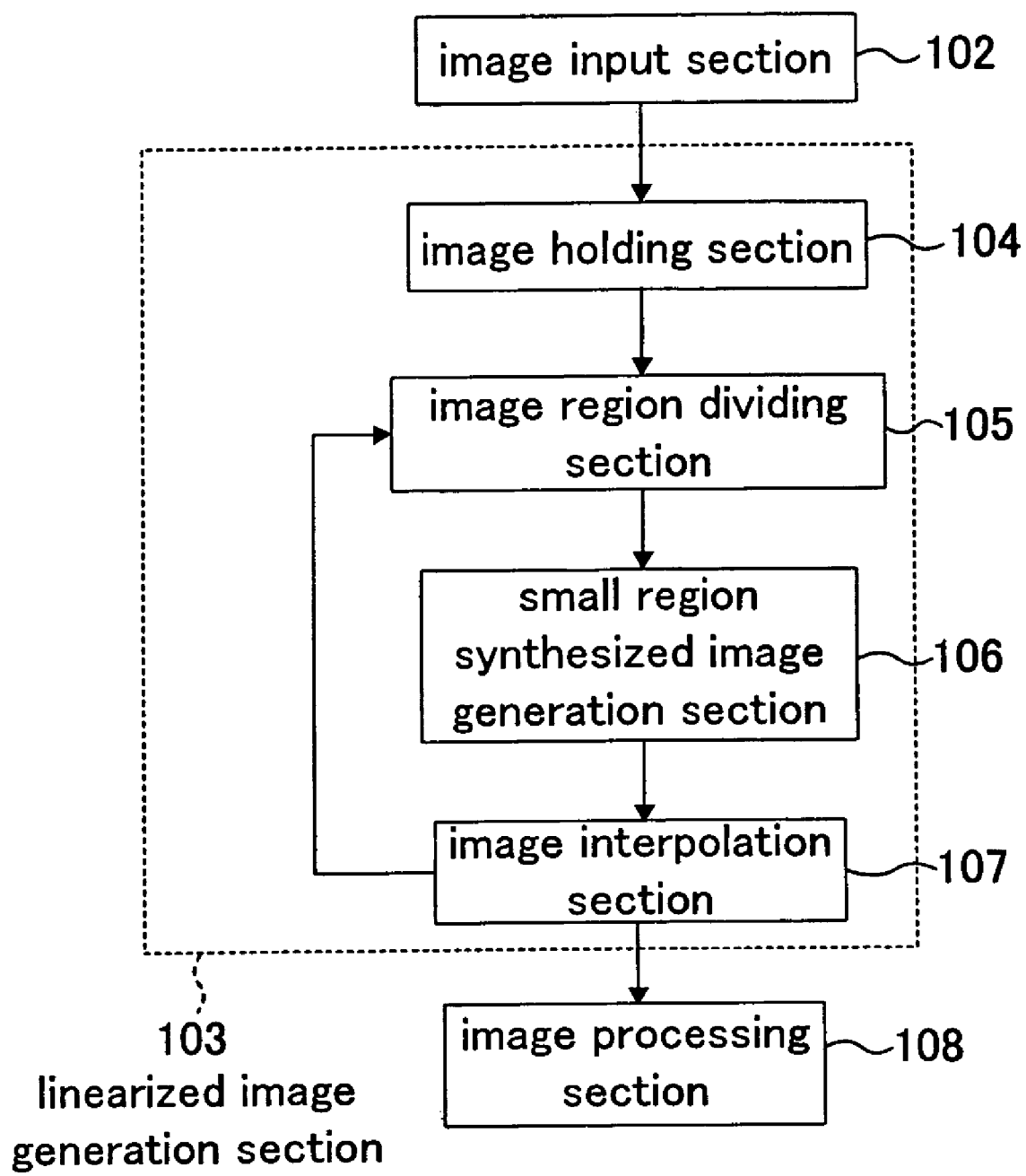
FIG. 33 is a constitutional view of an image processing apparatus according to Embodiment 3 of the present invention.
Figure 37:
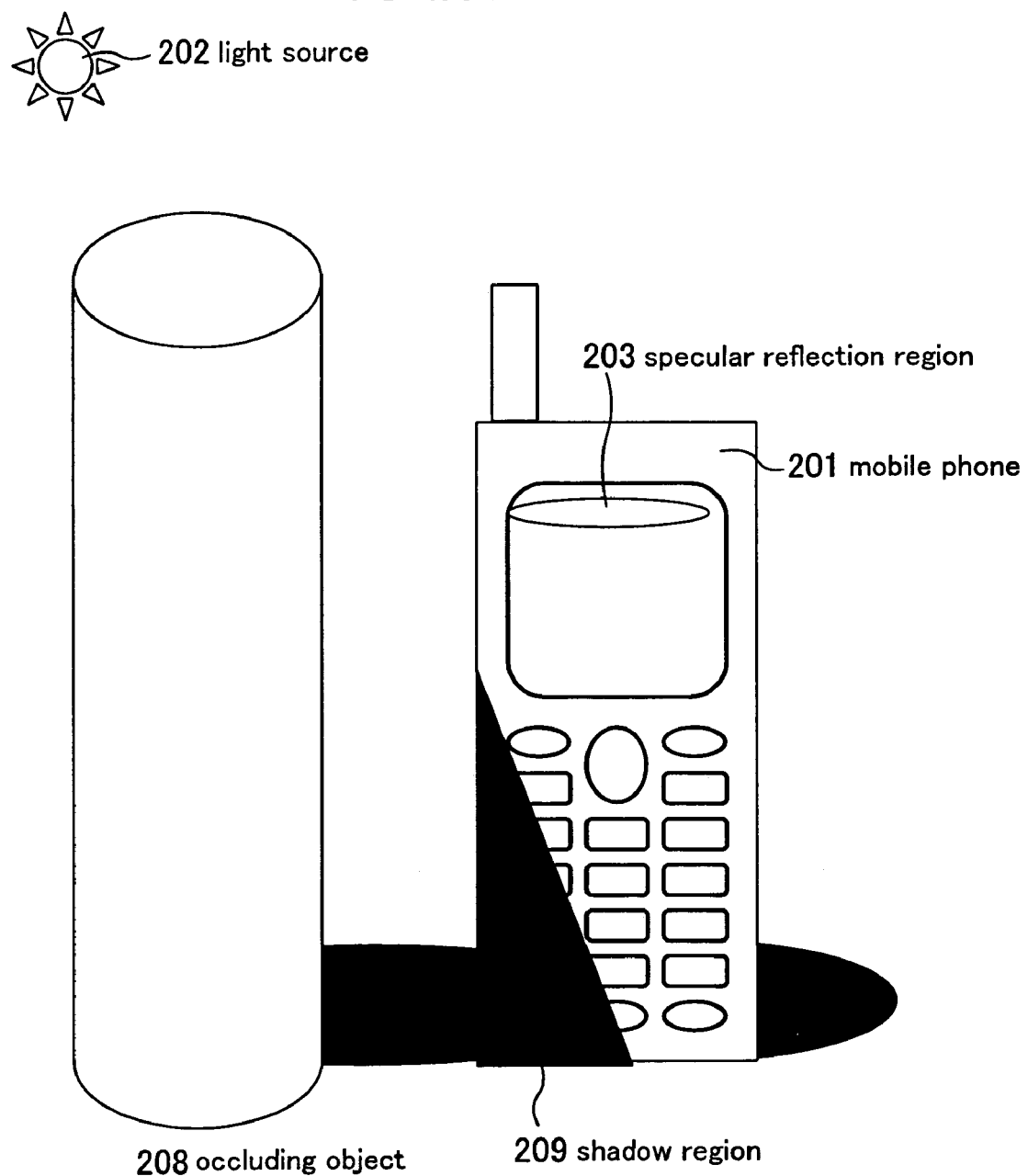
FIG. 37 is an illustration schematically showing an image obtained by shooting a mobile phone 201 in a home.
Figure 38:
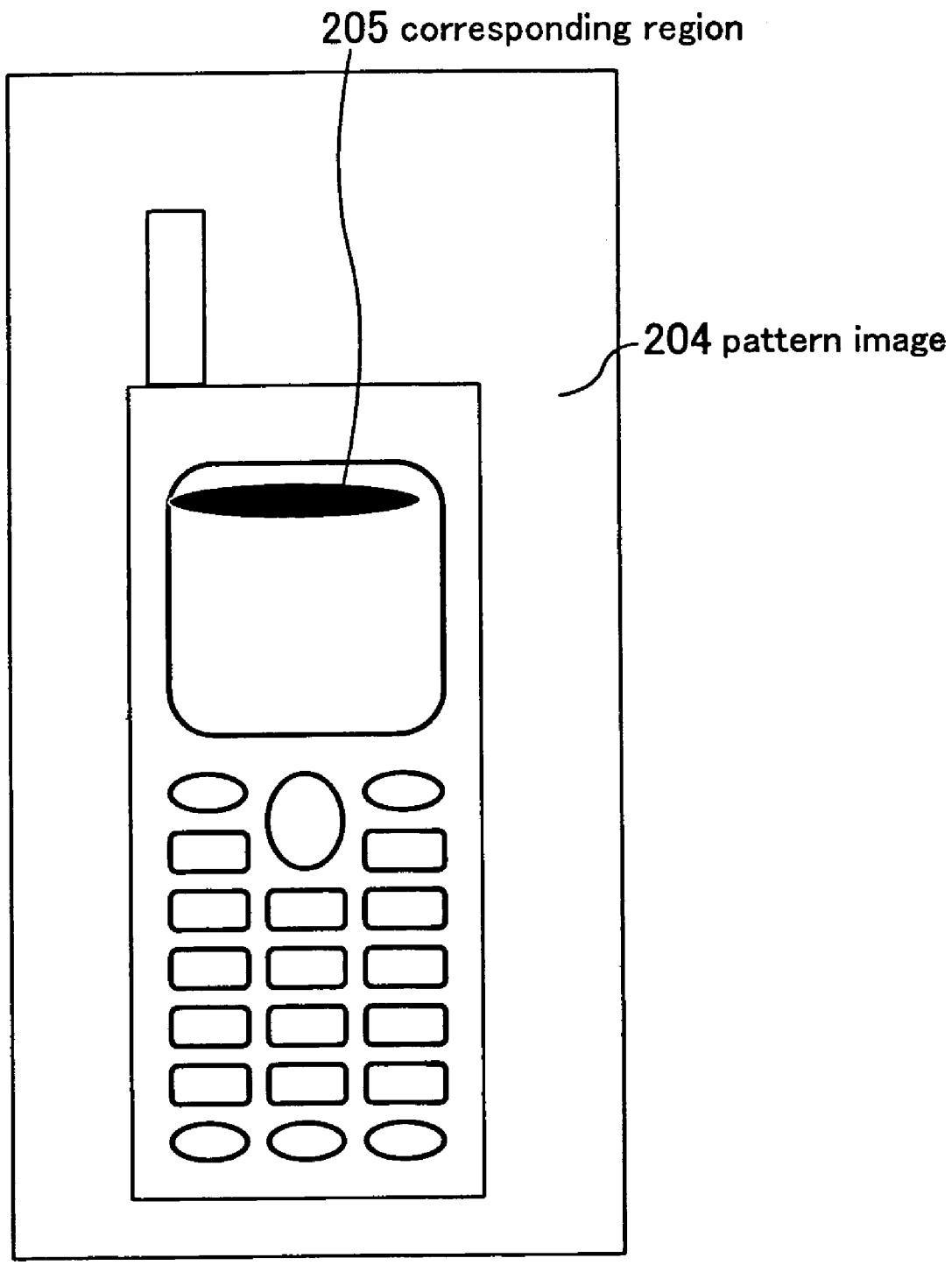
FIG. 38 is a reference image for detecting the mobile phone in FIG. 37.

FIG. 33 shows a constitution of an image processing apparatus that executes an image processing method according to Embodiment 3 of the present invention. In FIG. 33, the same reference numerals as in FIG. 1 are allotted to the same constitutional elements and the detailed description thereof is omitted.

In comparison in constitution of FIG. 33 with FIG. 1, the light source control section 101 is omitted. In the present embodiment, base images are already generated by the aforementioned method and are held in the image holding section 104, and a linearized image of an image input through the image input section 102 is generated. Thus, it is unnecessary to generate base images, attaining high speed processing.

An image input through the image input section 102 is held in the image holding section 104. While in the image holding section 104, base images are already held. Wherein, it is supposed that the input image and the held base images are the same in position of view point. The image region dividing section 105 partitions these images into small regions by the aforementioned method. Then, the small region synthesized image generation section 106 linearizes the input image in each small region partitioned by the image region dividing section 105 by the method of "(3) input image linearization" described in Embodiment 1. For a region where no solution is obtained, the interpolation is performed by the image interpolation section 107 to generate a linearized image. At this time, the region partition method (position and size) may be changed in the image region dividing section 105, as described above, to perform the processing again.

As described above, in the present embodiment, holding already generated base images by the image holding section 104 attains high speed generation of a linearized image from an input image.

Because the present embodiment eliminates the need for change of lighting condition as in Embodiment 1 and for detection of variation in lighting condition as in Embodiment 2, it is unknown whether a plurality of input images held in the image holding section 104 are different in lighting condition or not. However, if an input image of which lighting condition is the same can be detected, a plurality of input images of which lighting condition is different from each other can be prepared by discarding the detected one.

While it is already described herein that judgment as to whether the normal direction of three points are the same or not can be performed by checking matrix degeneration, it should be noted that a matrix is degenerated as well when the lighting condition is the same. Namely, the same method can be applied to detection of an image of which lighting condition is the same. This enables the use of only images different in lighting condition, eliminating the need for positive change in lighting condition and for detection of variation in lighting condition in linearized image generation.

It is noted that the aforementioned processing obtains a linearization coefficient set, a base pixel value, and in turn, a linearized image by selecting three points in random sampling and employing RANSAC, but another method may be employed. For example, it is possible that four or more points are randomly sampled and an optimum solution is obtained from the points by the least-square method. Alternatively, a random sampling disclosed in "Photometric Image-Based Rendering for Realizing Virtual Lighting Conditions in Image Synthesis," Yasuhiro Mukaigawa, Hajime Miyaki, Sadahiro Mihashi, and Takeshi Shakunaga, Transaction of Information Processing Society of Japan, Computer Vision and Image Media, vol. 41, no. SIG10 (CVIM1), p. 19-30, 2000, may be employed, for example, rather than the RANSAC method.

It should be noted that the light source includes a single light source in the description until now but may include a plurality of light sources. This case will be described.

FIG. 34(a) is a schematic view illustrating a situation in which an object is shot by a camera 23 under environment where two light sources 22A, 22B exist. The two light sources 22A, 22B are the same in color vectors, namely, are the same light sources. The focal length, gain, and white balance of the camera 23 are fixed.

An image $I_{A+B}$ shot in the situation shown in FIG. 34(a) is expressed by a sum of an image $I_A$ shot in a situation in which only the light source 22A exists as shown in FIG. 34(b) and an image $I_B$ shot in a situation in which only the light source 22B exists as shown in FIG. 34(c). Namely:

$$I_{A+B} = I_A + I_B \quad \text{(Expression 29)}$$

Wherein, the light sources 22A, 22B are the same light sources, and therefore, $I_A$ and $I_B$ are expressed in terms of the same base vectors by (Expression 2) as follow.

$$I_A = c_A^1 I_1 + c_A^2 I_2 + c_A^3 I_3 \quad \text{(Expression 30)}$$

$$I_B = c_B^1 I_1 + c_B^2 I_2 + c_B^3 I_3 \quad \text{(Expression 31)}$$

When (Expression 30) and (Expression 31) are assigned to (Expression 29), the following relational expression is lead out.

$$\begin{aligned} I_{A+B} &= I_A + I_B \\ &= (c_A^1 I_1 + c_A^2 I_2 + c_A^3 I_3) + \\ &\quad (c_B^1 I_1 + c_B^2 I_2 + c_B^3 I_3) \\ &= (c_A^1 + c_B^1) I_1 + (c_A^2 + c_B^2) I_2 + \\ &\quad (c_A^3 + c_B^3) I_3 \\ &= c_{A+B}^1 I_1 + c_{A+B}^2 I_2 + c_{A+B}^3 I_3 \end{aligned} \quad \text{(Expression 32)}$$

From (Expression 32), it is understood that the same processing can be performed if the color vectors are the same even in the case where a plurality of light sources exist.

The case where only the light source(s) that the light source control section 101 can control exit(s) is described until now, but external light such as sunlight, outdoor illumination, and the like may be present. This case will be described.

When external light is present, an actually shot image I is expressed by the following expression.

$$I = I_c + I_n$$

Wherein, $I_c$ is an image shot when only a light source 13 controlled by the light source control section 101 illuminates an object, and $I_n$ is an image shot when only external light other than that illuminates the object.

In general, it is thought that external light scarcely vary within such a short period of time that the light source control section 101 changes the light source. The image $I_n$ is shot under the condition that the light source 13 controlled by the light source control section 101 is turned off. Then, a difference image obtained by differencing the image $I_n$ from all input images I is set as a new input image I' in accordance with the following expression.

$$I' = I_c = I - I_n$$

Utilization of the image I' as an input image enables the processing by the aforementioned method even under environment where external light is present.

Moreover, in view of an intensity value of a pixel as a reference, the intensity value according to a light source varies linearly even when the color vectors of the light sources are different. In this connection, the processing in the case where the color vector of the light sources are different by the aforementioned method can be performed as well as in the case where the color vectors are the same.

Each embodiment is based on image linearization by Shashua, and accordingly, the case using three base images is described. However, the present invention is not limited thereto. For example, when a point light source exists far away, it is known that an image can be expressed by a linear sum of nine base images by utilizing a spherical harmonics (for example, "Photometric Stereo with General, Unknown Lighting," Ronen Basri and David Jacobs, IEEE Conference on Computer Vision and Pattern Recognition, pp. 11-374-381, 2001). Actually, however, there are some cases where lighting condition is not uniform or where ambient light that cannot be assumed as a point light source. In these cases, partition of an image region into small regions allows the lighting condition to be uniform, which means that the present invention is effective still.

The number of base images may be changed according to the light source condition. For example, when a single light source is fixed in its position and only radiance varies, only one base image suffices and variation in radiance can be expressed by variation in gain only. Also, when two light sources are fixed in their positions and only radiance varies, two base images suffice. This is apparent from that, as described above, an image shot under a condition that an object is illuminated by two light sources is equal to a linear sum of respective images shot under the respective light sources only.

This situation is applied effectively, for example, to the case where home use lighting equipment is used as a light source. There are usually plural sets of lighting equipment installed in a home, of which positions are fixed. The radiance of inverter illumination varies. Also, the radiance varies due to flickering of the lighting equipment.

When an apparatus that realizes the above described image processing method is installed in a home use working robot as in FIG. 2, the robot works accurately even in general circumstances such as in a home. Different from in factories where lighting condition can be fixed, lighting condition varies largely in a home, and therefore, accuracy of image processing is remarkably lowered due to specular reflection and shadows. This serves as a major factor in inviting mis-measurement in measuring, by a stereo camera set or the like, the position and the posture of a robot in motion of grasping an object. When a light source is installed at a movable portion such as the arm of a robot and an image is shot while moving the light source, the image processing according to the present invention can be performed. Thus, a linearized image from which influence of specular reflection and the like is removed can be generated, attaining accurate position/posture measurement by performing position measurement of an object in the linearized image.

It is noted that the above description premises that an object is fixed and lighting condition varies but the present invention is, of course, not limited thereto. For example, the present invention is applicable to the case where a light source is fixed and the position and the posture of an object change. In this case, feature point extraction is performed in images between which the object changes in its position/posture, and corresponding points are obtained in each images to obtain correspondence between the images. For the feature point extraction and corresponding point detection, methods such as "Good Features to Track," J. Shi and C. Tomasi, IEEE Conference on Computer Vision and Pattern Recognition, 1994, pp-593-600, 1994, may be employed.

Referring to Patent Document 4, which discloses a method of synthesizing an image of an object shot under illumination by arbitrary lighting equipment, this method premises a parallel light source as well as in the third conventional example, and therefore, direct application thereof to general circumstances is extremely difficult. However, application of the above described method in the present invention attains realization under a near point light source as general environment. Of course, both a light source and an object may be moved.

Furthermore, it is possible to estimate a region extremely different from the surroundings thereof in distance from the light source, such as a protrusion, a dimple, and the like. In short, positions of a protrusion and a dimple of an object can be estimated by the image processing. This processing will be described.

The case is considered where an object 21 is provided with a protrusion 26 which is extremely different from the surroundings thereof in distance from the light source, as shown in FIG. 49. Suppose that the object is diffuse reflection and a camera is installed near the light source 22 in FIG. 49. FIG. 50(a) and FIG. 50(b) are schematic illustrations showing an image shot in that situation and the result of image linearization obtained by using the image and classification based on the optical characteristic, respectively. In FIG. 50(b), a hatched region 27 is a region classified as a diffuse reflection region and a white region 28 is a region classified as an undefined region or a specular reflection region. A shadow region is present actually but is omitted for the sake of simple description. From this drawing, it is understood that the object standing at an almost equal distance from the light source is classified as a diffuse reflection region correctly while the classification of the protrusion 26, which is diffuse reflection, fails.

This is because of the following reason. The image linearization is performed by utilizing RANSAC, as described above, so that a linearized image in which the number Num_d of pixels classified as a diffuse reflection region is the largest is generated. As described, also, the processing must be performed within only a region where distance from a light source is almost equal for accurate operation of the image linearization. Now, three-point selection in the step S13 in the computation processing of a linearization coefficient set depicting in the flowchart of FIG. 6 is considered. When three points are selected from the protrusion, only a region of which distance from the light source is almost equal to the distances D of the three points from the light source is classified as a diffuse reflection region. Therefore, the number Num_d of pixels' classified as the diffuse reflection region is extremely small. On the other hand, when three points are selected from the object rather than the protrusion, a region classified as a diffuse reflection region is a region of which distance from the light source is almost equal to the distances D of the three points from the light source. This region is dominant in the object, and therefore, the number Num_d of pixels classified as the diffuse reflection region is extremely large. In this connection, as shown in FIG. 50(b), the object of which distance from the light source is almost equal is classified as a diffuse reflection region correctly while the protrusion 26, which is diffuse reflection though, is classified erroneously.

From the above description, an object region extremely different from the surroundings thereof in distance from a light source can be estimated. In other words, if it is known that an object does not cause specular reflection, a region classified as a specular reflection region or an undefined region is judged as a region extremely different from the surroundings thereof.

Removal of influence of specular reflection and shadows is utilized in 3D measurement such as position/posture detection of an object in some cases, as described above. Position estimation of a protrusion and a dimple by the above-described method means direct 3D measurement, and is much effective.

Of cause, in order not to generate such a region where image linearization processing cannot be performed accurately, the image region dividig section 105 may perform region partition into small regions per unit of a region of which distance from a light source is equal.

Further, the image processing according to the present invention is effective particularly in biometric authentication. In face authentication and iris authentication, reflection caused due to specular reflection serves as a noise in images to invite lowering of authentication accuracy. In contrast, in the present invention, a linearized image of an image of only diffuse reflection can be generated, preventing lowering of authentication accuracy caused due to specular reflection.

For example, in face authentication, it is possible that a plurality of images of which lighting condition is changed are shot, a linearized image of which illumination environment is fixed is generated from these images, and authentication processing is performed with the use of the linearized image. This is effective particularly in personal authentication in automobiles. Though it is desirable to apply the present invention to the case where an object is fixed in its position, it is possible to assume an object under authentication to be fixed because a person exists only on a seat in an automobile.

Moreover, the present invention may be applied to authentication using a mobile terminal. FIG. 35 is an illustration of a situation in which a person 91 performs face authentication utilizing a mobile terminal 92. The mobile terminal 92 includes a camera and a plurality of LED light sources (not shown in the drawing), and is capable of performing the image processing according to Embodiment 1. The face authentication is performed by a conventional method utilizing the generated linearized image.

In shooting by the camera as the image input section 102, the light source control section 101 in the mobile terminal 92 allows the plurality of LED light sources to light sequentially, so that a plurality of images of which lighting condition is different from each other are shot. There is high possibility that the camera moves due to camera shake at the shooting. In this connection, image stabilization such as gyro is desirably introduced.

Now, suppose that an ambient light source 93 is present in addition to the plurality of LED light sources provided in the mobile terminal 92. FIG. 36(a) shows one example of an image shot in the situation shown in FIG. 35. As can be understood from FIG. 36(a), a region 94 of a person under authentication is quite different from a background region 95 thereof in lighting condition. This is distinct particularly in the case where the background is sky or the like. The person region 94 is sufficiently near the mobile terminal 92, and therefore, receives strong influence of the light source thereof. On the other hand, the background region 95 is fairly far from the mobile terminal 92, and therefore, receives little influence from the light source thereof, so that the ambient light source 93 is dominant. Accordingly, the regions quite different in lighting condition from each other are present in one image and a linearization coefficient is difficult to estimate to generate a linearized image with low reliability, resulting in lowering of authentication accuracy.

In contrast, in the present invention, as shown in FIG. 36(b), the processing is performed with the image partitioned into the small regions 96. Hence, the lighting condition becomes the same in each small region in the person region 94, except a small region including the boundary to the background region 95. Whereby, a linearized image with high reliability can be generated, increasing authentication accuracy.

The image processing according to the present invention may be applied in image presentation. This is effective particularly for an image of an object exhibiting strong specular reflection such as cut precious stones, metals, and the like. Such objects are too strong in specular reflection to confirm the shapes thereof by visual observation. However, application of the present invention attains generation of images which specular reflection is not caused, enabling presentation of images suitable for shape confirmation.

In addition, linear combination of base images attains generation of an image of which light source is arbitrary, resulting in easy generation of images of which lighting condition is different from each other. Whereby, it becomes possible to confirm beforehand appearances of an object under various lighting condition. This is effective for, for example, deliberating whether to purchase home use interior furniture. For example, when a chair is to be purchased, how the chair looks if the chair is placed in a living room in the house largely depends on lighting condition. Impression thereof may be quite different between in the morning and in the evening. By presenting images of the chair of which lighting condition is changed, the purchaser can confirm how it actually looks under various kinds of lighting condition beforehand.

It is noted that all or a part of the steps of the image processing methods according to the present invention may be realized by exclusive hardware or may be realized on software through a computer program. For example, the image processing methods according to the respective embodiments of the present invention can be realized by allowing a computer to execute a program for realizing the methods.

In the image processing according to the present invention, a linearized image, which is an image in an ideal state in which specular reflection is not caused, can be generated by a rather simple constitution even under complicated lighting condition, and influence of specular reflection and shadows can be removed. Hence, it is useful for image processing apparatuses such as home use robots, and automobiles, or for authentication system, image representation system, and the like.

What is claimed is:

1. An image processing method comprising:
a first step of obtaining a plurality of input images obtained by shooting a same object;
a second step of dividing each of the obtained input images into a plurality of small regions;
a third step of generating a base image, which includes only diffuse reflection, of each of the divided small regions using the input images; and
a fourth step of generating a base image of a small region having been impossible to generate a base image by interpolation processing using a computed value for base image generation in neighbor small regions, the small region and the neighbor small regions being of the divided small regions,
wherein a linearized image of the object under given lighting condition is generated using the generated base images.

2. The method of claim 1, further comprising the step of:
performing image processing using the generated linearized image.

3. The method of claim 2, wherein
the image processing includes at least one of: region classification based on an optical characteristic of an object; object identification; object 3D position/shape estimation.

4. The method of claim 2, wherein
the image processing is processing for estimating position of a protrusion or a dimple included in the object.

5. The method of claim 1, wherein
the plurality of images are obtained by shooting the object while changing lighting condition.

6. The method of claim 5, wherein
a light source is controlled so that a shadow cast on the object is different in position from each other in the plurality of images.

7. The method of claim 1, wherein
the plurality of images are obtained by shooting the object when variation in lighting condition is detected.

8. The method of claim 7, wherein
when a shadow cast on the object varies, it is detected that the lighting condition varies.

9. The method of claim 1, wherein
in the second step,
a size of the small regions is determined based on at least one of an upper limit value of light expanse that can be regarded as a parallel light source, a distance between a light source and the object, a distance between a camera and the object, and a camera parameter.

10. The method of claim 1, wherein
a size of the small region of which base image has been ungenerated is changed and the third step is executed again, instead of the interpolation in the fourth step.

11. The method of claim 1, wherein
a position of the small region of which base image has been ungenerated is changed and the third step is executed again, instead of the interpolation in the fourth step.

12. The method of claim 1, wherein
the plurality of input images are shot under environment where a plurality of light sources exist.

13. The method of claim 1, wherein
the plurality of input images are shot in a home.

14. The method of claim 1, wherein
the method is executed by a robot that performs work in a home.

15. The method of claim 1, wherein
the object is a face of a person.

16. The method of claim 1, wherein
the method is utilized for biometrics authentication.

17. An image processing apparatus comprising:
an image input section that obtains a plurality of images obtained by shooting a same object;
an image region dividing section that divides each of the input images obtained by the image input section into a plurality of small regions;
a small region synthesized image generation section that generates a base image, which includes only diffuse reflection, of each of the small regions divided by the image region dividing section using the input images; and an image interpolation section that generates a base image of a small region having been impossible to generate a base image in the small region synthesized image generation section by interpolation processing using a computed value for base image generation in neighbor regions near to the small region, the small region and the neighbor small regions being of the partitioned small regions, wherein a linearized image of the object under given lighting condition is generated using the generated base images.

18. A computer readable medium encoded with an image processing program for allowing a computer to execute image processing, which allows a computer to execute the steps of:

dividing a plurality of input images obtained by shooting a same object into a plurality of small regions;

generating a base image, which includes only diffuse reflection, of each of the divided small regions using the input images;

generating a base image of a small region having been impossible to generate a base image by interpolation processing using a computed value for base image generation in neighbor small regions near to the small region, the small region and the neighbor small region being of the partitioned small regions; and generating a linearized image of the object under given lighting condition using the generated base images.

* * * * *

UNITED STATES PATENT AND TRADEMARK OFFICE
CERTIFICATE OF CORRECTION

PATENT NO. : 7,236,630 B2 Page 1 of 1
APPLICATION NO. : 11/591778
DATED : June 26, 2007
INVENTOR(S) : Satoshi Sato et al.

It is certified that error appears in the above-identified patent and that said Letters Patent is hereby corrected as shown below:

Title Page

Page 2, Column 2, "Yasuhiro Makaigawa et al." should be -- Yasuhiro Mukaigawa et al. --

Signed and Sealed this

Thirtieth Day of October, 2007

JON W. DUDAS
*Director of the United States Patent and Trademark Office*